US012630241B2

(12) United States Patent
Siedel

(10) Patent No.: US 12,630,241 B2
(45) Date of Patent: May 19, 2026

(54) CEILING SUSPENSION ARRANGEMENT EXHIBITING AT LEAST ONE CRAWLER TYPE CEILING UNIT AS WELL AS METHOD OF SUSPENDING THE CEILING UNIT AT A CEILING STRUCTURE

(71) Applicant: Ceilix AG, Pullach i. Isartal (DE)

(72) Inventor: Michael Torsten Siedel, Bad Münstereifel (DE)

(73) Assignee: CEILIX AG, Pullach i. Isartal (DE)

( * ) Notice: Subject to any disclaimer, the term of this patent is extended or adjusted under 35 U.S.C. 154(b) by 58 days.

(21) Appl. No.: 18/853,060

(22) PCT Filed: Mar. 28, 2023

(86) PCT No.: PCT/EP2023/058057
§ 371 (c)(1),
(2) Date: Sep. 30, 2024

(87) PCT Pub. No.: WO2023/186936
PCT Pub. Date: Oct. 5, 2023

(65) Prior Publication Data
US 2025/0236348 A1      Jul. 24, 2025

(30) Foreign Application Priority Data

Mar. 29, 2022    (EP) ..................................... 22165188
Mar. 29, 2022    (EP) ..................................... 22165205
(Continued)

(51) Int. Cl.
*B62D 57/024*        (2006.01)
*B62D 55/075*        (2006.01)
*B62D 55/104*        (2006.01)

(52) U.S. Cl.
CPC ......... *B62D 57/024* (2013.01); *B62D 55/075* (2013.01); *B62D 55/104* (2013.01)

(58) Field of Classification Search
CPC .. B62D 57/024; B62D 55/075; B62D 55/104; B62D 55/0655; B65G 1/0492
See application file for complete search history.

(56) References Cited

U.S. PATENT DOCUMENTS 10,112,664 B2 * 10/2018 Li ............................ B25J 15/06
10,836,446 B2 * 11/2020 Sekiguchi ............... B60B 15/18
(Continued)

FOREIGN PATENT DOCUMENTS

| CN | 110228541 B | 1/2021 |
| DE | 2020100256 U1 | 5/2020 |
| JP | 1984-227570 A2 | 12/1984 |

*Primary Examiner* — Valentin Neacsu
*Assistant Examiner* — Marlon A Arce
(74) *Attorney, Agent, or Firm* — Miller Canfield

(57) ABSTRACT

The present invention refers to ceiling suspension arrangements exhibiting at least one crawler type ceiling unit (10) and a ceiling structure (1) extending in at least two spatial directions (x, y) and defining at least one structural regularity (1*a*), wherein the crawler type ceiling unit (10) exhibits a plurality of suspension elements for suspending the ceiling unit and for coupling the crawler type ceiling unit (10) to the ceiling structure (1), wherein the crawler type ceiling unit exhibits at least two circumferential tracks, wherein the suspension elements are attached to the circumferential tracks at predefined longitudinal positions corresponding to the structural regularity (1*a*), wherein the circumferential tracks respectively define a specific path of circumferential motion of the respective suspension elements. Further, the present invention refers to a method of suspending the ceiling unit at a ceiling structure, especially in context with two-dimensional positioning of the ceiling unit.

15 Claims, 33 Drawing Sheets

(30)        Foreign Application Priority Data

May 5, 2022    (EP) ...................................... 22171776
Sep. 1, 2022    (EP) ...................................... 22193445

(56)                References Cited

U.S. PATENT DOCUMENTS

2018/0050747 A1*    2/2018    Kazakov .............. B62D 57/024
2020/0254355 A1*    8/2020    Wang ................... A63H 17/262
2025/0376324 A1*    12/2025    Austrheim ............. B65G 1/065

* cited by examiner

17

16.1

16

10

XZa

G13.1

G13.2

XZa

XZb

CEILING SUSPENSION ARRANGEMENT EXHIBITING AT LEAST ONE CRAWLER TYPE CEILING UNIT AS WELL AS METHOD OF SUSPENDING THE CEILING UNIT AT A CEILING STRUCTURE

CROSS-REFERENCE TO RELATED APPLICATIONS

This invention claims priorities of European patent applications No. EP22165188.8, filed Mar. 29, 2022, No. EP22165205.0, filed Mar. 29, 2022, No. EP22171776.2, filed May 5, 2022 and No. EP22193445.8, filed on Sep. 1, 2022

TECHNICAL FIELD

The present invention refers to ceiling suspension arrangements exhibiting at least one crawler type ceiling unit. Further, the present invention refers to a method of suspending the ceiling unit at a ceiling structure, especially in context with two-dimensional positioning of the ceiling unit. In particular, the present invention refers to devices and methods according to features of the enclosed independent and dependent claims.

BACKGROUND

In prior art, multiple design philosophies have already been established in context with provision of systems which shall be able to ensure a predefined position or motion also in rough terrain or in context with unpredictable reaction forces or at high inclination or in an overhead arrangement. The present invention focuses on those philosophies departing from the idea that a unit or vehicle or any means of transportation should engage/interact in predefined manner with a predefined structure at a wall or at the ceiling (e.g. overhead cranes, wall crawling robots) e.g. in a storehouse or in a machinery hall. Some ideas of provision of reliable contact between the structure and the unit have already been published in context with diagnosis and parameter measurement in nearly inaccessible areas or systems (e.g. ductwork, canal systems), including magnetic adhesion/interference. Nonetheless, there is a need for systems being capable of providing, by interacting with a predefined structure, both a predefined traveling motion and a high accuracy in positioning (positional accuracy) in very reliable manner, preferably irrespective of the kind of underground or wall constitution, wherein the predefined structure should preferably be provided in very flexible and varied manner to many kinds of areas or different kinds of wall or ceiling contour/geometry.

The skilled person may differentiate between those units or vehicles which are provided for moving on the underground and those vehicles which are provided for moving along a ceiling structure, especially since the latter have to be suspended in secure manner also, in order to avoid going down. Therefore, there might be different approaches as to the kinematics ensuring interaction/engagement at the structure's interface. The present invention focuses on interaction/engagement at/with ceiling structures.

SUMMARY

It is an object of the present invention to provide for a system which allows for reliable and accurate suspension/positioning/traveling of at least one unit at a ceiling structure, especially for realizing variable two-dimensional tracks of motion of the unit. In particular, the object also includes providing for a suspension mechanism resp. suspension means allowing for securely suspending the ceiling unit e.g. also in context with load-carrying issues. In particular, the object may also include provision of an appropriate system or concept for reliably coupling one or a plurality of ceiling units with the ceiling structure and also ensuring reliable positioning or even predefined paths of motion. Also, the object of the present invention may further include actively driving methods for movably suspending such a ceiling units at the ceiling structure, e.g. in context with logistic tasks.

The object of the present invention is solved by the features of the independent main claims. Advantageous features are indicated in the subclaims. If not explicitly excluded, the teachings of the subclaims can be combined arbitrarily with the teachings of the main claims and the subclaims.

According to a first aspect, the present invention provides for a ceiling suspension arrangement exhibiting at least one crawler type ceiling unit and a ceiling structure extending in at least two spatial directions, wherein the ceiling structure comprises a plurality of profile units (especially rails) extending (preferably continuously, especially without any structural discontinuity) in a first spatial direction, wherein the ceiling structure defines at least one structural regularity in a second spatial direction (thereby providing a one-dimensional raster with discrete coupling points distributed in at least one equidistant regularity in said second spatial direction); and wherein the crawler type ceiling unit exhibits a plurality of suspension elements configured for suspending the ceiling unit and configured for coupling the crawler type ceiling unit to the ceiling structure by means of de-/coupling kinematics depending on a relative motion of the ceiling unit with respect to the ceiling structure in at least said second spatial direction, wherein the ceiling unit exhibits at least two circumferential tracks (especially tracks based on or defined by traction means, preferably chain-based tracks), wherein the suspension elements are attached to the circumferential tracks at predefined longitudinal positions corresponding to the structural regularity, wherein the circumferential tracks respectively define a specific path of circumferential motion of the respective suspension elements (resp. of coupling means of the suspension elements, especially of a free end of the respective suspension element), thereby providing for de-/coupling kinematics during a motion of the crawler type ceiling unit in said second spatial direction, especially with the crawler type ceiling unit being configured to be moved in said first spatial direction along the profile units irrespective of momentary motion in said second spatial direction. Such configuration not only facilitates implementation in context with complex structures or in context with a plurality of ceiling units to be used at the same time, but also considerably increases variability as to positioning. Thereby, the present invention also provides for practical scalability (both with respect to the structure and with respect to the number of ceiling units), even in three-dimensional extension, if desired.

According to one embodiment, the crawler type ceiling unit is a crawler type ceiling vehicle, optionally exhibiting at least one drive unit (motor, actuator) for actively driving the crawler type ceiling unit along the structure.

Accordingly, the present invention also concerns kinematics of suspension elements being (autonomously) de-/coupled by a motion along circumferential tracks, based on geometrically predefined kinematics. Optionally, the de-/coupling kinematics can be actively driven by the ceiling unit itself. In particular, the object can also be solved by a crawler type ceiling unit configured for actively traveling in a suspended manner especially headlong at a structure, wherein the ceiling unit exhibits: a plurality of suspension elements configured for suspending the ceiling unit and configured for coupling the ceiling unit to the structure, and at least one drive configured for circumferential driving/guiding motion (resp. drive motion of the suspension elements along the circumferential tracks), wherein the suspension elements are attached to the first circumferential track at predefined first longitudinal positions corresponding to a predefined raster (especially a/the raster defined by the structure), wherein the ceiling unit is configured for moving along the structure by decoupling a subset of the plurality of suspension elements from resp. coupling them into the structure when the suspension elements are guided along (the) two circumferential tracks by the circumferential motion (driving/guiding motion). Such a configuration also allows for actively moving the ceiling unit (or, for letting the ceiling unit autonomously) without being limited to a predefined path of motion defined by specific profile units, e.g. rails (or the like) of the structure.

According to the present disclosure, when it is referred to "ceiling structure", a structure which may also extend (at least in parts) on the ground or along a wall or on an inclined plane (or the like) can be designated. The present invention can preferably be applied for ceiling units (resp. ceiling vehicles) being arranged at resp. traveling along a ceiling structure, and in addition, the present invention also allows for any motion along any structure with alternative orientation and/or arrangement. Thus, referring to a "structure" or "ceiling structure" includes reference to any other "structure" exhibiting the features presently described allowing for coupling with/to the inventive ceiling unit and corresponding de-/coupling kinematics.

According to the present disclosure, when it is referred to "vehicle" or "ceiling vehicle", the disclosure also generally refers to crawler type units or vehicles and its relative spatial arrangement or traveling motion (e.g. also on the ground or on an inclined plane or at the wall).

According to the present disclosure, when it is referred to "circumferential track", the disclosure also generally refers to closed loop guidings and lines and predefined contours along which the suspension elements are guided and/or driven, e.g. chains or any such traction means providing for a closed loop.

According to the present disclosure, when it is referred to "profile units" or "profiles" or "T-profiles", the disclosure also generally refers to different kinds of profiles like e.g. I-profiles or L-profiles which may provide for advantageous/favourable arrangements in individual applications.

According to the present disclosure, when it is referred to "package", especially in context with logistics, a package is understood to be any physical objects that can be transported and preferably does not exceed certain dimensions and/or a certain weight (e.g. items of daily use such as consumables or food as well as technical items and equipment or mail items, advertising material, brochures). For example, the packages are unpackaged items, packaged items and repackaged items, whereby in the case of packaged and repackaged items the "package" may comprise the packaging or repackaging as well as the item packaged therein. Likewise, it can be expedient to process unpackaged objects, in particular commodity objects. Each package may include an individual identification feature, e.g. an identification code (especially a physical code which is applied, for example, to the package, to an outer packaging of the package or to a storage unit for the package and/or a transport unit for the package, and/or a digital code which is assigned to the package and/or to a digital twin of the package). Each package can be reproduced/mirrored in digital manner in a digital twin (or a digital twin mirrors several packages), wherein (also) the digital twin preferably comprises at least one identification mark. E.g., a package/packet is associated with a packet identification code, and the digital twin of the packet contains the packet identification code.

It should be noted that according to the invention, the crawler type ceiling unit can also be guided by a user, pulling/pushing the ceiling crawler into a specific direction. I.e., active drives are not necessarily provided. In particular, in conjunction with appropriate sensor-actor-arrangements, the crawler type ceiling unit may follow an intended direction resp. an intended path of motion (especially as a kind of semi passive guide mode; guidance via physical and/or visual interaction with an individual).

According to one embodiment the ceiling suspension arrangement is configured for at least passive motion (externally driven) of the (respective) crawler type ceiling unit in said at least two spatial directions, and/or wherein the crawler type ceiling unit is configured for at least two-dimensional arbitrary motion in arbitrary directions defined by said at least two spatial directions (resp. lying within a plane defined by said two spatial directions).

According to one embodiment the profile units respectively exhibit at least one tread, wherein each suspension element exhibits at least one element of motion (for gliding or rolling, especially at least one wheel) arranged and configured for at least passively moving (especially gliding or rolling) the crawler type ceiling unit in said first spatial direction.

According to one embodiment the crawler type ceiling unit is configured for enabling at least one closed loop trajectory of respective suspension elements along corresponding circumferential tracks, especially configured for enabling at least two closed loop trajectories of at least two subsets of respective suspension elements.

According to one embodiment the circumferential tracks are shaped in such a manner that the respective suspension elements are de-/coupled from/into the ceiling structure when passing a curved section of the tracks.

According to one embodiment a subset of the suspension elements are attached to one of the circumferential tracks (resp. a subset of the first subset, momentary) and at least one further subset of the suspension elements are attached to a further one of the circumferential tracks (resp. a subset of the second subset, momentary) respectively at predefined first and second (further) longitudinal positions respectively corresponding to the structural regularity, in particular with each suspension element being guided by a pair of circumferential tracks.

According to one embodiment the suspension elements are fixedly attached/coupled by means of a first pulley to/with a/the first circumferential track and are guided within a/the second circumferential track by means of a second pulley respectively, wherein the first and second pulley preferably are arranged at a lever arm of the respective suspension element.

According to one embodiment each suspension element exhibits a first pulley and a second pulley arranged in longitudinal distance with respect to the first pulley at a lever arm of the respective suspension element, wherein the suspension element is coupled to a/the first and a/the second circumferential tracks via the first and second pulleys.

According to one embodiment a respective subset of said suspension elements are connected to each other by means of longitudinal connecting elements, especially by chain elements, thereby forming a closed loop of interrelated suspension elements distanced to each other in a/the predefined structural regularity.

According to one embodiment the respective circumferential track exhibits a chain or is provided/defined by a chain forming a closed loop of interrelated chain elements.

According to one embodiment the crawler type ceiling unit is configured for lifting a/the respective suspension elements out of the structure in an unloaded state, especially such that both de-/coupling kinematics for a subset of momentarily unloaded suspension elements and suspension of the crawler type ceiling unit by a subset of momentarily loaded suspension elements is ensured.

According to one embodiment the crawler type ceiling unit exhibits at least two kinds/types of suspension elements, wherein the different types of suspension elements are de-/coupled according to individual kinematics (especially in opposite directions/sides at the profile units, especially both in and opposite to the second spatial direction resp. travel direction of the crawler type ceiling unit), wherein a first subset of the suspension elements are attached to a first pair of circumferential tracks (resp. a subset of the first subset, momentary) and at least one further subset of the suspension elements are attached to a second pair of circumferential tracks (resp. a subset of the second subset, momentary) respectively at predefined first and second (further) longitudinal positions respectively corresponding to the structural regularity (resp. to the distance of the profile units defined by said structural regularity), wherein the first and second pairs of circumferential tracks provide for individual kinematics for the first and second subsets of suspension elements, especially such that the crawler type ceiling unit is secured with respect to opposite sides/directions (of the second spatial direction) at the structure resp. at the profile units.

According to one embodiment each suspension element is guided by a pair of circumferential tracks, wherein the crawler type ceiling unit exhibits at least three pairs of circumferential tracks each guiding a subset of the suspension elements, wherein said de-/coupling kinematics are predefined by said three pairs of circumferential tracks in such a manner that respective suspension elements (resp. a subset of the respective subset, momentary) simultaneously de-/couple both at a first side (resp. first longitudinal position) of a respective profile unit and at a second side (resp. second longitudinal position) of a respective profile unit, especially such that the crawler type ceiling unit is secured with respect to opposite sides/directions (of the second spatial direction) at the ceiling structure, especially with all suspension elements being guided in same circumferential direction, especially with all circumferential tracks being arranged in parallel to each other.

According to one embodiment the crawler type ceiling unit exhibits at least one load attachment point configured for transferring loads of an external load (e.g. an object or a subject/individual to be carried/transported/moved along the ceiling in one- or two-dimensional manner) attached to the crawler type ceiling unit.

According to one embodiment the crawler type ceiling unit exhibits at least one hoist unit, or the ceiling suspension arrangement exhibits at least two crawler type ceiling units each exhibiting at least one hoist unit, wherein the hoist unit is configured for transferring loads of an external load (e.g. an object or a subject/individual) to the ceiling structure.

According to one embodiment the crawler type ceiling unit exhibits at least one drive interacting with (resp. driving) at least one of the circumferential tracks, wherein the ceiling suspension arrangement is configured for a predefinable driven motion of the crawler type ceiling unit at least in said second spatial direction (especially back and forth).

According to one embodiment the crawler type ceiling unit exhibits an energy storage unit providing energy to a/the at least one drive of the crawler type ceiling unit, especially to a/the at least one drive interacting with (resp. driving) at least one of the circumferential tracks.

According to one embodiment the ceiling suspension arrangement exhibits or defines at least one energy charging point/position, wherein the ceiling suspension arrangement is configured for charging the at least one crawler type ceiling unit with energy when being arranged in/at said energy charging point/position.

According to one embodiment the ceiling suspension arrangement exhibits a plurality of energy supply lines extending along at least a subset of the profile units, wherein at least a subset of the suspension elements of the respective crawler type ceiling unit are configured for energy extraction via the energy supply lines, e.g. by means of current collectors or power-sliders provided at a free end (resp. at elements of motion) of the respective suspension element coupling with the profile units.

According to one embodiment the ceiling suspension arrangement (especially the at least one crawler type ceiling unit) exhibits a sensing device exhibiting at least one sensor from the following group: speed sensor, distance sensor, position measuring sensor, force sensor, acceleration sensor resp. gyroscope; wherein the ceiling suspension arrangement is configured for controlling the at least one crawler type ceiling unit based on (depending on) momentary measuring data of the at least one sensor.

According to one embodiment the (respective) crawler type ceiling unit exhibits a communicating unit configured for wireless communication at least within the ceiling suspension arrangement, wherein the (respective) crawler type ceiling unit exhibits an energy storage unit providing energy to the communicating unit, especially such that the crawler type ceiling unit is energetically self-sustaining (autarkic) for at least a period of several days or weeks or month.

According to one embodiment the ceiling suspension arrangement is configured for locating individual crawler type ceiling units based on at least one locating signal transmitted by individual crawler type ceiling units (passively or actively, e.g. passively based on at least one individual transmitter, especially based on individual identification features).

According to one embodiment each suspension element exhibits at least one element of motion (for gliding or rolling, especially at least one wheel) arranged and configured for moving (especially gliding or rolling) the crawler type ceiling unit in said first spatial direction, wherein the crawler type ceiling unit exhibits at least two drives interacting with both at least one of the circumferential tracks and with said elements of motion, wherein the ceiling suspension arrangement is configured for a predefinable two-dimensional driven motion of the crawler type ceiling unit in said spatial directions.

According to one embodiment the profile units of the ceiling suspension arrangement are arranged according to at least two different structural regularities (especially structural densities) respectively with respect to said second spatial direction (i.e., distributed according to at least two equidistant regularities), namely a first structural regularity defining a/the relative distance of the profile units matching with the relative (longitudinal) distance of the suspension elements attached at the tracks (with respect to each other), and a second structural regularity being a whole-number multiple of said first structural regularity (resp. of the relative longitudinal distance of the suspension elements attached at the tracks), wherein the number of momentarily engaging/coupling suspension elements preferably is at least two within a/the overlapping area of the second structural regularity, and wherein a/the area of the first structural regularity preferably has a first load-bearing capacity and the area of the second structural regularity has a second load-bearing capacity (especially smaller than the first load-bearing capacity).

According to one embodiment the profile units of the ceiling suspension arrangement spatially define at least two different allowable loads (according to at least two different/specific load-bearing capacities) in at least two spatial sections of the ceiling suspension arrangement along the ceiling (wherein the cross section remains identical, geometrically).

According to one embodiment at least a subset of the profile units of the ceiling suspension arrangement respectively exhibit at least one delimiting zone or boundary line defining a limit between a traveling area for the at least one crawler type ceiling unit and an inaccessible boundary area of the ceiling structure (in which the at least one crawler type ceiling unit shall not travel or shall not be positioned).

According to one embodiment the ceiling suspension arrangement is coupled with/to a further ceiling suspension arrangement, wherein the profile units of the ceiling suspension arrangement are arranged according to a first structural regularity (especially structural density), wherein the profile units of the further ceiling suspension arrangement are arranged according to a second structural regularity, wherein the second structural regularity is a whole-number multiple of said first structural regularity; wherein the ceiling suspension arrangements may extend for example on at least two different levels of altitude or floors.

According to one embodiment the ceiling suspension arrangement extends on at least two different levels of altitude (thereby providing for three-dimensional travel directions), wherein the ceiling suspension arrangement comprises at least one elevator exhibiting an elevator ceiling structure geometrically corresponding to/with the ceiling structure of the ceiling suspension arrangement, wherein the ceiling structure merges/transitions to the elevator ceiling structure (structural transition), wherein the elevator is configured to travel from at least a first level to a second level, thereby interconnecting said levels of altitude and a plurality of ceiling structures extending at said at least two different levels.

According to one embodiment the ceiling suspension arrangement exhibits a plurality of crawler type ceiling units each exhibiting at least one attachment point or hoist unit each being configured for transferring loads of an external load of at least 50 kg or 100 kg to the ceiling structure, wherein the ceiling suspension arrangement is configured for arranging a plurality of external loads in individual two-dimensional or three-dimensional positions with respect to each other, especially respectively being attached at one crawler type ceiling unit.

According to one embodiment the crawler type ceiling unit exhibits at least one attachment point or hoist unit structurally connected with at least one of the circumferential tracks, wherein the crawler type ceiling unit is configured for transferring loads of an external load (e.g. of an individual) of at least 200 kg or 500 kg to the ceiling structure, wherein the ceiling suspension arrangement is configured for at least two-dimensional transportation/movement of at least one individual suspended via the attachment point or hoist unit along the ceiling structure.

According to one embodiment the crawler type ceiling unit exhibits at least one attachment point or hoist unit structurally connected with at least one of the circumferential tracks, wherein the crawler type ceiling unit is configured for transferring loads of an external load (e.g. of an equipment, a machine or an engine or any such industrial object) of at least 1.000 kg or 10.000 kg to the ceiling structure, wherein the ceiling suspension arrangement is configured for at least two-dimensional transportation/movement of the external load being suspended via the attachment point or hoist unit along the ceiling structure.

According to one embodiment the ceiling suspension arrangement exhibits a plurality of crawler type ceiling units each exhibiting at least one attachment point or hoist unit each being configured for transferring loads of an external load to the ceiling structure, wherein the ceiling suspension arrangement is configured for controlling the one- or two-dimensional movement or path of motion of a subset of at least two of the crawler type ceiling units in dependence on each other, especially such that the crawler type ceiling units of the (respective) subset move analogously (especially remaining at the same distance with respect to each other), especially by also controlling at least two hoists of the (respective) subset carrying the same external load.

According to one embodiment the ceiling suspension arrangement exhibits a plurality of crawler type ceiling units each exhibiting at least one accommodating cavity configured for accommodating at least one package, wherein the ceiling suspension arrangement exhibits at least one control unit configured for wireless control resp. wireless data transmission (especially based on at least one communicating unit, e.g. near filed, mobile network, LAN, LP-WAN, SigFox, NBIOT), wherein the ceiling suspension arrangement is configured for controlling the one- or two-dimensional movement or path of motion of a respective crawler type ceiling unit (especially in dependence on a desired/required target position, especially based on at least one identification feature of the respective crawler type ceiling unit or package wirelessly transmitted by the respective crawler type ceiling unit or wirelessly acquired by a/the control unit of the ceiling suspension arrangement) and/or of a subset of at least two of the crawler type ceiling units in dependence on each other, especially such that the plurality of crawler type ceiling unit simultaneously move according to a plurality of individual one- or two-dimensional paths of motion.

According to one embodiment the crawler type ceiling unit exhibits at least one attachment point or hoist unit each being configured for transferring loads of an external load to the ceiling structure, wherein the ceiling suspension arrangement exhibits a sensing device exhibiting at least one sensor from the following group: force sensor, acceleration sensor resp. gyroscope; wherein the ceiling suspension arrangement is configured for gravity offloading based on active force exertion in at least one spatial direction via the attachment point or hoist unit (especially active force vertically upwards), wherein the amount of force is depending on (resp. is adapted to) effective gravity and/or effective load (effective gravitational forces exerted at the attachment point or hoist unit) especially based on momentary data of the at least one force sensor, preferably with the amount of force being adjustable e.g. according to individual user commands.

According to one embodiment the at least one crawler type ceiling unit exhibits at least one drive, wherein the ceiling suspension arrangement unit exhibits a control unit controlling the drive, wherein the ceiling suspension arrangement exhibits a sensing device exhibiting at least one sensor from the following group: speed sensor, distance sensor, position measuring sensor, force sensor, acceleration sensor resp. gyroscope; wherein the ceiling suspension arrangement is configured for controlling the at least one crawler type ceiling unit based on (depending on) momentary measuring data of the at least one sensor, especially for controlling an absolute or a relative position or state of motion of the at least one crawler type ceiling unit.

According to one embodiment the ceiling suspension arrangement exhibits a plurality of crawler type ceiling units respectively exhibiting at least one sensor (position, distance, speed, acceleration) and a communicating unit communicating with a (central) control unit of the ceiling suspension arrangement, wherein the ceiling suspension arrangement is configured for predefining a plurality of individual paths of two-dimensional motion of respective crawler type ceiling units (especially such that each individual path of motion is adjusted resp. adapted to momentary moving conditions and positions of the further crawler type ceiling units, especially by providing individual commands to at least one drive or actuator of each crawler type ceiling unit, especially based on at least one individual identification feature, e.g. a code which is specific for each individual ceiling unit).

According to one embodiment the ceiling suspension arrangement exhibits a central control unit monitoring at least the momentary positions of the (active) crawler type ceiling units of the ceiling suspension arrangement, wherein each crawler type ceiling unit exhibits a communicating unit for wireless transmission of control signals to at least one drive or actuator of the respective crawler type ceiling unit; or wherein the ceiling suspension arrangement is configured for decentral control, wherein each crawler type ceiling unit exhibits a sensing device providing momentary sensor data (especially speed and/or distance and/or position and/or acceleration data) to at least one drive or actuator of the crawler type ceiling unit. It is also possible to combine a ceiling suspension arrangement with a central control unit with crawler type ceiling units exhibiting features for decentral control, such as sensing and communication devices for communicating with near/neighbouring crawler type ceiling units in order to provide a particularly secure collision prevention. This allows for user interaction with some crawler type ceiling units while other crawler type ceiling units can move autonomously and still reliably avoid any collisions.

According to one embodiment the ceiling suspension arrangement is configured to block the respective crawler type ceiling unit with respect to at least one direction of motion, especially by blocking the circumferential motion along the circumferential tracks (fixed position at least with respect to the second spatial direction) and/or by blocking elements of motions (for gliding or rolling along the profile units, especially wheel) of the respective suspension elements (fixed position at least with respect to the first spatial direction), thereby providing for (optional) one-dimensional motion only in said first or second spatial direction.

According to one embodiment the ceiling suspension arrangement comprises a database configured for storing and accessing at least one digital twin of individual crawler type ceiling units and/or individual packages carried by crawler type ceiling units of the ceiling suspension arrangement, wherein the digital twin at least comprises information of momentary status (e.g. relative/absolute position, speed, loading condition, weight, capacity, energy status), wherein the ceiling suspension arrangement is configured to define at least one control parameter for individual crawler type ceiling units based on information of the at least one digital twin, especially for remotely controlling individual crawler type ceiling units.

It should be noted that in context with the present invention, it is considered convenient to integrate at least one, advantageously several, even more advantageously as much as possible information in the digital twin of a package/packet.

The above mentioned object is also solved by a method of suspending/positioning at least one crawler type ceiling unit at a ceiling structure extending in at least two spatial directions for providing at least two degrees of freedom for at least two-dimensional positioning or two-dimensional (traveling) motions of the (respective) crawler type ceiling unit in suspended manner headlong the ceiling structure, especially in conjunction with actively moving/driving the crawler type ceiling unit along the ceiling structure, especially by actively re-orientating the crawler type ceiling unit's traveling direction (which can be carried out via remote control of at least one drive unit or actuator of the respective crawler type ceiling unit), especially in/with a ceiling suspension arrangement as described above, wherein the ceiling structure comprises a plurality of profile units extending in a first spatial direction, wherein the ceiling structure defines at least one structural regularity in a second spatial direction (thereby defining a one-dimensional raster with discrete coupling points only in said second spatial direction); wherein the crawler type ceiling unit is suspended by means of a plurality of suspension elements coupling the crawler type ceiling unit to the ceiling structure by means of de-/coupling kinematics depending on a relative motion of the ceiling unit with respect to the ceiling structure in at least said second spatial direction, wherein the suspension elements are (respectively) attached to and guided by at least two circumferential tracks (especially tracks based on or defined by traction means, preferably chain-based tracks) of the crawler type ceiling unit, wherein the circumferential tracks respectively define a specific path of circumferential motion of the respective suspension elements, thereby providing for de-/coupling kinematics which suspend and relatively move the respective suspension element with respect to the ceiling structure during a relative motion of the crawler type ceiling unit (with respect to the ceiling structure) in said second spatial direction, especially with the crawler type ceiling unit remaining movable (at least passively) in said first spatial direction along the profile units irrespective of momentary motion in said second spatial direction.

The above mentioned object is also solved by a computer program comprising instructions which, when the program is executed by a computer, cause the computer to execute steps of the method as described above in context with provision and control of the motion or relative/absolute positions of at least one crawler type ceiling unit, especially by controlling the at least one drive of at least one crawler type ceiling unit interacting with at least one of the circumferential tracks, especially based on momentary absolute and/or relative position data of the at least one crawler type ceiling unit.

It is possible to connect the drive units of the crawler type ceiling units to a motor, especially to an electric motor. The vehicle may comprise different kinds of power units, drives, motors, and actuators, optionally not only for the drive units, but also for further functions as e.g. winch or hoist functions. Generally, the vehicle can be provided as an active vehicle exhibiting at least two motors interacting with the driving mechanism resp. with the suspension elements. In particular, the vehicle exhibits at least one power unit or motor for each drive unit, e.g. an electric motor which is coupled to an axis of rotation of a gear unit interacting with the respective circumferential track or an electric motor interacting with the wheels of the suspension elements via the at least one second drive unit, in order to allow for motorized motion in at least two spatial directions, thus, the wheels can be driven by any drive to actively drive along the profile rails. Also, the vehicle resp. the at least two drive units may comprise an energy storage unit, especially a rechargeable battery pack, providing energy to the at least two drive/motor, irrespective of any external energy supply (power to motors for driving the vehicle resp. the tracks resp. the guiding motion along the tracks). In particular, the vehicle may also exhibit at least one hoist (hoist unit) and a traction mechanism configured for lifting loads. E.g., the hoist unit can be fixed to and supported by the at least one first drive unit.

Each power unit, drive, motor and/or actuator of the vehicle can be coupled to a control unit of the vehicle. In particular, the control unit may control the type/kind of motion, and the control unit may also control e.g. a lifting action of a hoist unit e.g. in context with cargo tasks or logistic tasks in general. For example, the vehicle may exhibit two or three drive units which can be arranged in predefined lateral distance to each other (e.g. defined/connected via cross-beams or the like), and in case the vehicle is driven in active manner, each drive unit may exhibit at least one drive/motor for actively driving the suspension elements along the circumferential tracks or the vehicle in the second spatial direction, and these drives/motors can be controlled depending on each other, e.g. via the speed of rotation. Thus, a traveling direction can be controlled, especially in combination with actively driven wheels of the suspension elements being driven along the profile rails of the ceiling structure.

The crawler type ceiling vehicle can further exhibit at least one first drive unit and at least one second drive unit connected to at least one motor respectively, wherein the motor for the first drive units and the second drive units are different, providing for active two-dimensional traveling capability of the vehicle. The first drive units of the vehicle can be scaled up in number; e.g., the vehicle exhibits three first drive units each being based on the same kinematic concept, but at least one of the drive units provides for mirror-inverted type/manner of de-/coupling kinematics.

The vehicle can for example comprise at least one holonomic wheel that is part of the second drive unit. This provides active motion in the first spatial direction defined by the structure via the second drive unit and the motor connected thereto, and passive motion in the other spatial direction. The holonomic wheel can be a wheel whose wheel tread consists of rollers whose axes of rotation are at an angle to the axis of rotation of the main wheel. The absolute angle between the axes can for example be any angle between 5 and 90 degrees, especially 45 degrees. This angle has to be regarded when controlling the at least two motors, since the movement of the first drive units and the second drive unit are not independent in the case that the angle of the rollers to the wheel is different than 90 degrees. An angle smaller than 90 degrees can result in advantageous configurations regarding the traction of the holonomic wheel with the profiles of the structure. In case the angle is smaller it is possible to place more rollers with the same diameter around the wheel, which enhances traction transmission and can compensate for gaps in the traction transmission of a single omniwheel. The holonomic wheel can also be disc shaped and comprise a plurality of equally distributed rollers around its circumference, such that it allows for traction control in the first spatial direction and is not affected by a motion in the second spatial direction. The angle between the rollers and the wheel can be 90 degrees. This allows for easier control of the configuration.

The crawler type ceiling vehicle can also comprise a holonomic wheel set consisting of at least two coaxially arranged holonomic wheels, wherein the wheel set is connected to the second drive unit. The holonomic wheels are preferably disc shaped and have a thickness that is half the width of the profiles of the structure, such that there is room for at least two holonomic wheels of the holonomic wheelset to interact with one profile (rail) of the structure. This configuration enhances the traction of the disc shaped holonomic wheels. Each of the coaxially arranged holonomic wheels can have a predefined offset in the azimuthal direction in respect to their adjacent holonomic wheels. It is preferred that if one holonomic wheel comprises n rollers, that are equally distributed around the circumference of the wheel, each wheel is offset by 180/n degrees with respect to its neighbours. This way, it can be ensured that there is always at least one wheel of the wheelset that is in contact with the profile of the structure and slip of the second drive unit is prevented.

The holonomic wheels can be connected to a return mechanism that applies a force to the holonomic wheel pressing them against the ceiling structure. This configuration enhances traction of the holonomic wheel on the profiles (rails) of the structure additionally.

The vehicle can also comprise at least one wide elongated gearing wheel for meshing with a defined raster in the first spatial direction, wherein the gearing wheel is connected to the second drive unit. The wide elongated gearing wheel, also called "spur gear", conditions an additional raster, a "sub raster" in the profile of the structure, such that the teeth of the gear mesh with the sub raster. When the spur gear is turned via the motor and the second drive unit, the vehicle pulls itself forward in the first spatial direction. This can be used e.g., in small high precision applications such as 3D-printing. The elongated gearing wheel can be tapered at the ends to allow a smooth transition into the additional raster. This mitigates the risk of being stopped or causing damage by imperfect alignment with the sub raster elements.

It is possible to combine the crawler type ceiling unit with a robotic arm. The robotic arm can e.g., be connected to the crawler type ceiling unit via coupling means of the type described in EP3705410A1. The robotic arm can exhibit means for securely lifting objects. Alternatively, the robotic arm can e.g., be directly connected to a camera, lighting equipment, a welder or other tools.

In the following, possible use case scenarios of previously described different embodiments of the crawler type ceiling vehicles and arrangements will be discussed. The use cases can be divided into the main categories: logistics, production, transport, healthcare, entertainment. In general, the crawler type ceiling unit can overcome the limitations of overhead cranes and overhead transport systems by combining the flexible positioning of the overhead cranes with the flexible application area of the overhead transport system.

In a fully-/semi-automated warehouse the crawler type ceiling units can be used for transporting packages from one location to another. Particularly heavy objects can be lifted with a plurality of synchronized crawler type ceiling units. The paths of the crawler type ceiling units can be planned with a central control unit with the help of digital twins of packages and crawler type ceiling units. The omnidirectionally moving crawler type ceiling units provide for enhanced package processing possibilities inside a warehouse or facility.

In a hybrid workstation, the crawler type ceiling unit can assist the worker by helping him lift, hold and place objects, or bring him objects from other areas. Additionally, a crawler type ceiling unit with a robotic arm attached to it can assist in the work process. The possible work scenarios can include but are not limited to production and assembly lines, maintenance/repair work, hangars, car workshops, shipyards, ports, film or photography studios. In a film or photography studio, the crawler type ceiling units can lift lighting and camera equipment. Additionally, pre-programmed routes can be used in order for the camera or lighting equipment to follow programmed movements. This can be achieved by using a plurality of synchronized crawlers such that they alter the orientation of a lifted object. Alternatively, the crawler type ceiling units can be connected to a robotic arm exhibiting a camera.

The high flexibility in application area and positioning of the crawler type ceiling unit also allows for a use in healthcare applications, such as rehabilitation and therapy (walking assistance), elderly care, operations, care for patients, and transport of patients. The crawler type ceiling unit can e.g., lift a patient or lift medical equipment and can access a patient from multiple angles due to the omnidirectional movement of the crawler type ceiling units in the ceiling structure.

This also allows the crawler type ceiling unit to be used for training, simulation or entertainment purposes e.g., in the form of gravity offloading, a shooting range, an art exhibition, stage design, and amusement parks.

It is also possible to use the crawler type ceiling unit for construction works. Here, the crawler type ceiling units can help in the building process by applying concrete, similar to a 3D-printing process. Additionally, some crawler type ceiling units can be equipped with means to lift bricks, lay pipes and cables, and install lintels and windows. In this aspect, the cooperation of synchronized crawler type ceiling units can help speed up the construction process and build a whole house in an automated way.

The ceiling structure can be segmented into multiple areas, wherein preferably one central controller is assigned to each area. The central controllers can preferably communicate with each other, e.g., in order to request a crawler type ceiling unit from one another. The crawler type ceiling units can then move from one area to the other via suitable transportation means. For example, an elevator, a (sky) train, or a truck can also exhibit profiles. In addition, multiple areas can be connected with rails that allow the crawler type ceiling units to move from one area to another, e.g., at an airport, a retail store etc.

It is also possible to use the crawler type ceiling unit in a domestic environment, amplifying human abilities at home or doing chores. The crawler type ceiling unit can also be used in 3D printing, biological processing applications, pick and place machines or service robotics.

Items

AA. Crawler type vehicle configured for traveling in a suspended manner especially headlong at a structure, wherein the vehicle exhibits:

a plurality of suspension elements configured for suspending the vehicle and configured for coupling the vehicle to the structure, at least one drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the vehicle is configured for moving along the structure by decoupling a subset of the plurality of suspension elements from resp. coupling them into the structure when the suspension elements are guided along the two circumferential tracks by the circumferential motion.

AB. Crawler type vehicle according to item AA, wherein the at least one drive unit of the crawler type vehicle is configured for enabling a closed loop trajectory of the suspension elements.

AC. Crawler type vehicle according to any of the preceding items, wherein the first and second circumferential tracks are shaped in such a manner that the suspension elements are de-/coupled from/into the structure only when passing a curved section of the tracks.

AD. Crawler type vehicle according to any of the preceding items, wherein the suspension elements are fixedly attached/coupled by means of a first pulley to/with the first circumferential track, wherein the suspension elements are guided within the second circumferential track by means of a second pulley respectively, wherein the first and second pulley preferably are arranged at a lever arm of the respective suspension element, wherein the respective suspension element preferably has an L-shape; and/or wherein each suspension element exhibits a first pulley and a second pulley arranged in longitudinal distance with respect to the first pulley at a lever arm of the respective suspension element, wherein the suspension element is coupled to the first and second tracks via the first and second pulleys; and/or wherein each suspension element exhibits a lever arm accommodating/supporting a/the pulley guided by the second track, wherein the pulley is arranged at a free end of the lever arm, and wherein in a linear section of the track, the lever arm is pointing in the driving/traveling direction, at least roughly; and/or wherein the suspension elements are connected to each other by means of longitudinal connecting elements, especially by longitudinal connecting elements being connected at the axis of a/the first pulley of the respective suspension element, thereby forming a closed loop of interrelated suspension elements distanced to each other in the predefined raster.

AE. Crawler type vehicle according to any of the preceding items, wherein the first circumferential track exhibits a chain or is provided/defined by a chain forming a closed loop of interrelated chain elements; and/or wherein the first circumferential track is defined by a chain connecting the suspension elements; and/or wherein the vehicle exhibits a plurality of counter bearings, especially configured and arranged for frontally interacting with the (ceiling) structure, wherein the plurality of counter bearings are preferably coupled to/with the first circumferential track, especially coupled to chain elements of the first circumferential track.

AF. Crawler type vehicle according to any of the preceding items, wherein the vehicle exhibits a further drive unit accommodating further circumferential tracks, wherein a plurality of further suspension elements are attached to the further circumferential tracks in predefined longitudinal positions corresponding to a/the predefined raster and are configured for suspending the vehicle and for coupling the vehicle to the structure, especially such that the vehicle is secured with respect to opposite directions at the structure; and/or wherein the vehicle also exhibits further suspension elements which are attached to further circumferential tracks, wherein the suspension elements and the further suspension elements momentarily engaging the structure are securing/blocking the vehicle at the structure with respect to the driving/traveling direction and opposite thereto; and/or wherein the vehicle exhibits a further drive unit which exhibits the same configuration as a/the first drive unit but with mirror-inverted arrangement of the further suspension elements and further circumferential tracks, wherein the further suspension elements are guided/driven in a direction opposite to the guiding direction of the suspension elements of the first drive unit, especially such that both the respective suspension elements and further suspension elements are simultaneously de-/coupling to/from the structure.

AG. Crawler type vehicle according to the preceding item, wherein the at least one drive unit is configured for lifting the respective suspension element out of the structure in an unloaded state, especially such that the at least one crawler type drive unit provides for both de-/coupling kinematics for a subset of momentarily unloaded suspension elements and suspension of the vehicle by a subset of momentarily loaded suspension elements at the same time; and/or wherein the at least one drive unit has a substantially plane configuration; and/or wherein the vehicle exhibits at least two the drive units which arranged in parallel to each other; and/or wherein the circumferential tracks are respectively guided/driven in a plane, extending in two-dimensional manner.

AH. Crawler type vehicle according to any of the preceding items, wherein the vehicle is configured for traveling in at least two spatial directions, namely a first spatial direction being predefined by the structure and a second spatial direction being defined by the guiding/driving motion of the at least one drive unit, wherein the second spatial direction is orthogonal to the first spatial direction, preferably providing for at least two-dimensional locomotion capability of the vehicle; and/or wherein the respective suspension element exhibits at least one wheel which is arranged and configured for being guided along the structure, especially on a wheel tread of a respective/corresponding profile of the structure; and/or wherein the at least one drive unit is coupled by means of at least three suspension elements; and/or wherein the respective suspension element has an L-shape which provides for two arms defining the relative arrangement of a/the wheel and first and second pulleys of the respective suspension element.

AI. Crawler type vehicle arrangement comprising at least one crawler type vehicle according to any of the preceding items and a/the structure exhibiting a plurality of profiles defining a/the raster of the structure, wherein the suspension elements are configured for being guided along the profiles in a (first) spatial direction being defined by the structure, the vehicle's traveling motion having at least two degrees of freedom; and/or wherein the structure exhibits a plurality of profiles defining a/the raster of the structure, wherein the vehicle exhibits a plurality of further suspension elements suspending the vehicle together with the suspension elements, wherein the suspension elements and the further suspension elements secure/block the vehicle at the structure with respect to the driving/traveling direction.

AJ. Crawler type vehicle arrangement according to item AI, wherein the profiles respectively exhibit at least one power rail, wherein the vehicle is configured for driving the at least one drive unit by means of energy supplied via the power rails, especially via current collectors provided within the suspension elements.

AK. Method of hanging/suspending a crawler type vehicle at/from a structure for traveling in a suspended manner headlong the structure, especially a crawler type vehicle according to one of items AA to AH, wherein the vehicle is suspended by means of a plurality of suspension elements coupling the vehicle to the structure, wherein a circumferential guiding/driving motion is defined by first and second circumferential tracks having a different circumferential shape/contour, wherein the suspension elements are attached to the first circumferential track at predefined first longitudinal positions corresponding to a raster defined by the structure, wherein the vehicle is suspended such that it can move along the structure by decoupling a subset of the plurality of suspension elements from resp. coupling them into the structure when the suspension elements are guided along the circumferential tracks by the circumferential motion.

AL. Method according to the preceding method item, wherein the circumferential motion is transmitted/transferred by the suspension elements momentarily engaging the structure; and/or wherein the circumferential motion is provided by first and second drive units, wherein the first drive unit provides for a circumferential motion of a first subset of the suspension elements on a first closed loop trajectory and the second drive unit provides for a circumferential motion of a second subset of the suspension elements on a second closed loop trajectory.

AM. Method according to method item AK or AL, wherein the circumferential guiding/driving motion is a passive guiding motion in reaction to external actuation on the vehicle, e.g. provided by an external pushing or driving force which can be transmitted to the vehicle via at least one lateral surface of the vehicle or the at least one drive unit.

AN. Computer program comprising instructions which, when the program is executed by a computer, cause the computer to execute steps of the method according to at least one of the method items AK to AM in context with provision and control of the circumferential guiding/driving motion, especially by controlling the at least one drive unit.

AO. Use of at least one crawler type drive unit accommodating first and second circumferential tracks having different circumferential shapes/contours, for hanging/suspending and optionally also actively driving a crawler type vehicle in order to travel in a suspended manner especially headlong at a structure, especially for hanging/suspending a crawler type vehicle according to one of items AA to AH, especially in a method according to one of items AK to AM, wherein the vehicle is suspended by means of a plurality of suspension elements coupling the vehicle to the structure, wherein the suspension elements are attached to the first circumferential track at predefined first longitudinal positions corresponding to a raster defined by the structure, wherein a/the circumferential guiding/driving motion is provided by the at least one drive unit such that the vehicle moves along the structure by decoupling a subset of the plurality of suspension elements from resp. coupling them into the structure when the suspension elements are guided/driven along the circumferential tracks.

BA. Crawler type ceiling vehicle configured for traveling in a suspended manner especially headlong at a ceiling structure, wherein the ceiling vehicle exhibits:
  a plurality of suspension elements configured for suspending the ceiling vehicle and configured for coupling the ceiling vehicle to the ceiling structure,
  at least one drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the ceiling vehicle is configured for moving along the ceiling structure by decoupling a subset of the plurality of suspension elements from resp. coupling them into the ceiling structure when the suspension elements are guided along the two circumferential tracks by the circumferential motion.

BB. Crawler type ceiling vehicle according to item BA, wherein the ceiling vehicle is configured for moving along the ceiling structure by decoupling a subset of the plurality of suspension elements from resp. coupling them into the ceiling structure when the suspension elements are guided along a curved section of at least one of the circumferential tracks by the circumferential driving motion.

BC. Crawler type ceiling vehicle according to any of the preceding items, wherein the first and second circumferential tracks provide for de-/coupling kinematics based on different circumferential shapes/contours at least in curved sections of the track(s), wherein the suspension elements are guided in/by the second circumferential track at respective second longitudinal positions being longitudinally offset with respect to the respective first longitudinal positions, wherein the decoupling kinematics provide for both a first motion and a second motion pivoting each suspension element when it is guided along a/the curved section of the circumferential tracks by the circumferential driving motion; and/or wherein the decoupling kinematics provide for an S-shaped path of motion of a bearing point at a free end of the respective suspension element at least in a section along the path of motion; and/or wherein the de-Coupling kinematics comprise both vertical motion kinematics and non-circular pivot motion kinematics for/of a/the bearing point at a free end of the respective suspension element; and/or wherein the first and second circumferential tracks are shaped in such a manner that the suspension elements are de-Coupled from/into the ceiling structure only when passing a curved section of at least one of the tracks.

BD. Crawler type ceiling vehicle according to any of the preceding items, wherein the momentary relative first longitudinal position of the respective suspension element at the first track defines a/the instantaneous centre of rotation of that suspension element, and the corresponding relative second longitudinal position at the second track defines the amount of momentary rotation of that suspension element; and/or wherein the tracks are shaped in such a manner that both the momentary vertical coordinate as well as the momentary coordinate of the second spatial direction of the respective suspension element is defined and adjusted by the contour of the tracks; and/or wherein the tracks have a shape/contour deviating from the standard racecourse shape of a crawler track at least in a curved section of the tracks, wherein the first track's shape preferably deviates at least in vertical direction, wherein the second track's shape preferably deviates both in vertical direction and in said second direction; and/or wherein the radius of curvature of the first track is constant, at least approximately; and/or wherein in at least one longitudinal position along the track(s), the radius of curvature of the second track is bigger than the radius of curvature of the first track, and in at least one further longitudinal position along the track(s), the radius of curvature of the second track is smaller than the radius of curvature of the first track, wherein radius of curvature of the tracks preferably differs/changes in steady/continuous manner as a function of the momentary longitudinal position along the track(s); and/or wherein the contour of the first track provides for a/the first motion of a/the contacting/bearing point of the respective suspension element, and the contour and changing distance of the second track with respect to the first track provides for a/the pivoting motion of the contacting/bearing point of the respective suspension element when it is guided along a/the curved section of the circumferential tracks.

BE. Crawler type ceiling vehicle according to any of the preceding items, wherein the shape/contour of the tracks provides for both lifting and lowering of the suspension elements as a function of the longitudinal position along the tracks, especially first lifting and then lowering in context with decoupling, and vice versa in context with coupling; and/or wherein the relative radial distance of the tracks is constant along a linear section of the tracks, and the relative radial distance of the tracks differs/changes along a curved section of the tracks as a function of the momentary longitudinal position along the track(s), especially in steady/continuous manner.

BF. Crawler type ceiling vehicle according to any of the preceding items, wherein the ceiling vehicle exhibits a further drive unit accommodating a further circumferential track and configured for synchronous circumferential driving motion; and/or wherein the ceiling vehicle exhibits a further drive unit accommodating a further circumferential track, wherein a plurality of further suspension elements configured for suspending the ceiling vehicle and configured for coupling the ceiling vehicle to the ceiling structure are attached to the further circumferential track in predefined further longitudinal positions corresponding to a/the raster defined by the ceiling structure; and/or wherein the suspension elements and the further suspension elements are securing/blocking the ceiling vehicle at the ceiling structure with respect to the driving direction and opposite thereto.

BG. Crawler type ceiling vehicle according to any of the preceding items, wherein the ceiling vehicle exhibits at least one hoist unit, or the ceiling vehicle exhibits at least two or three hoists.

BH. Crawler type ceiling vehicle arrangement comprising at least one ceiling vehicle according to any of the preceding items and a/the ceiling structure exhibiting a plurality of profiles defining a/the raster of the ceiling structure, wherein the suspension elements are configured for being guided along the profiles in said first spatial direction, the ceiling vehicle's traveling motion having at least two degrees of freedom; and/or wherein the ceiling structure exhibits a plurality of profiles defining a/the raster of the ceiling structure, wherein the ceiling vehicle exhibits a plurality of further suspension elements suspending the ceiling vehicle together with the suspension elements, wherein the suspension elements and the further suspension elements secure/block the ceiling vehicle at the ceiling structure with respect to the driving direction.

BI. Crawler type ceiling vehicle arrangement according to the preceding item, wherein the profiles respectively exhibit at least one power rail, wherein the ceiling vehicle is configured for driving the at least one drive unit by means of energy supplied via the power rails, especially via current collectors provided within the suspension elements.

BJ. Crawler type ceiling vehicle arrangement according to item BH or BI, wherein the ceiling structure is modular and extendable especially based on tiles which are equipped with profiles of the ceiling structure.

BK. Crawler type ceiling vehicle arrangement according to any of items BH to BJ, wherein the crawler type ceiling vehicle arrangement extends on at least two different levels of altitude and exhibits at least one elevator interconnecting said levels of altitude, wherein the elevator exhibits an elevator ceiling structure geometrically corresponding to/with the ceiling structure arranged at the at least two different levels of altitude.

BL. Method of hanging/suspending a crawler type ceiling vehicle at/from a ceiling structure for traveling in a suspended manner headlong the ceiling structure, especially a crawler type ceiling vehicle according to one of items BA to BG, wherein the ceiling vehicle is suspended by means of a plurality of suspension elements coupling the ceiling vehicle to the ceiling structure, wherein a circumferential guiding/driving motion is provided by at least one drive unit accommodating first and second circumferential tracks having a different circumferential shape/contour, wherein the suspension elements are attached to the first circumferential track at predefined first longitudinal positions corresponding to a raster defined by the ceiling structure, wherein the ceiling vehicle is suspended such that it can move along the ceiling structure by decoupling a subset of the plurality of suspension elements from resp. coupling them into the ceiling structure when the suspension elements are guided along the circumferential tracks by the circumferential motion.

BM. Method according to the preceding method item, wherein the circumferential motion is transmitted/transferred by the suspension elements momentarily engaging the ceiling structure; and/or wherein the circumferential motion is provided by first and second drive units, wherein the first drive unit provides for a circumferential motion of a first subset of the suspension elements on a first closed loop trajectory and the second drive unit provides for a circumferential motion of a second subset of the suspension elements on a second closed loop trajectory; and/or wherein at least one load/cargo is carried by at least one hoist accommodated on the vehicle.

BN. Computer program comprising instructions which, when the program is executed by a computer, cause the computer to execute the steps of the method according to at least one of the method items BL or BM in context with provision and control of the circumferential guiding/driving motion, especially by controlling at least one drive unit.

BO. Use of at least one crawler type drive unit accommodating first and second circumferential tracks having different circumferential shapes/contours, for hanging/suspending and optionally also actively driving a crawler type ceiling vehicle in order to travel in a suspended manner especially headlong at a ceiling structure, especially for hanging/suspending a crawler type ceiling vehicle according to one of items BA to BG, especially in a method according to one of items BL to BM, wherein the ceiling vehicle is suspended by means of a plurality of suspension elements coupling the ceiling vehicle to the ceiling structure, wherein the suspension elements are attached to the first circumferential track at predefined first longitudinal positions corresponding to a raster defined by the ceiling structure, wherein a/the circumferential guiding/driving motion is provided by the at least one drive unit such that the vehicle moves along the ceiling structure by decoupling a subset of the plurality of suspension elements from resp. coupling them into the ceiling structure when the suspension elements are guided/driven along the circumferential tracks.

CA. Crawler type vehicle configured for traveling in a suspended manner, especially headlong at a ceiling structure, wherein the vehicle exhibits:

a plurality of suspension elements configured for suspending the vehicle and configured for coupling the vehicle to the structure, at least one first drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the vehicle is configured for moving along the structure by decoupling a subset of the plurality of suspension elements from resp. coupling them into the structure when the suspension elements are guided along the two circumferential tracks by the circumferential motion.

CB. Crawler type vehicle according to item CA, wherein the vehicle further comprises:

at least one second drive unit configured for enabling locomotion of the ceiling vehicle in at least two spatial directions, namely a first spatial direction being predefined by the structure and a second spatial direction being defined by the guiding/driving motion of the at least one first drive unit, wherein the second spatial direction is orthogonal to the first spatial direction, wherein the second drive unit is configured for locomotion of the vehicle in the first spatial direction providing for at least two-dimensional locomotion capability of the vehicle, wherein the respective suspension element exhibits at least one wheel which is arranged and configured for being guided along the structure, especially on a wheel tread of a respective/corresponding profile of the structure, at least two individually controllable motors, wherein at least one first drive unit and at least one second drive unit is connected to at least one motor, and wherein the motor for the first drive unit(s) and the second drive units are different, providing for active two-dimensional traveling capability of the vehicle.

CC. Crawler type vehicle according to item CA or CB, wherein the at least one first drive unit of the crawler type vehicle is configured for enabling a closed loop trajectory of the suspension elements;

wherein the first and second circumferential tracks are shaped in such a manner that the suspension elements are de-/coupled from/into the structure only when passing a curved section of the tracks;

wherein the suspension elements are fixedly attached/coupled by means of a first pulley to/with the first circumferential track, wherein the suspension elements are guided within the second circumferential track by means of a second pulley respectively, wherein the first and second pulley preferably are arranged at a lever arm of the respective suspension element, wherein the respective suspension element preferably has an L-shape; and/or wherein each suspension element exhibits a first pulley and a second pulley arranged in longitudinal distance with respect to the first pulley at a lever arm of the respective suspension element, wherein the suspension element is coupled to the first and second tracks via the first and second pulleys;

and/or wherein each suspension element exhibits a lever arm accommodating/supporting a/the pulley guided by the second track, wherein the pulley is arranged at a free end of the lever arm, and wherein in a linear section of the track, the lever arm is pointing in the driving/traveling direction, at least roughly; and/or wherein the suspension elements are connected to each other by means of longitudinal connecting elements, especially by longitudinal connecting elements being connected at the axis of a/the first pulley of the respective suspension element, thereby forming a closed loop of interrelated suspension elements distanced to each other in the predefined raster;

wherein the first circumferential track exhibits a chain or is provided/defined by a chain forming a closed loop of interrelated chain elements connecting the suspension elements, wherein the vehicle exhibits a plurality of counter bearings, especially configured and arranged for frontally interacting with the ceiling structure, wherein the plurality of counter bearings are preferably coupled to/with the first circumferential track, especially coupled to chain elements of the first circumferential track; wherein the vehicle exhibits a further first drive unit accommodating further circumferential tracks, wherein a plurality of further suspension elements are attached to the further circumferential tracks in predefined longitudinal positions corresponding to a/the predefined raster and are configured for suspending the vehicle and for coupling the vehicle to the structure, especially such that the vehicle is secured with respect to opposite directions at the structure, wherein the vehicle exhibits further suspension elements which are attached to further circumferential tracks, wherein the suspension elements and the further suspension elements momentarily engaging the structure are securing/blocking the vehicle at the structure with respect to the driving/traveling direction and opposite thereto, and/or wherein the vehicle exhibits a further drive unit which exhibits the same configuration as a/the first drive unit but with mirror-inverted arrangement of the further suspension elements and further circumferential tracks, wherein the further suspension elements are guided/driven in a direction opposite to the guiding direction of the suspension elements of the first drive unit, especially such that both the respective suspension elements and further suspension elements are simultaneously de-/coupling to/from the structure;

wherein the at least one first drive unit is configured for lifting the respective suspension element out of the structure in an unloaded state, especially such that the at least one first drive unit provides for both de-/coupling kinematics for a subset of momentarily unloaded suspension elements and suspension of the vehicle by a subset of momentarily loaded suspension elements at the same time; and/or wherein the at least one first drive unit has a substantially plane configuration; and/or wherein the vehicle exhibits at least two first drive units arranged in parallel to each other; and/or wherein the circumferential tracks are respectively guided/driven in a plane, extending in two-dimensional manner; and/or wherein the at least one first drive unit is coupled by means of at least three suspension elements; and/or wherein the respective suspension element has an L-shape which provides for two arms defining the relative arrangement of a/the wheel and first and second pulleys of the respective suspension element.

CD. Crawler type vehicle according to item CA, CB or CC, wherein the second drive unit comprises at least one holonomic wheel.

CE. Crawler type vehicle according to item CD, wherein the holonomic wheel is disc shaped and comprises a plurality of equally distributed rollers around its circumference.

CF. Crawler type vehicle according to item CE, wherein the second drive unit comprises a holonomic wheelset consisting of at least two coaxially arranged holonomic wheels.

CG. Crawler type vehicle according to item CF, wherein each of the coaxially arranged holonomic wheels has a predefined offset in the azimuthal direction in respect to their adjacent holonomic wheels.

CH. Crawler type vehicle according to one of item CD to CG, wherein the holonomic wheel(s) is/are connected to a return mechanism that applies a force to the holonomic wheel(s) pressing it/them against the structure.

CI. Crawler type vehicle according to item CA, CB or CC, wherein the second drive unit comprises at least one wide elongated gearing wheel for meshing with a defined raster in the second spatial direction.

CJ. Crawler type vehicle according to item CI, wherein the elongated gearing wheel is tapered at the ends.

CK. Crawler type vehicle arrangement comprising at least one crawler type vehicle according to any of items CA to CH and a/the structure exhibiting a plurality of profiles defining a/the raster of the structure, wherein the suspension elements are configured for being guided along the profiles in a first spatial direction being defined by the structure, the vehicle's traveling motion having at least two degrees of freedom; and/or wherein the structure exhibits a plurality of profiles defining a/the raster of the structure, wherein the vehicle exhibits a plurality of further suspension elements suspending the vehicle together with the suspension elements, wherein the suspension elements and the further suspension elements secure/block the vehicle at the structure with respect to the driving/traveling direction.

CL. Crawler type vehicle arrangement comprising at least one crawler type vehicle according to item CI or CJ and a structure exhibiting a plurality of first profiles defining a raster of the structure in a first spatial direction, wherein the plurality of profiles each exhibit second profiles defining a raster of the structure in a second spatial direction, wherein the suspension elements are configured for being guided along the first profiles in the first spatial direction being defined by the structure, the vehicle's traveling motion having at least two degrees of freedom, and wherein the gearing wheel is configured for meshing with the second profiles, such that the crawler type vehicle can move omnidirectionally via the at least two individually controllable motors and drive units.

CM. Method of hanging/suspending a crawler type vehicle at/from a structure for traveling in a suspended manner headlong the structure, especially a crawler type vehicle according to one of items CA to CJ, wherein the vehicle is suspended by means of a plurality of suspension elements coupling the vehicle to the structure, wherein a circumferential guiding/driving motion is defined by first and second circumferential tracks having a different circumferential shape/contour, wherein the suspension elements are attached to the first circumferential track at predefined first longitudinal positions corresponding to a raster defined by the structure, wherein the vehicle is suspended such that it can move along the structure by decoupling a subset of the plurality of suspension elements from resp. coupling them into the structure when the suspension elements are guided along the circumferential tracks by the circumferential motion, wherein the circumferential motion is transmitted/transferred by the suspension elements momentarily engaging the structure; and/or wherein the circumferential motion is provided by first drive units, wherein at least two motors power the at least one first drive unit and at least one second drive unit enabling active two-dimensional travel of the crawler type vehicle.

CN. Computer program comprising instructions which, when the program is executed by a computer, cause the computer to execute steps of the method according to the method item in context with provision and control of the circumferential guiding/driving motion, especially by controlling the first motor connected to at least one first drive unit and controlling the second motor connected to the at least one second drive unit.

CO. Use of at least one crawler type drive unit accommodating first and second circumferential tracks having different circumferential shapes/contours, for hanging/suspending and actively driving a crawler type vehicle in order to travel in a suspended manner especially headlong at a structure via two motors, especially for hanging/suspending a crawler type vehicle according to one of items CA to CJ, especially in a method according item CM, wherein the vehicle is suspended by means of a plurality of suspension elements coupling the vehicle to the structure, wherein the suspension elements are attached to the first circumferential track at predefined first longitudinal positions corresponding to a raster defined by the structure, wherein a/the circumferential guiding/driving motion is provided by the first motor connected to the at least one drive unit such that the vehicle moves along the structure by decoupling a subset of the plurality of suspension elements from resp. coupling them into the structure when the suspension elements are guided/driven along the circumferential tracks.

DA. Crawler type ceiling unit according to any of items AA-AH, BA-BG, CA-CJ, wherein the crawler type ceiling unit is connected to a robotic arm.

DB. Use of at least one crawler type ceiling unit according to any of items AA-AH, BA-BG, CA-CJ, or DA for at least one of the following applications: healthcare, logistics, production, assembly, maintenance, transport, entertainment, construction.

BRIEF DESCRIPTION OF THE DRAWINGS

These and other aspects of the present invention will also be apparent from and elucidated with reference to the embodiments described hereinafter. Individual features disclosed in the embodiments can constitute, alone or in combination, an aspect of the present invention. Features of different embodiments can be carried over from one embodiment to another embodiment. In the drawings.

DETAILED DESCRIPTION

Figure 1A:
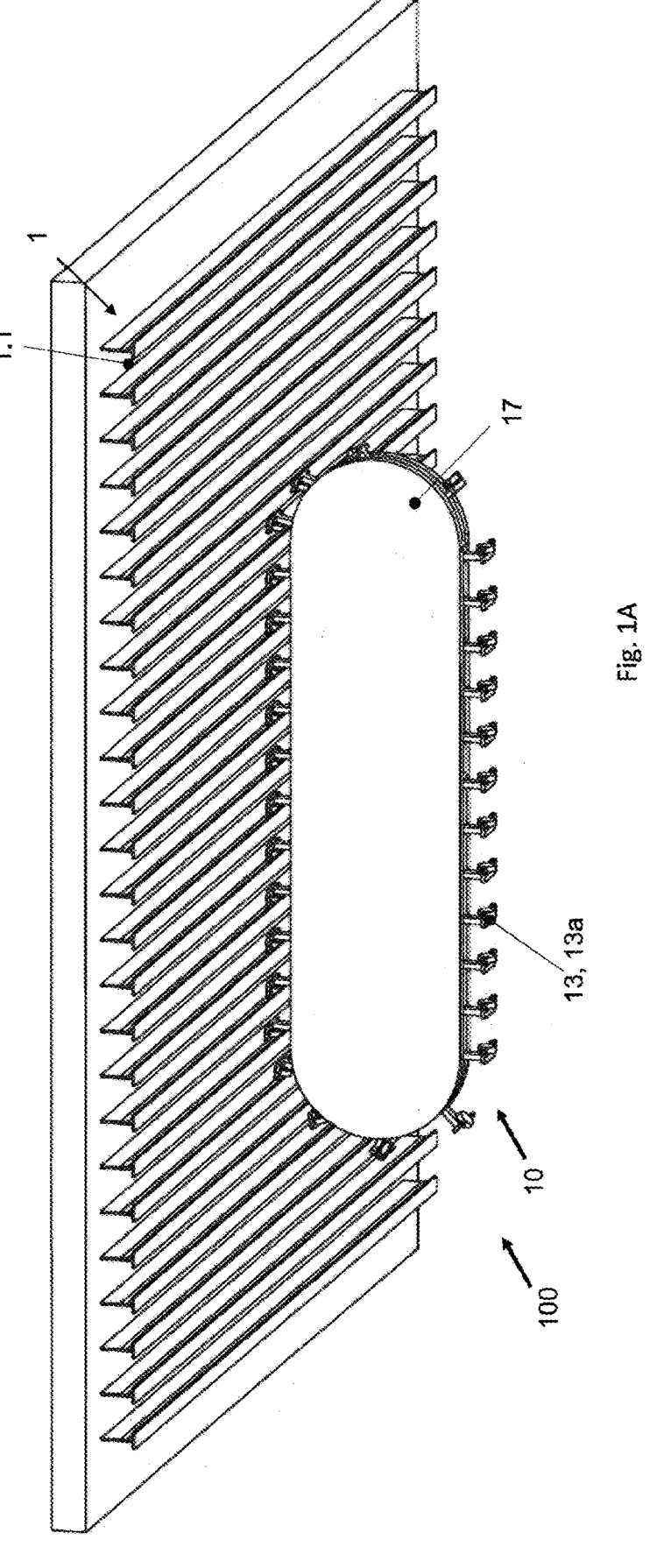
FIGS. 1A, 1B, 1C, 1D, 1E, 1F, 1G, 1H, 1J, 1K, 1L, 1M, 1N, 1O show in perspective views and in side views components of a crawler type ceiling unit resp. of the corresponding ceiling suspension arrangement according to one embodiment.

First, the reference signs are described in general terms; individual reference is made in connection with respective figures.

The present invention provides for a crawler type ceiling unit 10 having at least one chassis 17 resp. housing. The ceiling unit 10 is configured for moving/traveling along a ceiling structure 1 exhibiting a predefined structural regularity or raster 1*a* which is, e.g., defined by T-profiles resp. T-rails 1.1 or any such profile unit. The profile units 1.1 exhibit at least one wheel tread 1.2, and optionally, a power rail 1.3 providing for energy supply can be arranged at the profile units also. The ceiling unit 10 is coupled to the structure 1 and suspended via a plurality of suspension elements 13, 13*a*, 13*b* (e.g. each including at least one element of a closed loop or chain). A ceiling suspension arrangement 100 is composed of at least one ceiling unit 10 and at least one ceiling structure 1 (at least one type of ceiling structure).

The at least one chassis or housing 17 may provide for accommodation of a crawling or driving mechanism 11.1 (with or without motor(s) or actuator(s)) which allows for circumferential motion of the suspension elements 13 along circumferential tracks 12, namely simultaneously along a first and a second circumferential track 12*a*, 12*b*, which tracks exhibit individual shapes/contours XZa, XZb. Preferably, the tracks only extend two-dimensionally (2D), i.e. in a plane, and the shape is different at least in curved sections 12*r* of the tracks. Each track 12*a*, 12*b* exhibits a parallel/linear section 12*p* (resp. two parallel sections) and at least one redirection/curved section 12*r* (resp. two curved sections). A lateral area resp. surface shell of the at one chassis or housing is preferably flat, plane, even, respectively on each lateral side. Such a configuration is also favourable in view of interconnection of several chassis (side by side).

According to one embodiment, the ceiling unit 10 exhibits at least one further (second) chassis/housing exhibiting first and second circumferential tracks 12*a*, 12*b* and accommodating a plurality of further suspension elements 13*b* which are arranged mirror-inverted, with respect to the suspension elements 13 of the first housing. As an alternative, both types of suspension elements are arranged within the same housing (are part of the same chassis), and optionally, both types of suspension elements can be guided by the same pair of circumferential tracks. The chassis may (actively) provide for a traveling motion (e.g. by a synchronous guiding/driving motion of/to the suspension elements). Several chassis can be interconnected, e.g. via cross-beams or the like. Also, a first and a second chassis may provide for different driving motions, e.g. in order to force a non-linear, but curved/curvilinear traveling motion. The desired/required traveling motion can be controlled via a control unit 30 which can be coupled to at least one motor or actuator 11 (which is optional). In particular, the ceiling unit can be provided as a kind of passive vehicle which traveling motion is induced by external forces; in such a configuration, the inventive kinematics provide for suspending the ceiling unit (especially in predefinable positions), but not for actively driving the ceiling unit for any traveling motion. A drive section may also comprise at least one gear unit 18 configured for interacting with the track(s) and at least one energy storage unit 19. A sensor arrangement 40 exhibiting at least one sensing device 41, e.g. comprising position sensors 43 and velocity sensors 43 and/or weight sensors 43 and/or gyroscopes 43, may provide sensor data to the control unit.

Preferably, each suspension element 13, 13*a*, 13*b* exhibits a first pulley 13.1 and a second pulley 13.2, and optionally, a wheel 13.3 is provided at the free end of the suspension element 13 (bearing point P13). The first and second pulleys are arranged on a lever arm 13.5 in distance from/to each other (y-offset, longitudinal extension y13 of lever arm); the bearing point P13 resp. the wheel 13.3 is arranged at a protruding section resp. suspension arm 13.6 (z-offset). At the free end of the suspension arm, optionally, a current collector resp. power-slider 13.4 (conductive slider for energy transfer) is provided in an arrangement geometrically corresponding to a/the power rail 1.3 of the respective profile unit 1.1. The plurality of suspension elements 13 of a/the respective chassis 17 can be interconnected via longitudinal connecting elements 15 which can ensure a closed loop 15*a* of interrelated suspension elements. The suspension elements 13 are coupled to the respective circumferential tracks.

In other words: The suspension elements preferably exhibit a wheel 13.3 performing a rolling motion on the profile units of the ceiling structure, allowing for a motion which is orthogonal to the motion predefined and evoked by the tracks, wherein the wheel is positioned and aligned orthogonally with respect to the first and second pulleys. Optionally, the wheel can be motorised e.g. by means of further actuators or motors. The first pulley 13.1 is engaged with the first or second circumferential track, thereby following the contour defined by said track; also, the second pulley 13.2 is engaged with the first or second circumferential track, thereby following said track (which is different from the track engaged by the first pulley, i.e. vice versa). Lever arm 13.5 is preferably L-shaped, especially provided as integral element in one piece (massive, solid).

Preferably, the ceiling structure 1 and its raster 1*a* is defined by profile units 1.1 being arranged in parallel and with similar distance (pitch) to adjacent profile units. Each profile unit is preferably configured to support geometries/surface(s) which are adequate for interaction with the wheel(s) of the suspension elements (e.g. T-profile, C-profile, L-profile, 1-profile), and a series of such profile units preferably provides for a planar surface at least in sections.

By means of the circumferential tracks and the suspension elements, the (respective) chassis and the kinematics defined by the shape of the tracks provide for decoupling kinematics 20 which ensure both vertical motion kinematics and non-circular pivot motion kinematics. Thereby, de-/coupling of each suspension element can be effected via circumferential motion along the tracks without the need of any axial telescopic motion within each suspension element. I.e., the respective suspension element can be designed as purely mechanic unit.

In particular, in context with logistic tasks, the ceiling unit 10 may exhibit at least one hoist unit 50 providing for a traction mechanism 51 (especially with rope winch) and having at least one transmission means 53 (especially a rope).

In the following, the kinematics provided by the guiding/driving motion along the circumferential tracks is described in general, first:

The first pulley 13.1 of each suspension element 13 rotates about a first pulley axis and defines a first guiding point G13.1 (coupling the first track and the respective suspension element), and vice versa, the corresponding point of the corresponding circumferential track defines that first guiding point G13.1 for each suspension element. Likewise, the second pulley 13.2 of each suspension element 13 rotates about a second pulley axis (which is preferably aligned in parallel) and defines a second guiding point G13.2 (coupling the second track and the respective suspension element). When referring to the kinematics of each suspension element, an instantaneous centre of rotation of each suspension element is defined by the axis of the first pulley 13.1 being coupled to the first track 12*a*, wherein coupling/attachment/fixation can be ensured e.g. at the axial section between a/the suspension arm 13.6 and the first pulley 13.1 (cf. FIG. 3B). The two tracks 12*a*, 12*b* are arranged with respect to another in such a manner that the contacting/bearing point/area P13 (coupling point) of the respective suspension element 13 can be hooked or hitched on the ceiling structure. According to a preferred arrangement, the wheel 13.3 of each suspension element rotates about a wheel axis which is preferably aligned orthogonally to the first and second pulley axis. Since each suspension element 13 is coupled to the tracks 12*a*, 12*b* in predefined positions, namely in a predefined first longitudinal position y12*a* via the first pulley 13.1 and in a predefined second longitudinal position y12*b* via the second pulley 13.2, when driving the tracks resp. when guiding the suspension elements along the tracks, the bearing point P13 at the free end of the suspension element 13 is guided according to the relative position/contour and distance of the corresponding tracks (of a pair of tracks guiding the respective suspension element).

The ceiling unit 10 may exhibit a control unit which can be a decentral (individual) control unit 31 (e.g. in an arrangement comprising a plurality of ceiling units each exhibiting an individual control unit). The ceiling suspension arrangement 100 may also comprise a central control unit 30.

Further, a respective ceiling unit 10 may exhibit a communicating unit 35 (e.g. near filed, mobile network, LAN, LP-WAN, SigFox, NBIOT) and/or a transmitter 36 (active or passive), especially for transmitting locating signals. These components are configured to interact in/with a positioning system 45.

The ceiling unit 10 can be configured to carry at least one external load 60 (especially object or individual) which can be attached to the ceiling unit 10 in an attachment point P60. Optionally, the attachment point P60 is provided by a hoist unit 50 resp. by transmission means 53 (rope) of the hoist unit 50. The external load 60 may comprise or consist of a package 61 (e.g. including consumables, food, postal items). The external load 60 may further comprise an identification feature 71, especially a code (e.g. including a number). Likewise, each ceiling unit 10 may comprise an identification feature 70, especially a code (e.g. including a number).

A digital twin 80 referring to a respective ceiling unit 10 and/or a digital twin 81 referring to a respective package 61 (or external load 60) can be stored in a database 82. The database is configured for storing and accessing the at least one digital twin at least comprising information of momentary status, wherein the ceiling suspension arrangement is configured to define at least one control parameter for individual crawler type ceiling units based on information of the at least one digital twin.

In the figures, (x) designates a/the first spatial direction (especially cross direction, especially direction of longitudinal extension of profile units), and (y) designates a/the second spatial direction (especially longitudinal direction or momentary driving direction of the ceiling unit), and (2) designates a/the third spatial direction (especially vertical direction).

FIG. 1A shows a ceiling unit 10 exhibiting at least one chassis 17 and suspension elements 13, wherein a subset of the suspension elements 13 is momentarily coupled to a/the ceiling structure 1, namely to T-profiles (profile units 1.1). The suspension elements 13 are guided (and optionally also actively driven) along two circumferential tracks (not shown, cf. FIG. 1C), and de-/coupling is carried out in curved sections of circumferential tracks.

The ceiling unit 10 shown in FIG. 1A is suspended (hanging) at a ceiling structure. Nonetheless, the unit or vehicle 10 may also be suspended in a similar structure being arranged on the ground or at the wall. The unit is not necessarily provided in the form of a ceiling vehicle but is configure for being used/implemented as a ceiling crawler; thus, FIG. 1A illustrates an application/use at a structure which extends at a ceiling.

Figure 1B:
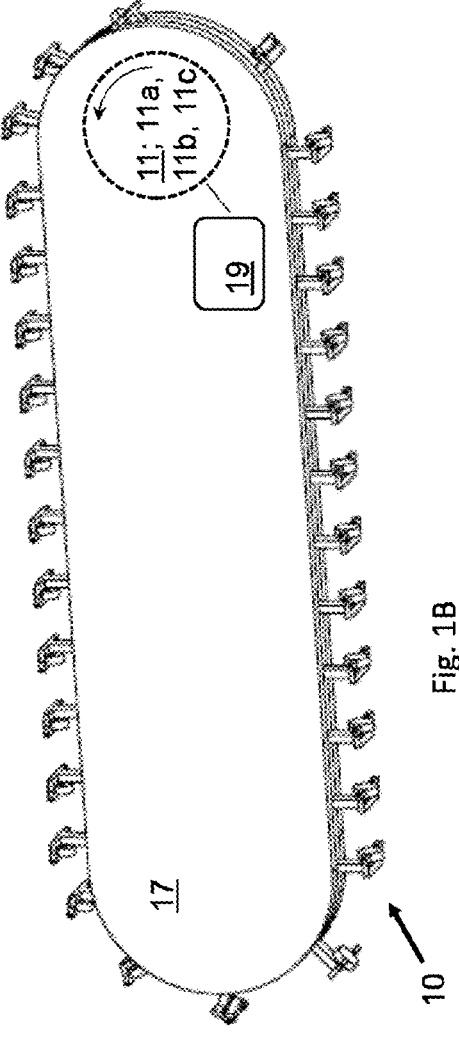
Figure 1C:
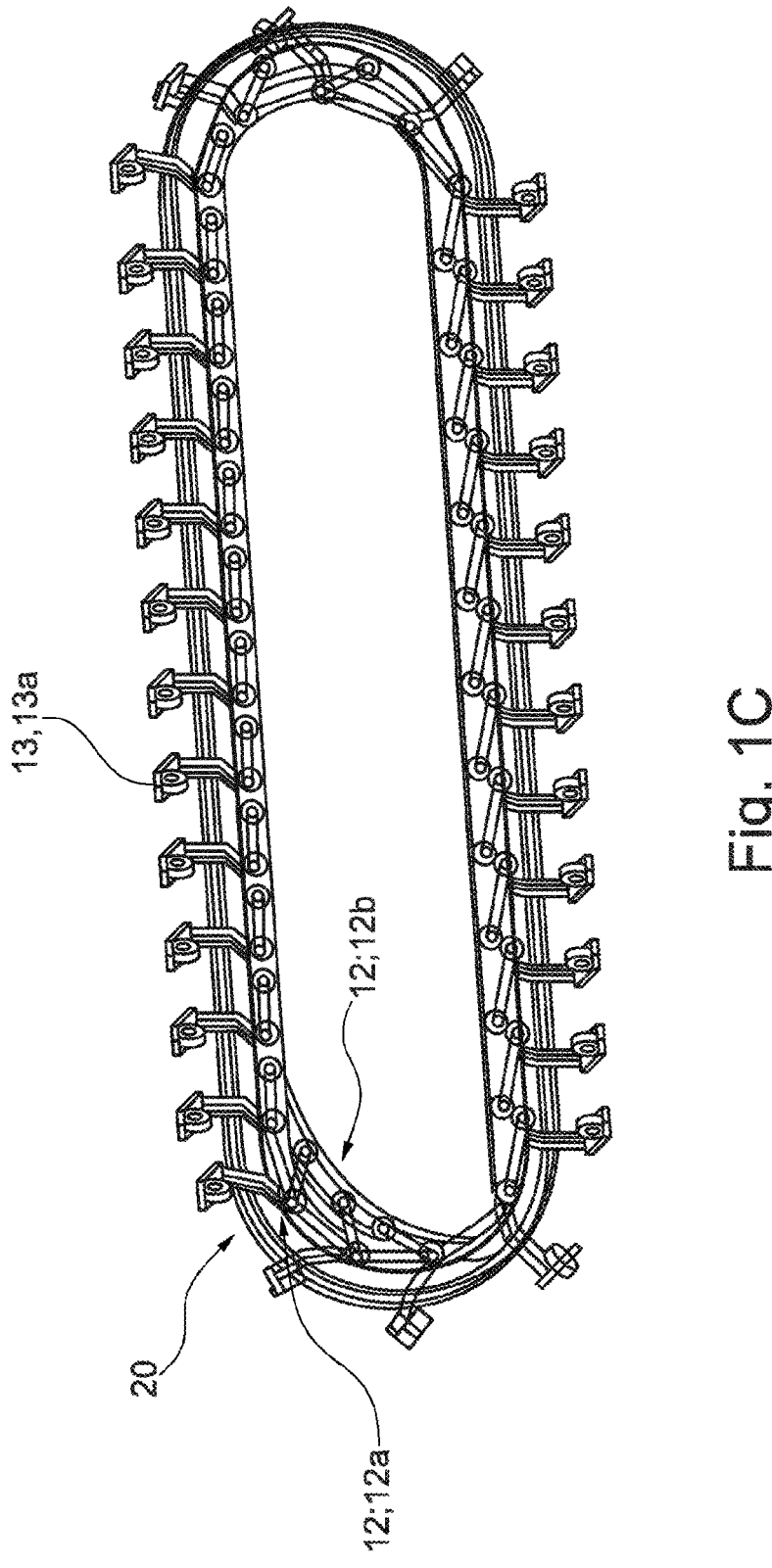
Figures 1D, 1E:
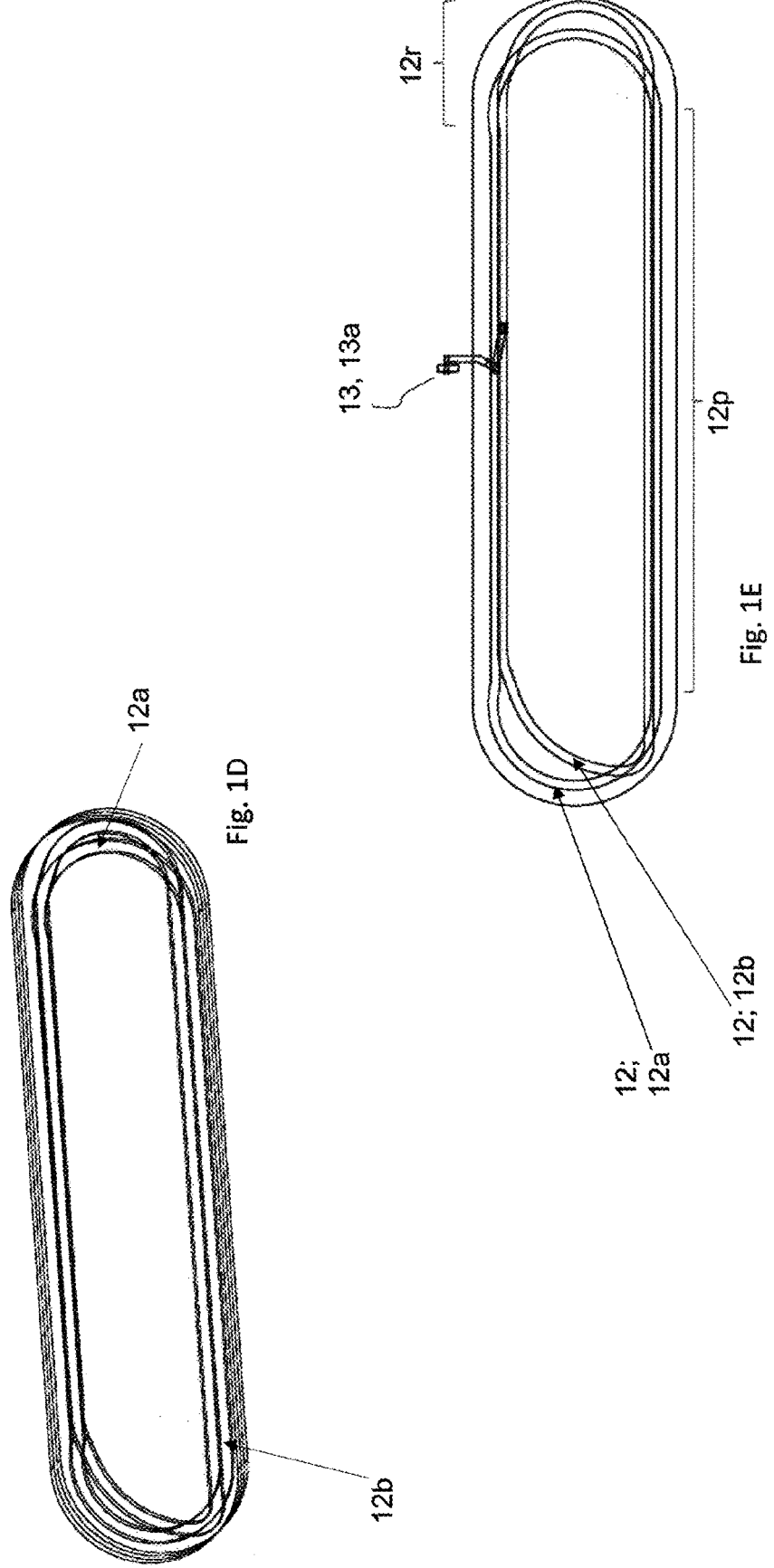

FIG. 1B, IC, 1D, 1E show separate components of respective chassis units 17. At least one drive unit 11 or drive 11*a*, 11*b*, 11*c* (which is optional, i.e., which can be provided if active driving motion to the suspension elements is desired) provides for circumferential motion of the tracks 12*a*, 12*b* (or of the suspension elements interconnected to form a closed loop which is driven along the tracks), especially by means of at least one gear unit 18 engaging the tracks or any chain or traction means providing said closed loop. It is shown that the de-/coupling kinematics are provided within the curved sections 12*r* of the first and second circumferential tracks 12*a*, 12*b*. In contrast, within the parallel section(s) 12*p*, the suspension elements 13 remain in predefined relative positions at/with respect to the ceiling structure. In that section, the axis of the wheel 13.3 of the respective suspension element 13 is aligned parallel to the parallel section(s) 12*p* of the tracks. For example, the ceiling unit 10 comprises three chassis 17 each exhibiting at least one drive, wherein these drives can be controlled by one single drive unit. Alternatively, the ceiling unit 10 comprises two or three chassis 17 and exhibits only one single drive or drive unit, wherein a circumferential motion can be coupled to involve several chassis.

Figure 4A:
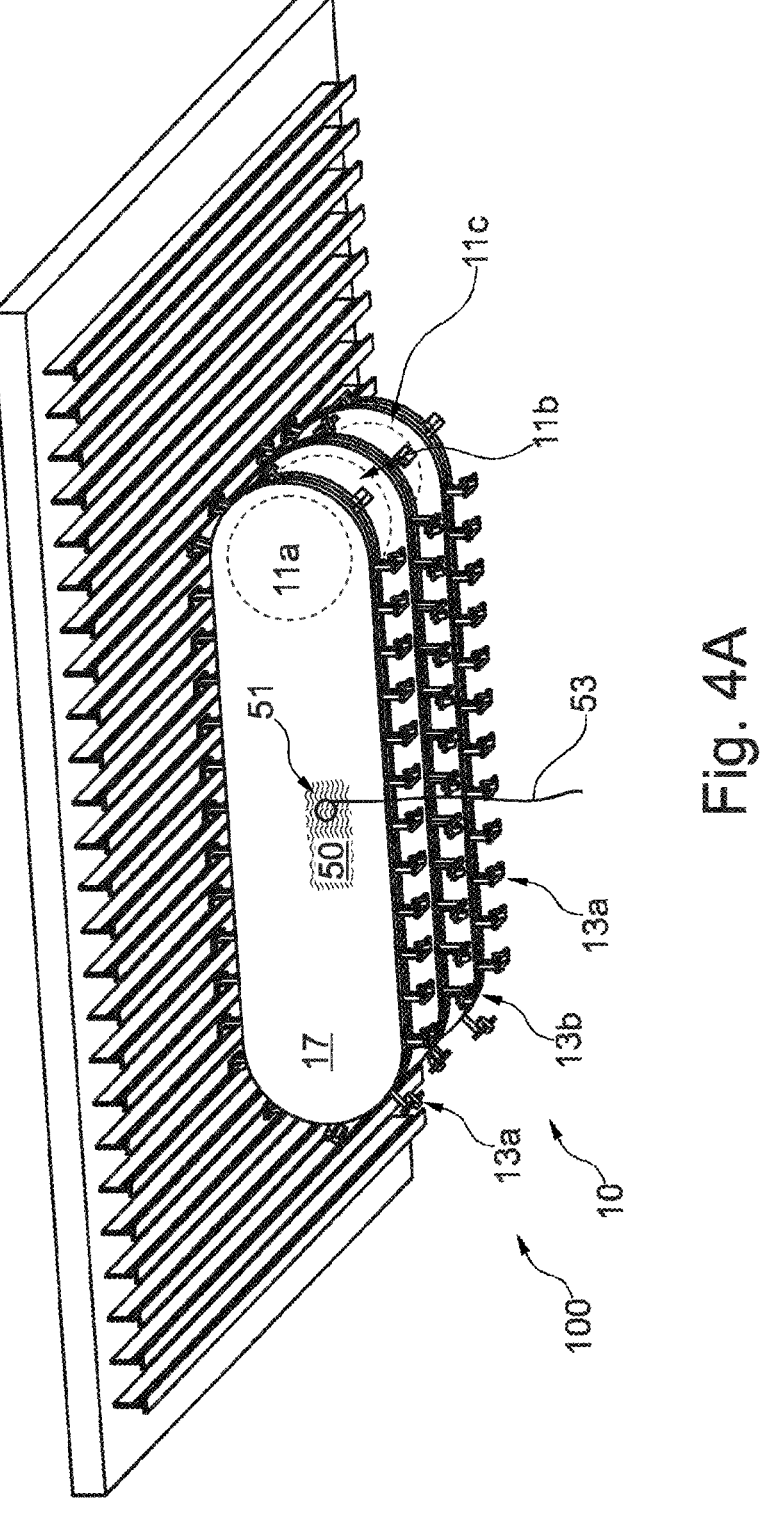
FIGS. 4A, 4B, 4C, 4D, 4E, 4F, 4G show in perspective views and in side views components of a ceiling unit according to a further embodiment.

In case the ceiling unit exhibits several chassis, some of these components may also be arranged in a mirror-inverted manner, especially the suspension elements (cf. FIG. 4A). Thus, any detailed description of the figures relating to any separate/single component of the respective drive unit may also describe a similar configuration of any further drive units or any further redundant components.

Figure 1F:
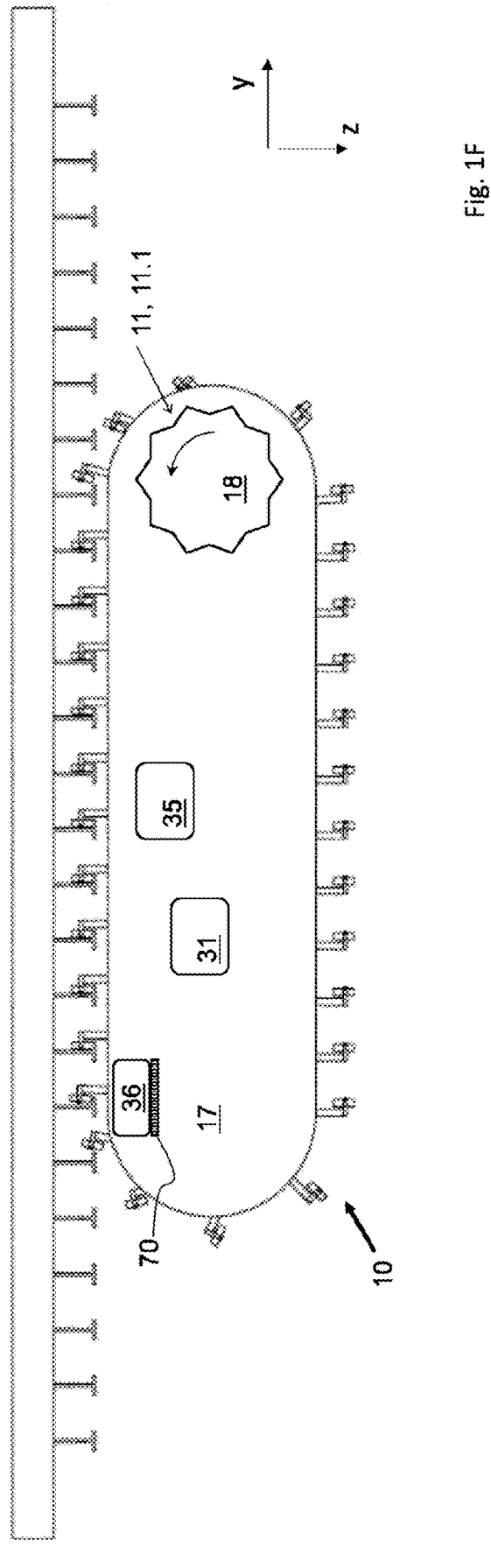
Figure 1G:
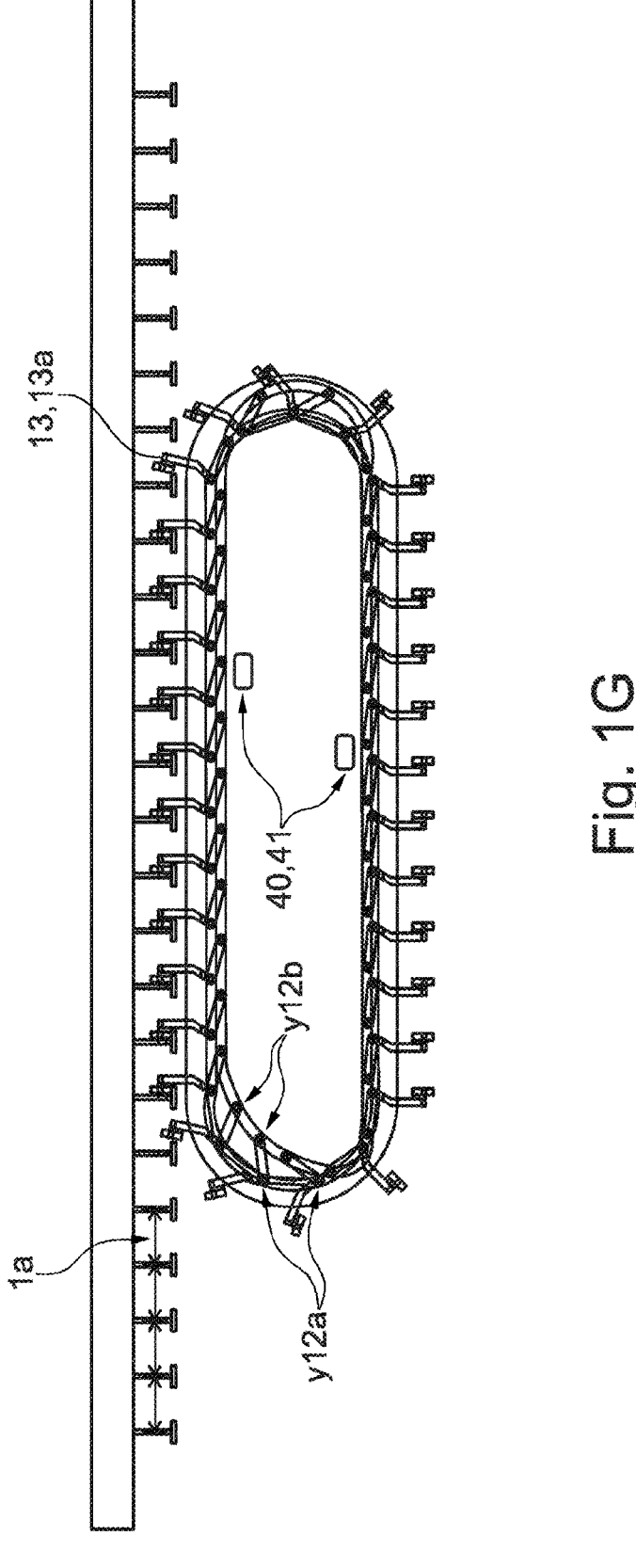
Figures 1H, 1J, 1K, 1L, 1M, 1N, 1O:
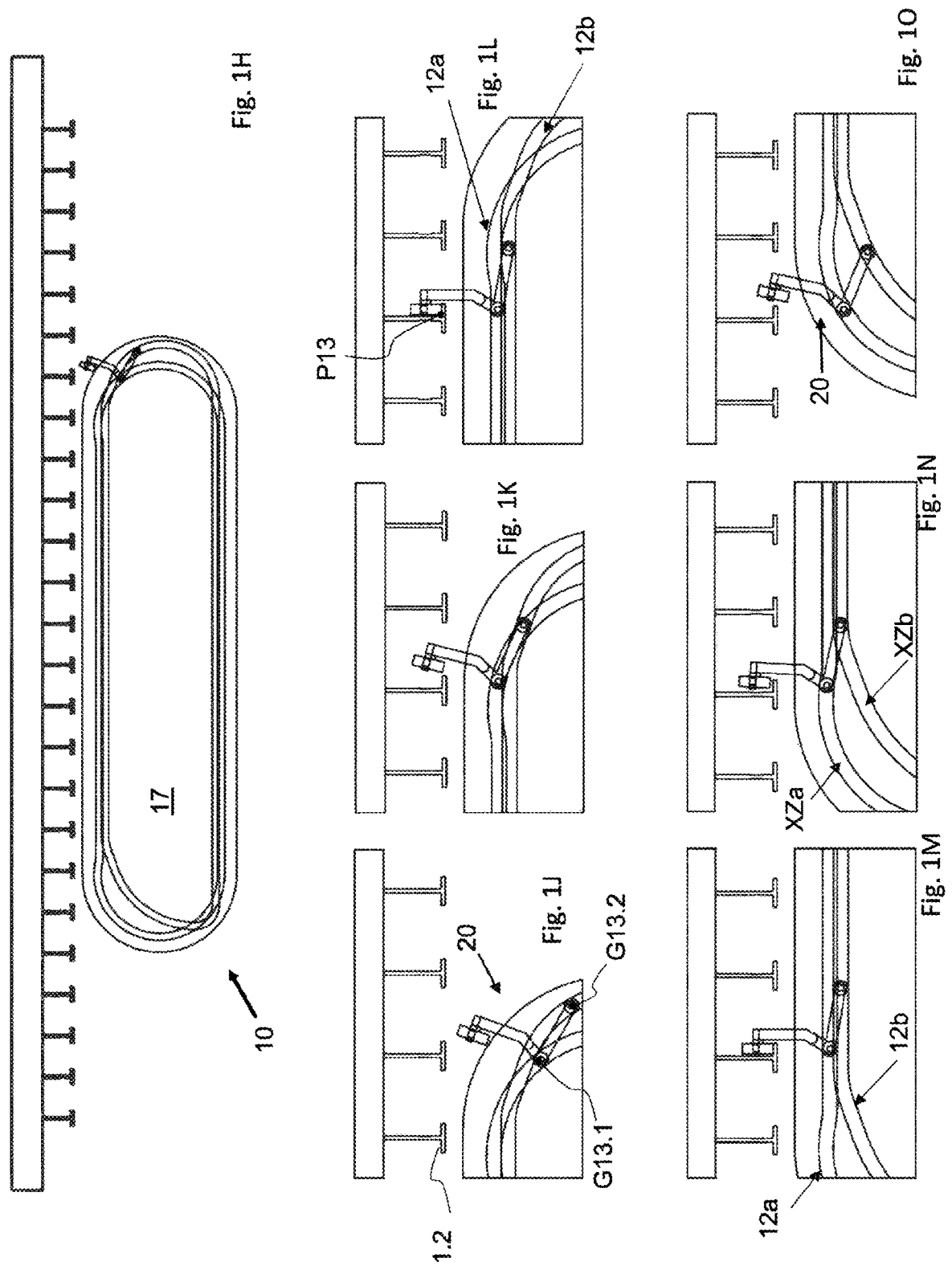

FIG. 1F, 1G illustrate the curved sections 12*r* in more detail; it can be seen that both the radius of curvature and the distance of the tracks with respect to each other deviates/changes in value and direction, thereby effecting a pivot motion of the suspension arm 13.6 (protruding section) and the wheel 13.3 resp. bearing point P13 of the respective suspension element 13 (especially pivoting within the plane yz as shown in FIG. 1F and pivoting about an x-axis and around the instantaneous centre of rotation Or). Thus, both vertical motion kinematics and non-circular pivot motion kinematics can be provided by means of rigid/stiff components being guided/driven along two circumferential tracks with different shape/contour.

FIG. 1H, 1J, 1K, 1L, 1M, 1N, 1O show some more details of the de-/coupling kinematics 20. In particular, it can be seen that the first track 12*a* has a curvature bent up (upwards), thereby effecting a slight lifting of the wheel 13.3 from the wheel tread 1.2, namely when the first pulley 13.1 is passing that section. In particular, apart from one single section, the shape/contour XZb of the second circumferential track 12*b* runs (is arranged) within the shape/contour XZa of the first circumferential track 12*a*.

Figure 2B:
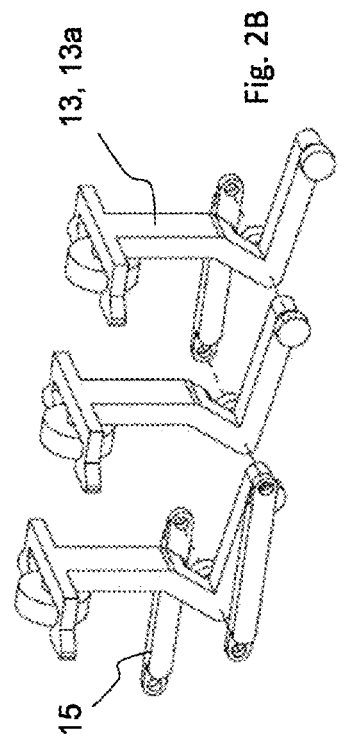
FIGS. 2A, 2B, 2C show in perspective views an arrangement of suspension elements and respective arrangement along a circumferential track of a ceiling unit according to one embodiment.
Figure 2A:
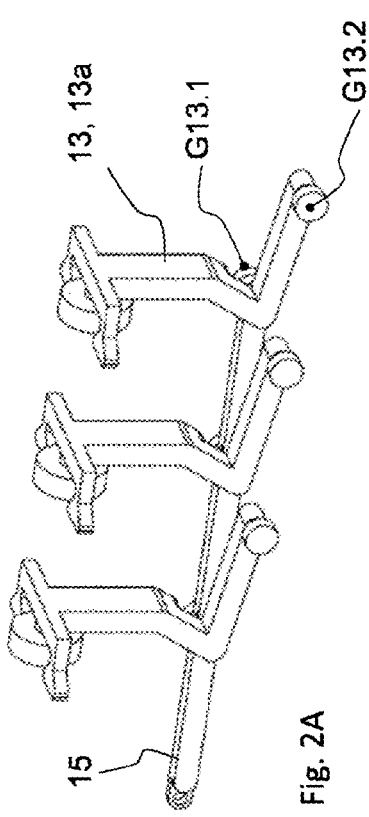
Figure 2C:
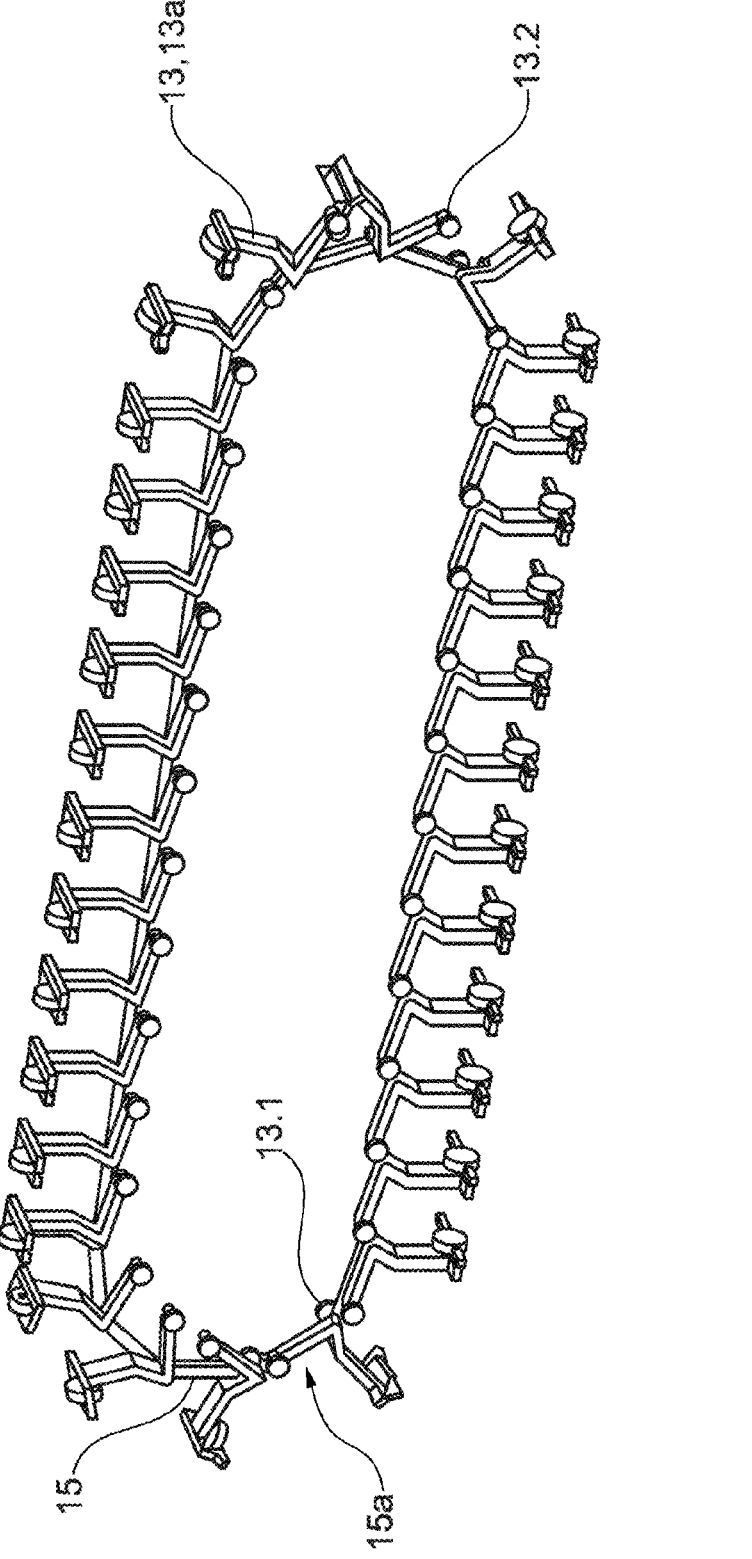

FIG. 2A, 2B, 2C show a plurality of suspension elements 13 being interconnected via longitudinal connecting elements 15 which thereby ensure a closed loop 15*a* of interrelated suspension elements. The suspension elements 13

(13a, 13b) are coupled to the respective circumferential tracks 12a, 12b via the first and second pulleys 13.1, 13.2.

In the embodiment shown in FIG. 2, the first and second pulleys 13.1, 13.2 are arranged on opposite lateral sides of the respective suspension element 13. Thus, the closed loop 15a of interrelated suspension elements is arranged between the first and second tracks 12a, 12b which extend on both lateral sides of the closed loop 15a.

The tracks 12a, 12b can be made of any kind of rail guide system components, in particular including at least one chain, belt, cable or the like traction or transmission means. The tracks 12a, 12b may comprise different guide/rail sections coupled together, each exhibiting a different radius of curvature or being linear. Also, the tracks 12a, 12b can be formed/made by on single continuous/coherent rail.

Figures 3A, 3B, 3C:
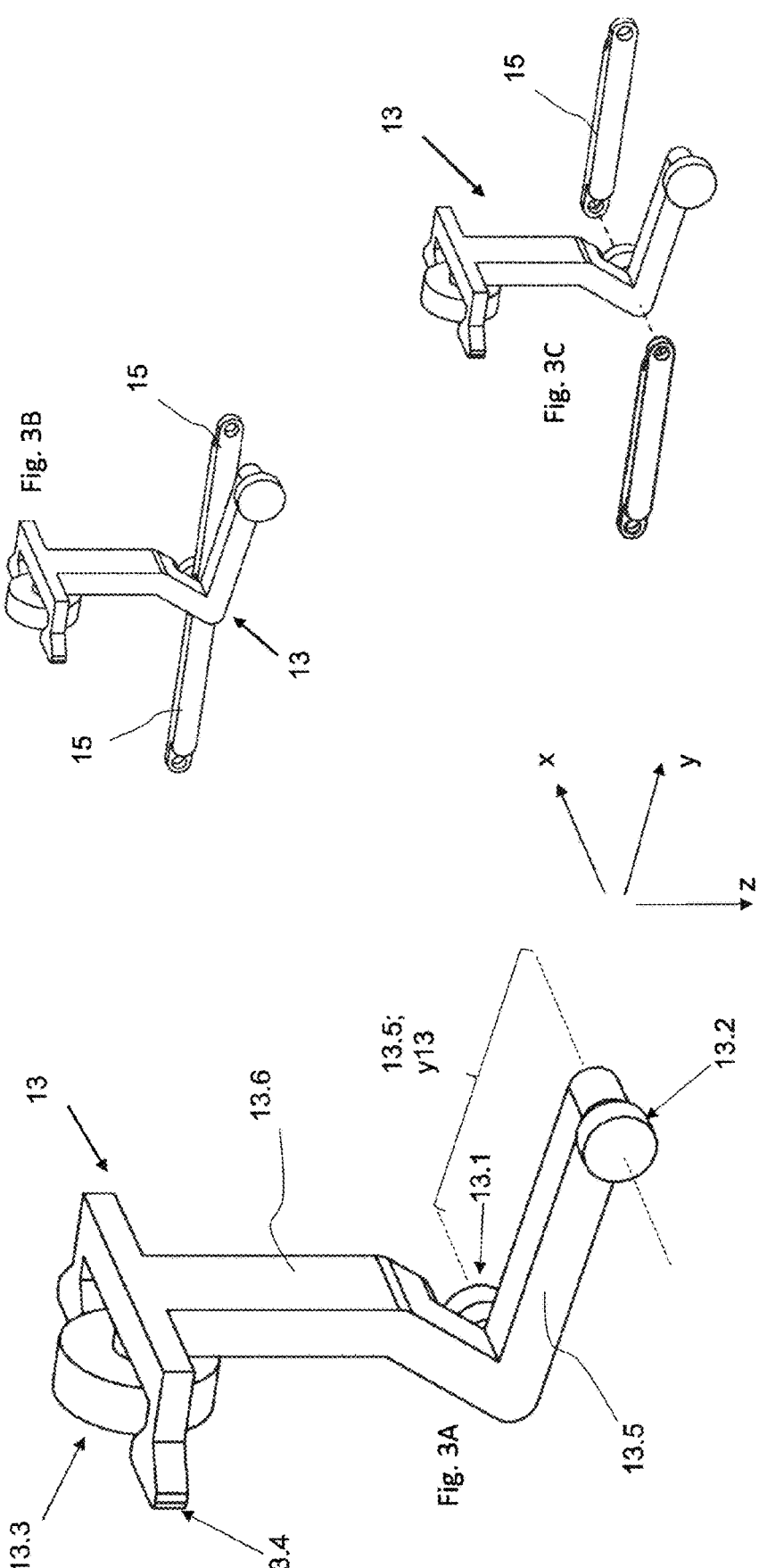
FIGS. 3A, 3B, 3C show in perspective views details of suspension elements of a ceiling unit according to one embodiment.

FIG. 3A, 3B, 3C show some more details of the suspension elements 13 and the connecting elements 15. E.g., the connecting elements 15 are coupled to the lever arm 13.5 at the axis of the first pulley 13.1, thereby facilitating pivot motion about that axis (resp. around the respective instantaneous centre of rotation Cr).

FIG. 4A, 4B, 4C, 4D, 4E, 4F, 4G show an embodiment of a ceiling unit 10 exhibiting three chassis 17 each exhibiting a drive unit 11a, 11b, 11c providing for circumferential driving motion of the suspension elements along the tracks, wherein the chassis can be interrelated/connected e.g. via cross-beams or the like.

Figures 4B, 4C, 4D, 4E, 4F:
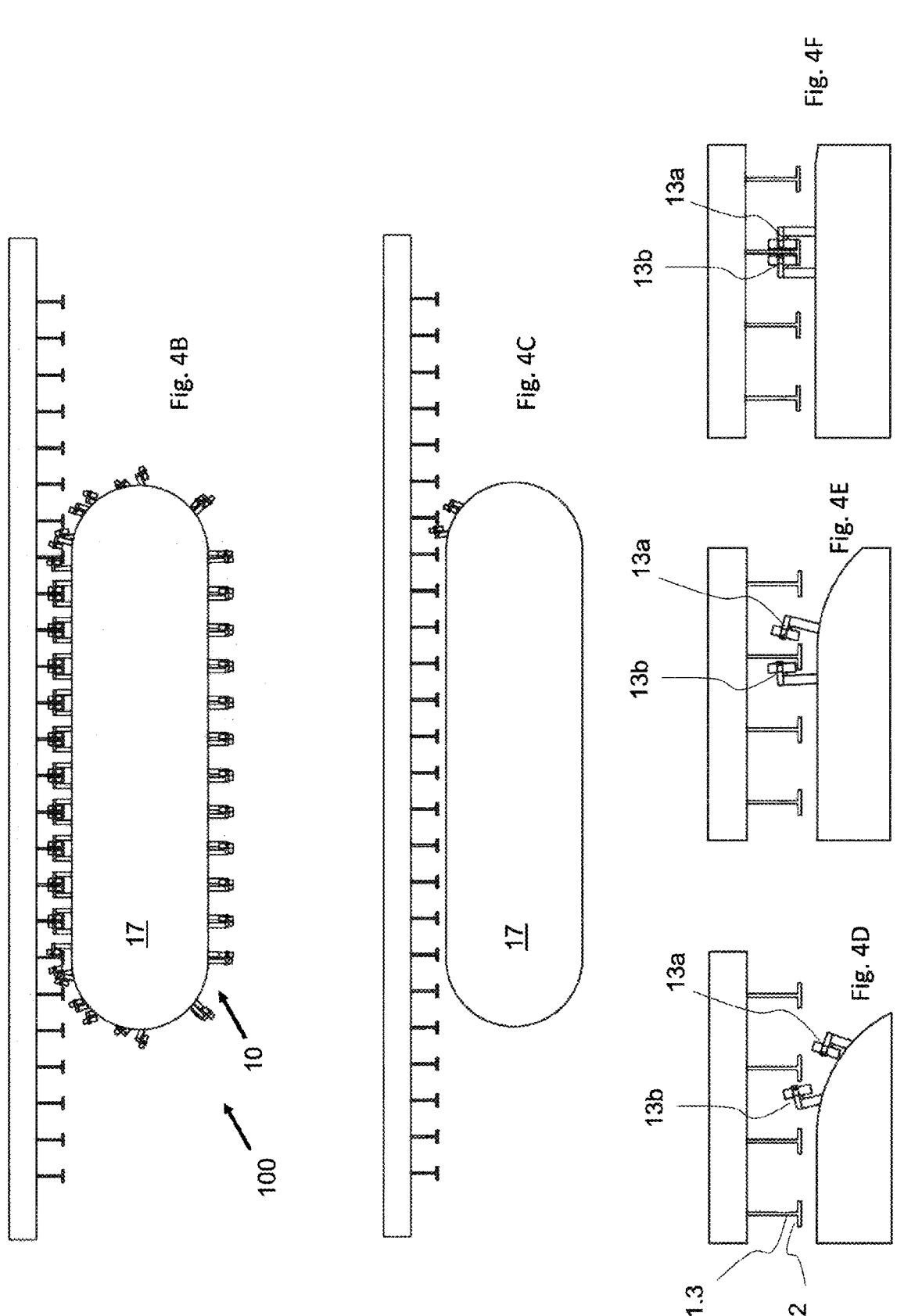
Figure 4G:
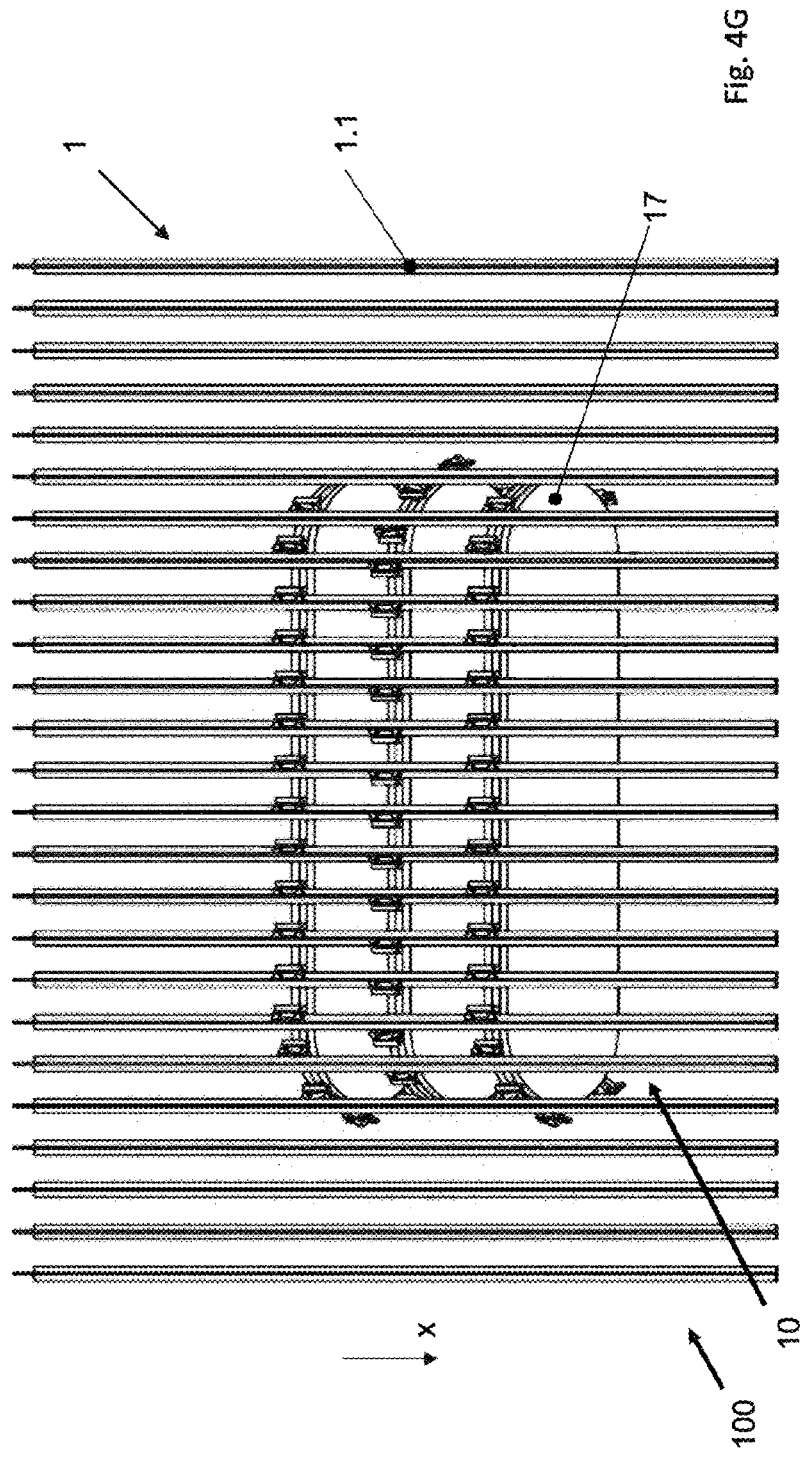
Figures 5A, 5B, 5C, 5D:
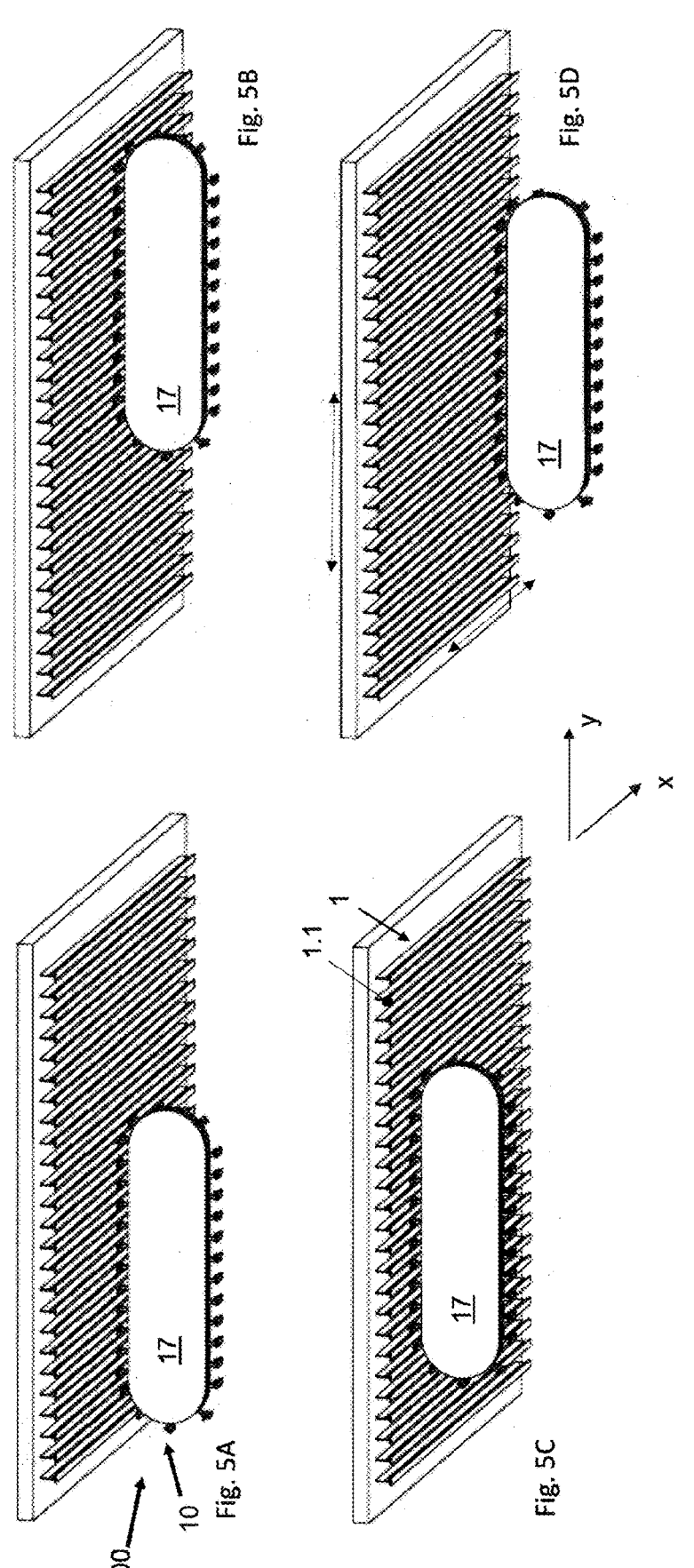
FIGS. 5A, 5B, 5C, 5D illustrate in different perspective views an exemplary path of a motion of a ceiling unit according to one of the embodiments.

Alternatively, one central drive unit may drive the suspension elements of all three chassis. In contrast to the configuration at the first chassis, the suspension elements 13b of the second chassis are arranged in mirror-inverted manner, but the suspension elements 13 of the third chassis are arranged in the same manner as the suspension elements 13 of the first chassis. As can be seen in FIG. 4E, 4F, that configuration allows for a really good security and stability level (both types of suspension elements 13, 13b are guided along the T-profiles, but on different lateral sides of the T-profiles). Alternatively, the ceiling unit 10 may only comprise two chassis.

FIG. 5A, 5B, 5C, 5D show different kinds of traveling motions which can be effected by means of the ceiling unit 10 described herein. As already described further above, the present invention allows for two-dimensional traveling motion both in a first spatial direction (x) corresponding to the longitudinal direction/extension of the T-profiles 1.1 (dashed line arrow), and in a second spatial direction (y) corresponding to the driving direction resp. to the direction/extension of the tracks (dotted line arrow).

It should be mentioned that the T-profiles (profile units) shown in the figures may also be provided as other kinds of profile rails; i.e., the inventive mechanism/kinematics is/are not limited to use of T-profiles only; rather, the skilled person is aware of the fact that also other profiles offering adequate suspension for the suspension elements and optionally also a guiding track to the wheels can be used.

In the following, further aspects/details of embodiments of the present invention are described in more detail. For any reference signs or elements/components or aspects not explicitly mentioned/described, it is referred to above mentioned embodiments, respectively. The embodiments described in the following passages exhibit two or three chassis and at least one drive unit comprising a chain drive, and the first circumferential track comprises a chain (with a closed loop of interrelated chain elements arranging the corresponding suspension elements and optionally also arranging counter bearing elements), and the longitudinal connecting elements are provided in the form of chain elements.

Figure 6B:
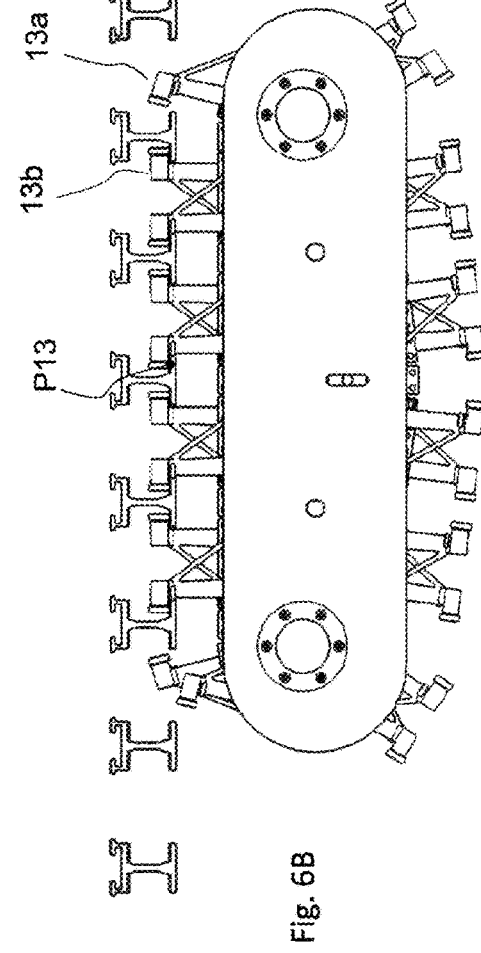
FIGS. 6A, 6B show, in side views, components of a ceiling unit according to two further embodiments (full suspension, and suspension with respect to vertical forces of inertia and lateral forces)
Figure 6A:
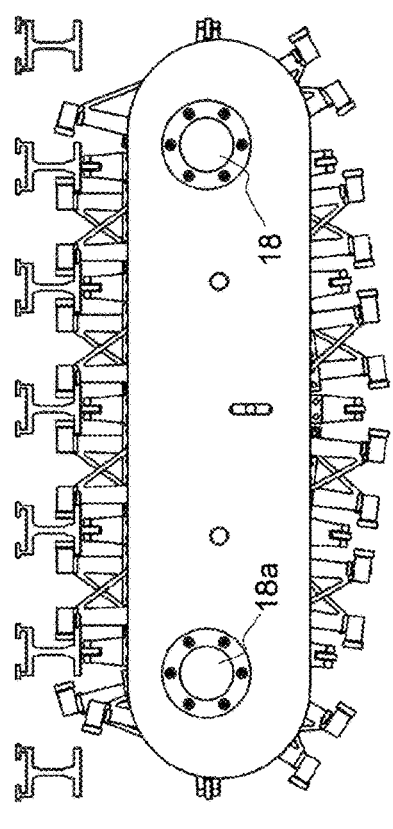

FIG. 6A shows a ceiling unit exhibiting means for avoiding any relative motion of the ceiling unit with respect to the structure (full suspension especially also in view of any relative motion orthogonally/normally with respect to the structure), and FIG. 6B shows a configuration which at least ensures secure the suspension in view of vertical forces of inertia and lateral forces (suspension devoid of counter bearings).

Figures 7A, 7B:
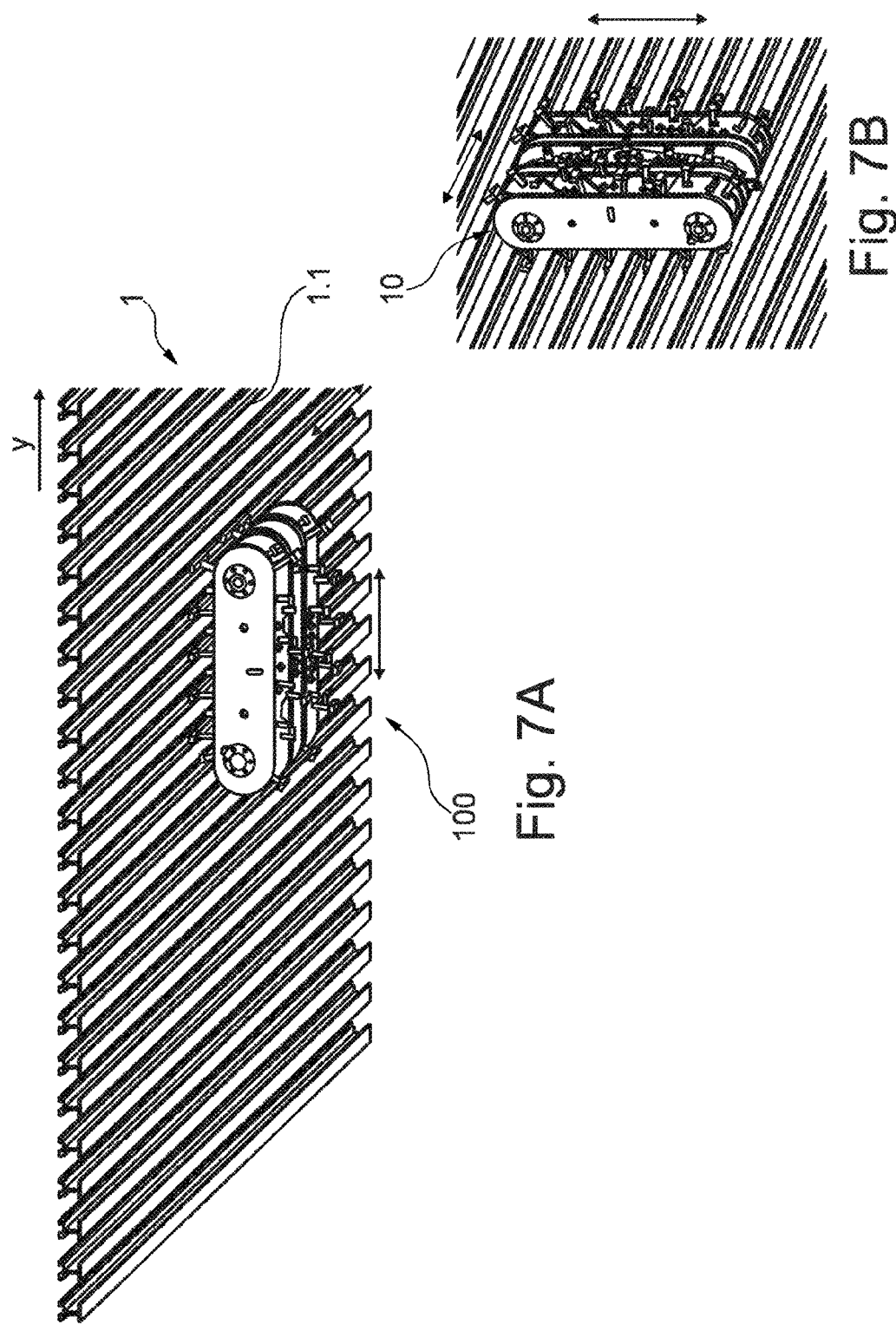
FIGS. 7A, 7B, 7C, 7D illustrate in different perspective views exemplary paths of motion (orientations of operation) of a ceiling unit according to one of the embodiments.
Figure 7D:
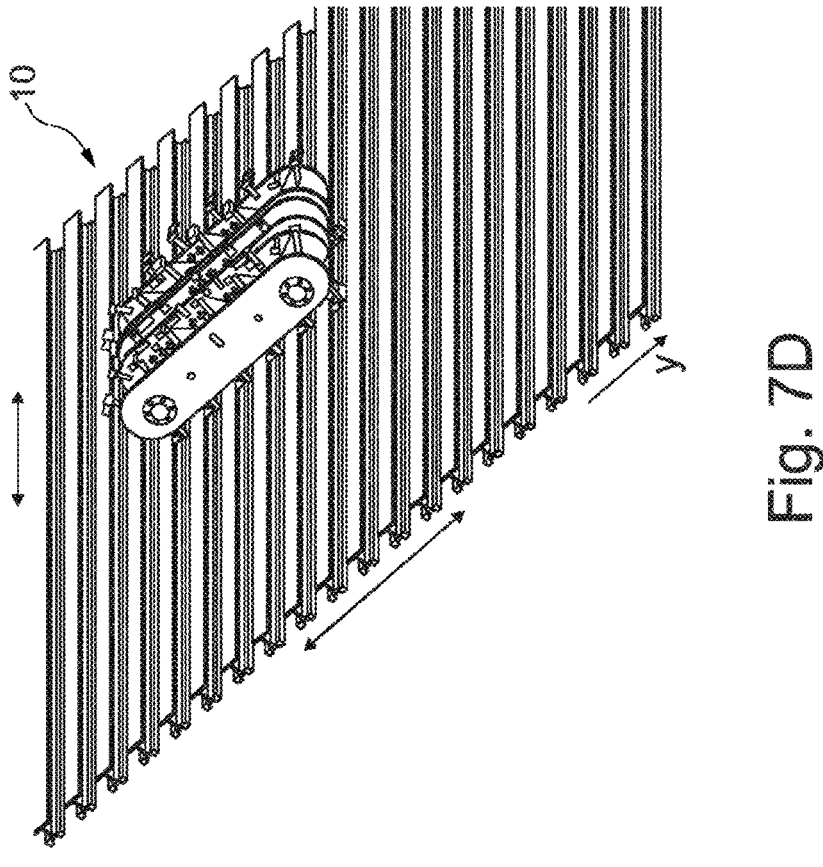
Figure 7C:
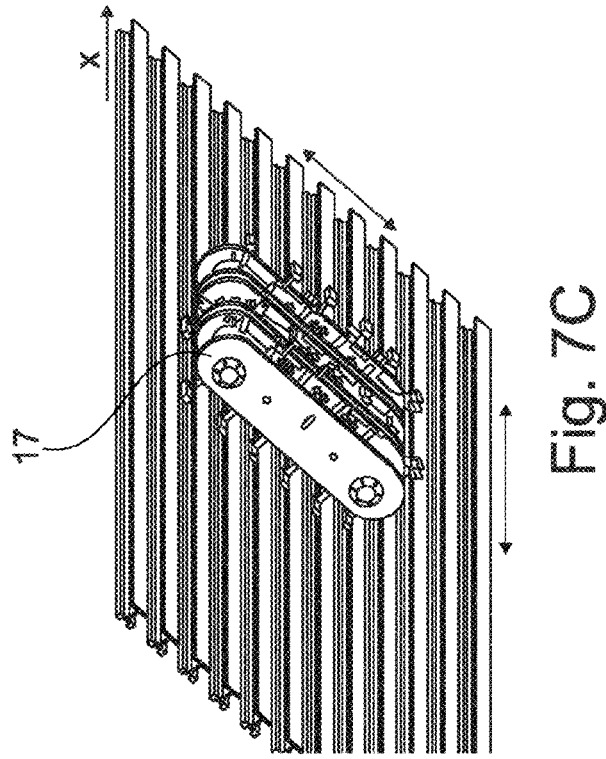

FIGS. 7A, 7B, 7C, 7D illustrate a ceiling suspension arrangement 100 comprising a ceiling unit 10 exhibiting three chassis. As already described further above, the present invention allows for two-dimensional traveling motion both in a first spatial direction corresponding to the longitudinal direction/extension of the T-profiles 1.1 (dashed line arrow), and in a second spatial direction corresponding to the driving direction resp. to the direction/extension of the tracks (dotted line arrow). Depending on the orientation of the structure resp. of the T-profiles 1.1, the first and/or second spatial direction may also comprise a vertical (z-) component, as illustrated in FIG. 7C, 7D (inclined plane/level). Therein, coordinates x, y shown in the figures in context with inclined planes refer to the longitudinal extension (x) of the (ceiling) structure.

The ceiling unit 10 shown in FIG. 7A is suspended at a ceiling structure. Nonetheless, the ceiling unit 10 may also be suspended in a similar structure being arranged on the ground or at the wall; thus, FIG. 7A illustrates an application/use at a ceiling structure. Same applies for any further figure of the present disclosure illustrating an application/use at a ceiling structure only as an example.

Figures 8A, 8B:
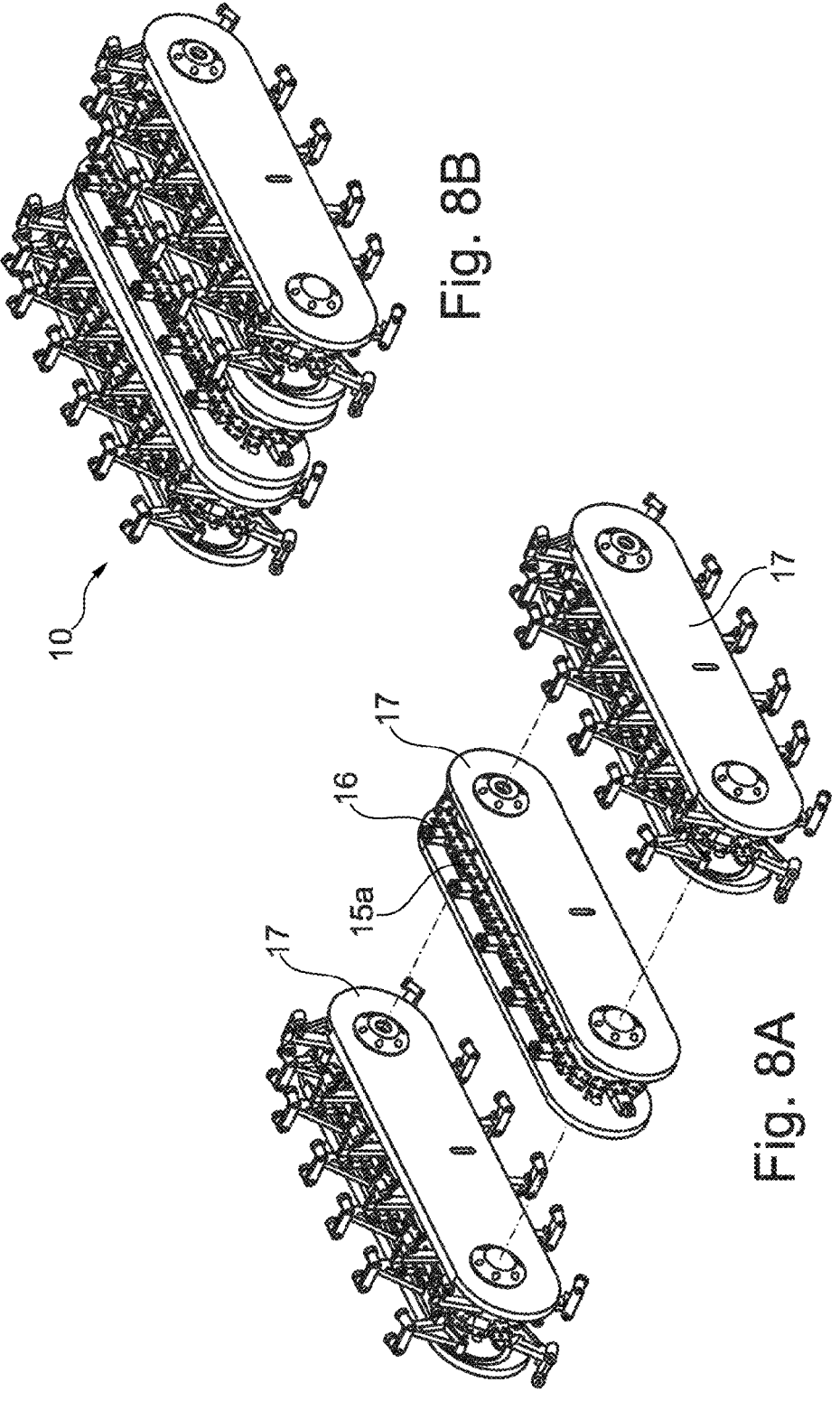
FIGS. 8A, 8B, 9A, 9B show in perspective views ceiling units according to further embodiments (with and without counter bearing)
Figures 9A, 9B:
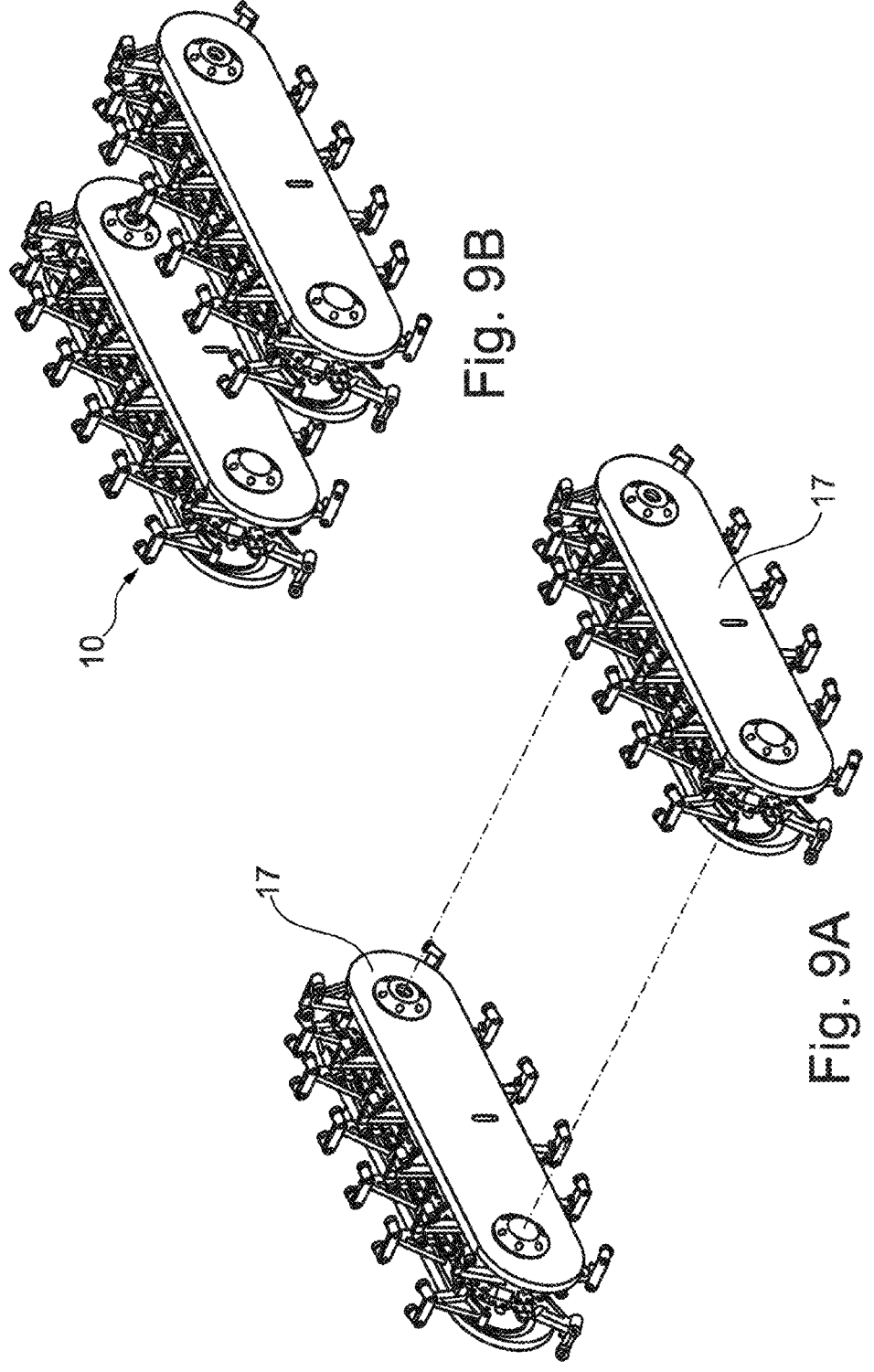

FIGS. 8A, 8B show some more details of a ceiling unit 10 exhibiting three chassis 17 arranged laterally with respect to each other, wherein the chassis arranged there between (in the middle) does not exhibit any suspension elements but counter bearings 16, and FIGS. 9A, 9B show some more details of a ceiling unit 10 exhibiting two chassis 17 (each without counter bearing). In the embodiment shown in FIG. 8, the second chassis provides for counter bearings 16 which are coupled to the chain 15a, i.e., the first circumferential track provides for positioning and motion (resp. path of motion) of the counter bearings 16. It should be noted that in the embodiment shown in these figures, theses counter bearings 16 are intended for interfering with the structure only at a face side, and therefore, no de-/coupling kinematics are provided in context with these counter bearings 16. Therefore, there is no need for provision of any further second circumferential track at/for the second chassis arranged in the middle. Thus, in this embodiment, the second chassis arranged in the middle and accommodating (only) the counter bearings only exhibits a/the first circumferential track.

Figures 10A, 10B:
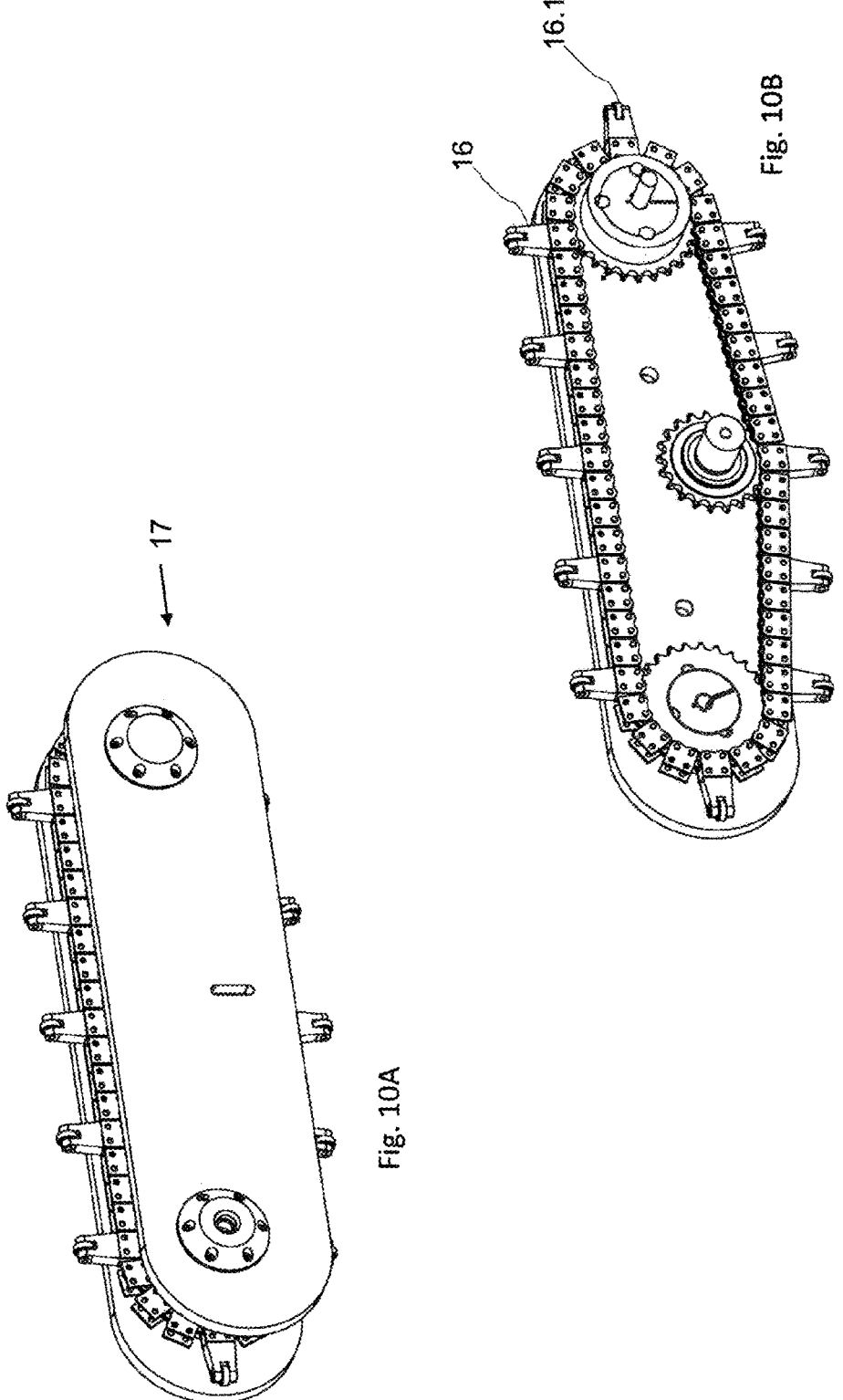
FIGS. 10A, 10B show in perspective views a ceiling unit according to a further embodiment.

FIGS. 10A, 10B show some details of a chassis only accommodating counter bearings but no suspension elements.

Figure 13:
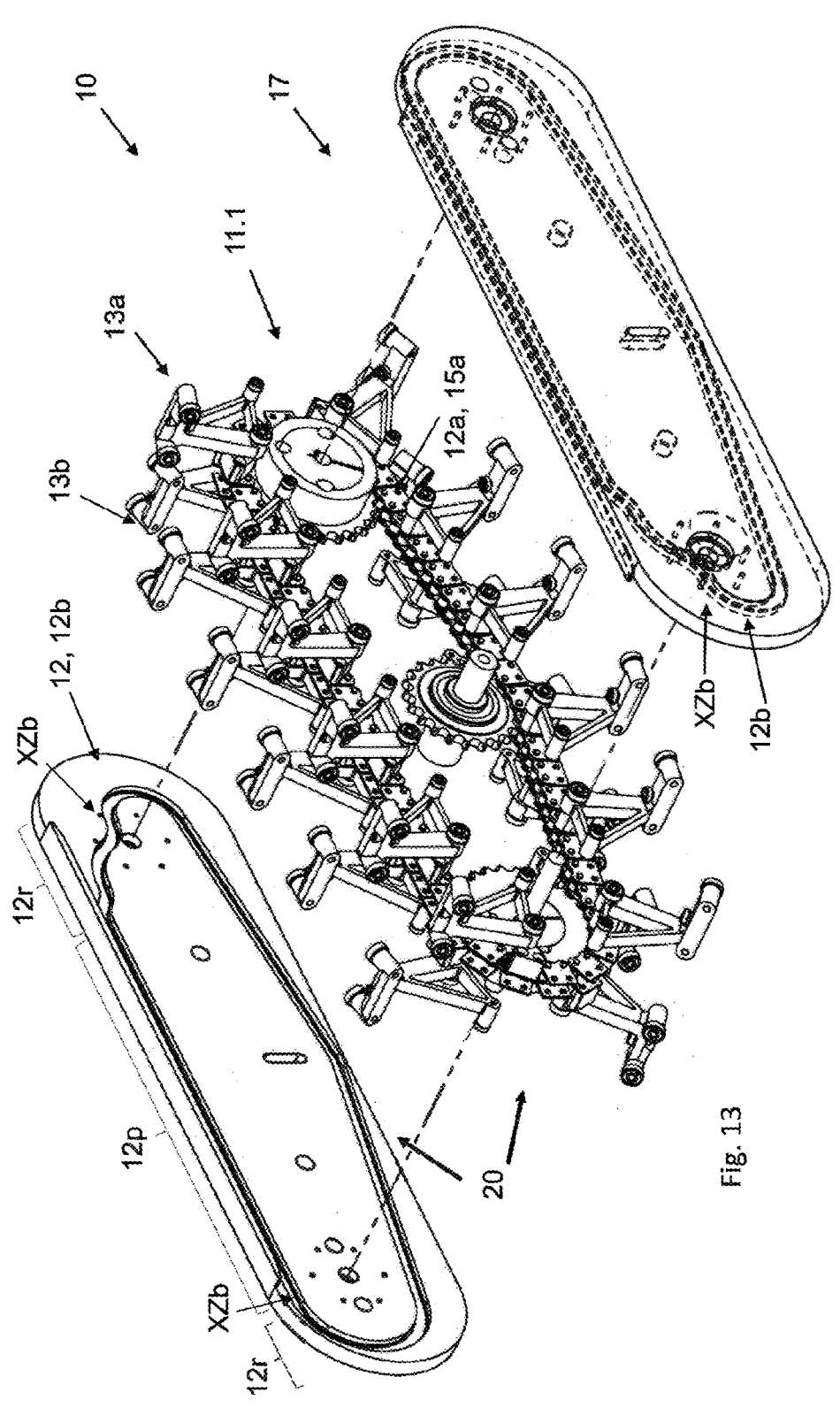
FIG. 13 shows in a perspective view details of a ceiling unit according to embodiments, especially according to the embodiment shown in FIG. 10.
Figures 14A, 14B:
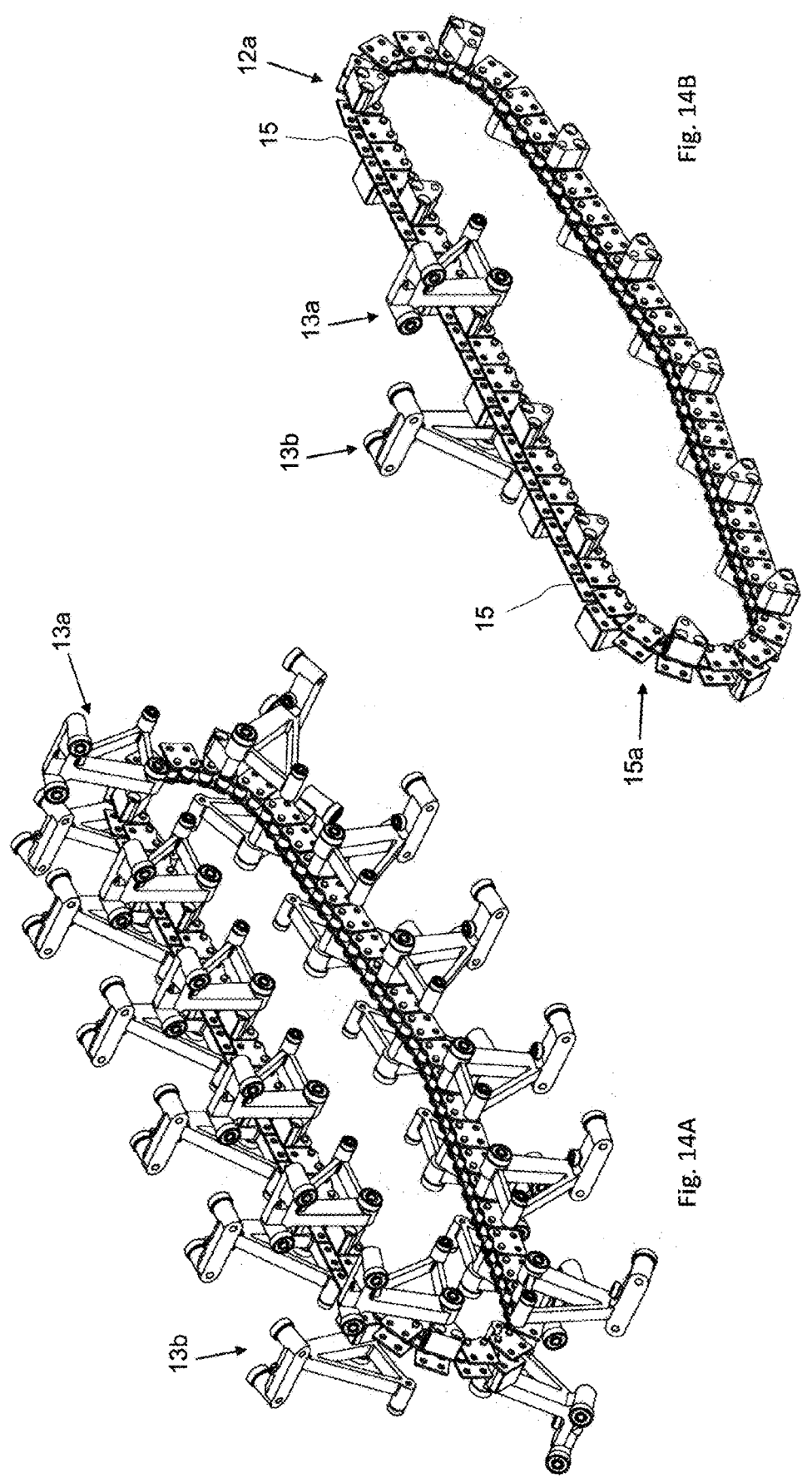

FIGS. 11A, 11B, 11C and FIGS. 12A, 12B and FIG. 13 and FIGS. 14A, 14B show some kinematic aspects of chassis accommodating/arranging/guiding both suspension elements 13 and further suspension elements 13b. FIG. 13 also illustrates that one (each) chassis 17 may comprise the first circumferential track (here: provided/defined by the chain 15a) and two second circumferential tracks 12b, wherein these two second circumferential tracks 12b are arranged asymmetrically, i.e., the shape/contour XZb is asymmetrical. Such an arrangement also allows for providing de-/coupling kinematics for both a plurality of suspension elements 13*a* of a first type and a plurality of further suspension elements 13*b* of a second type, especially in such a manner that both types of suspension elements 13*a*, 13*b* may interact and engage in the same (but asymmetrical) manner with the structure 1, especially at the same profile rail at opposite lateral sides, respectively. Such an arrangement may also ensure a high security and stability level already by means of one single drive unit 11. Thus, scaling (two, three or even more) of the ceiling unit's components (e.g. of the drives) is realizable in even more flexible manner, and individual arrangements can be optimized for each application.

It should be noted that the first circumferential track resp. a/the chain may/can provide for guiding and driving both the suspension elements 13*a* and the further suspension elements 13*b*; both types of suspension elements 13*a*, 13*b* can be coupled, e.g., via a protruding axial section (guiding bolt or shaft) 13.7 to the chain structure (cf. FIG. 16B) which protrudes vis-a-vis of the first pulley 13.1, especially along its axis. In particular, the suspension elements 13*a* and the further suspension elements 13*b* are arranged with longitudinal offset (y) and mirror-inverted on both sides of the chain 15*a*. In particular, the longitudinal distance (y) of the respective suspension element 13*a* and the respective further suspension element 13*b* of a respective pair of suspension elements 13, 13*b* corresponds to the extension in cross direction (y) of each element/profile of the (ceiling) structure.

Figures 15, 16A, 16B:
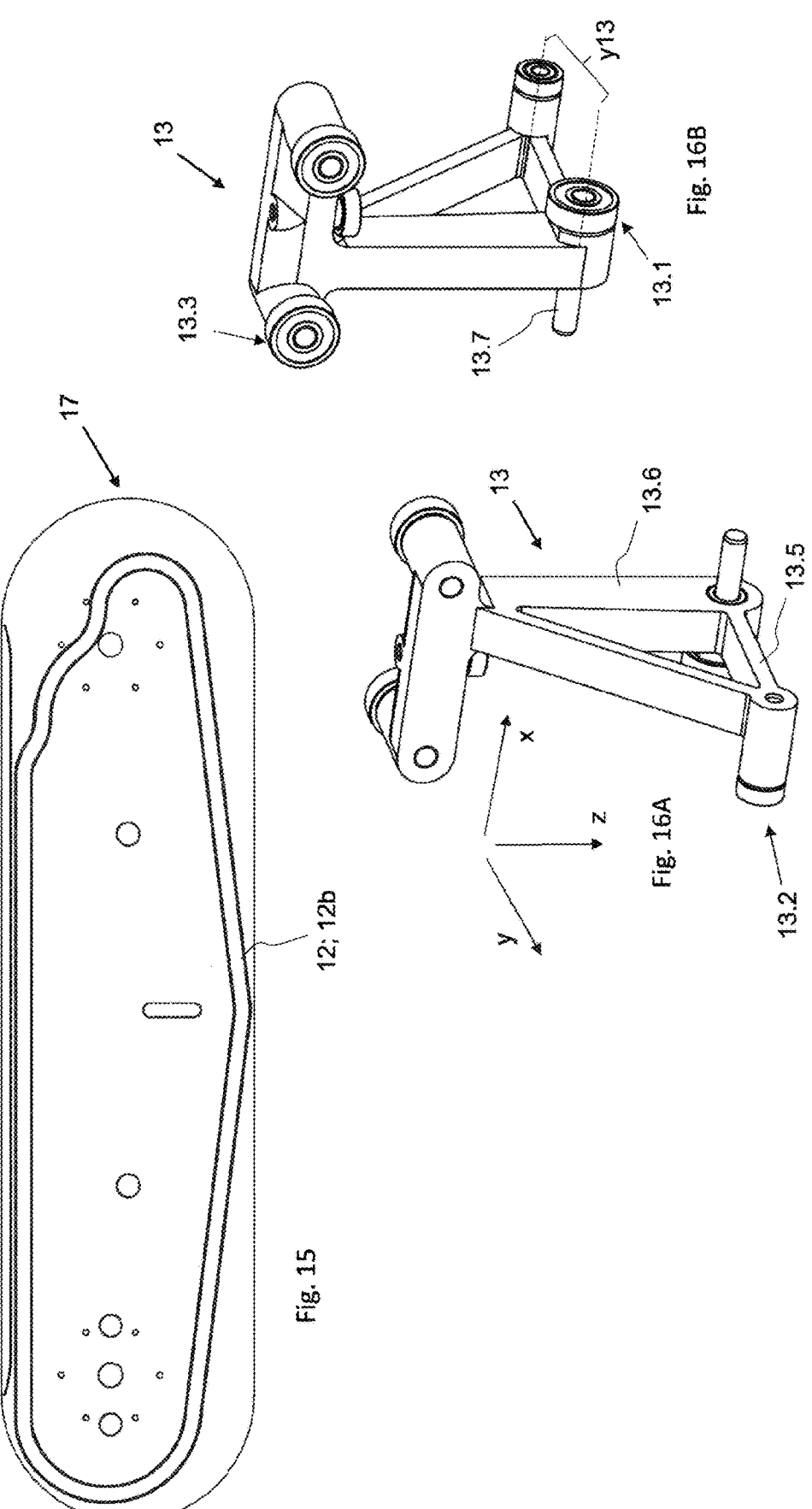
FIG. 15 shows in a side view components of a chassis resp. housing of a ceiling unit according to embodiments, especially according to the embodiment shown in FIG. 10.
FIGS. 16A, 16B show in perspective views some of the details of suspension elements of a ceiling unit according to embodiments, especially according to the embodiment shown in FIG. 10.

FIG. 15 also shows a guiding plank or rail allowing for guiding the first circumferential track resp. the chain more precisely.

FIGS. 16A, 16B show a further embodiment of suspension elements 13, wherein in comparison with the suspension elements described above in context with FIG. 3, these suspension elements exhibit two wheels or pulleys 13.3 arranged and configured for interacting with the structure 1, and these suspension elements may also exhibit a further pulley which is suspended around an axis extending in the z-direction (as shown in FIG. 16B). That optional further pulley may ensure further/improved support and guiding with respect to the structure.

It should be noted that the reference signs 13*a*, 13*b* are introduced in order to differentiate between different orientations and alignments and paths of motion of subsets of suspension elements (in built-in situation); nonetheless, suspension elements 13*a* and suspension elements 13*b* can be of similar design.

Figures 11A, 11B, 11C:
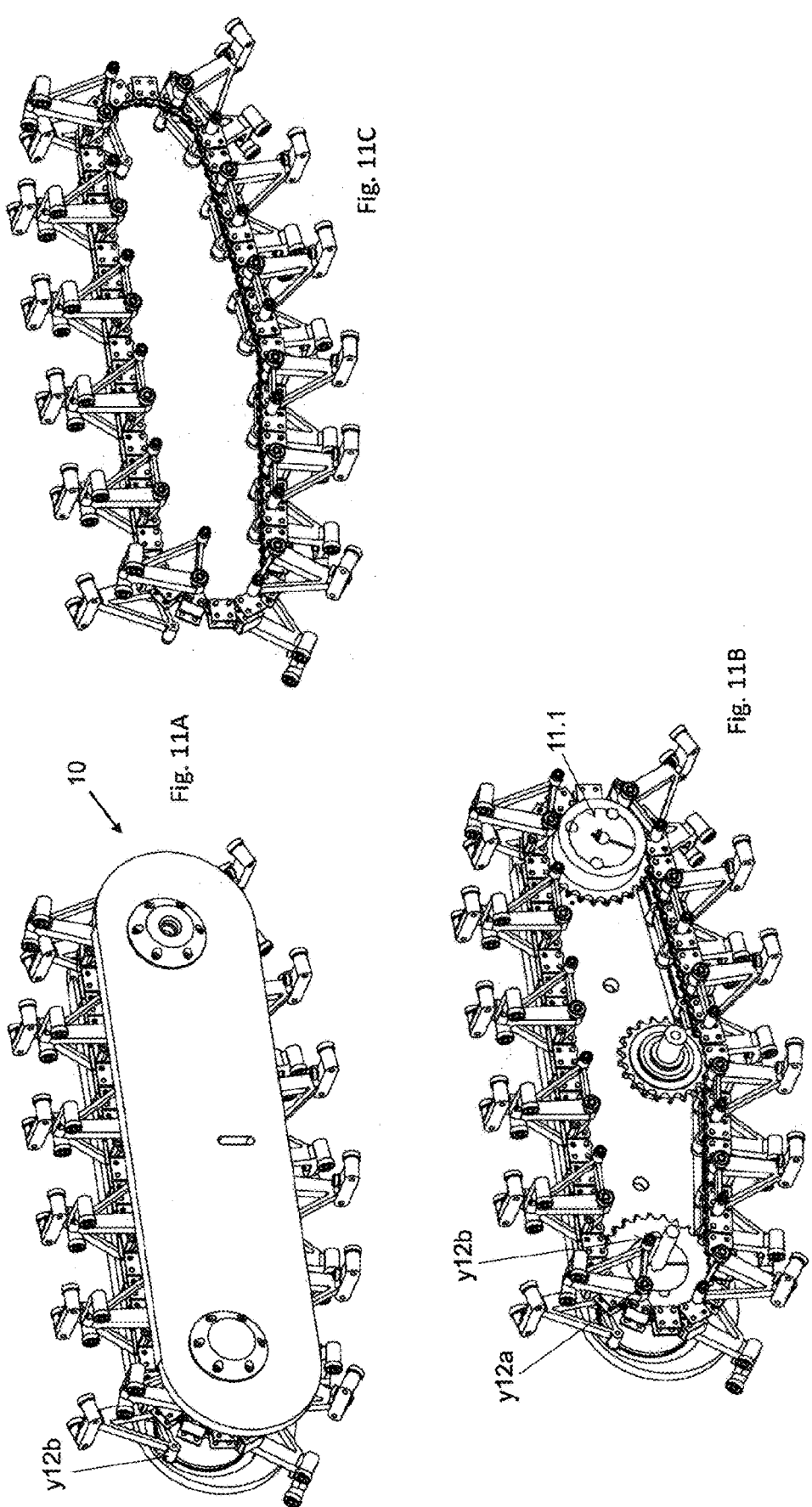
FIGS. 11A, 11B, 11C, 14A, 14B show in perspective views details of suspension elements (and their suspension) of a ceiling unit according to embodiments, especially according to the embodiment shown in FIG. 10.
Figure 12B:
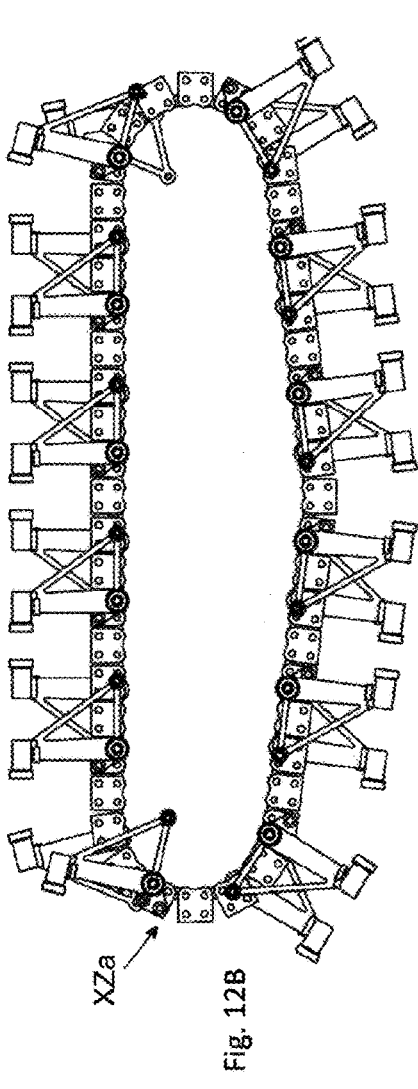
FIGS. 12A, 12B show in side views details of suspension elements of a ceiling unit according to embodiments, especially according to the embodiment shown in FIG. 10.
Figure 12A:
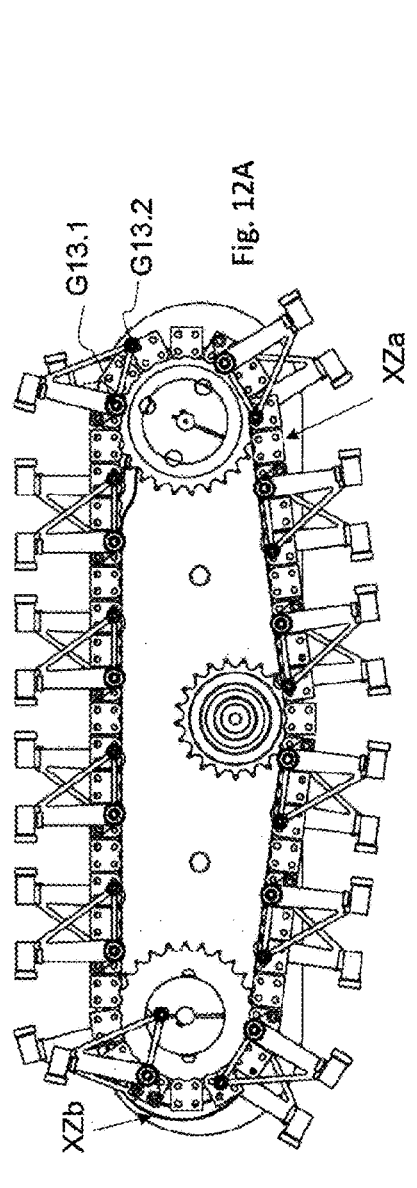

In FIG. 6A, 10A, 11C, a contact point distance provided by different protruding distances of the suspension element's contact point P13 and of the counter bearing's contact point (free end, especially wheel/pulley) is illustrated by referring to the relative arrangement at the (ceiling) structure, respectively.

Figure 17B:
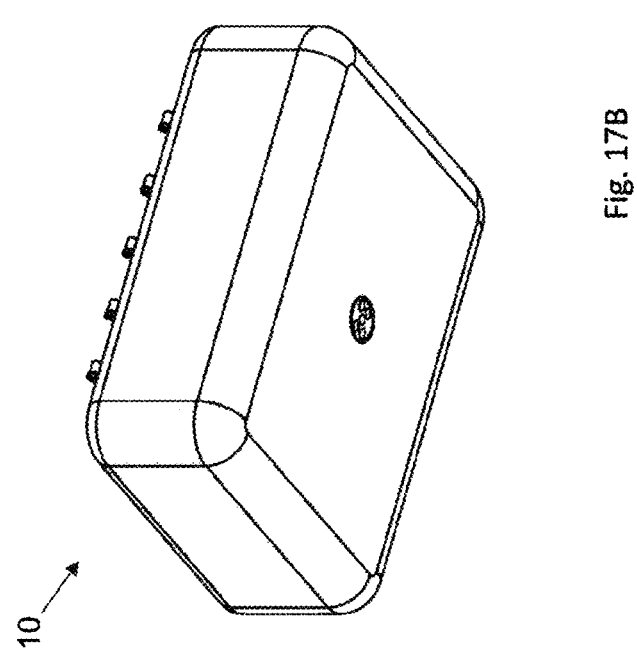
FIGS. 17A, 17B show in perspective views some of the details of a crawler type ceiling unit for a ceiling suspension arrangement according to embodiments.
Figure 17A:
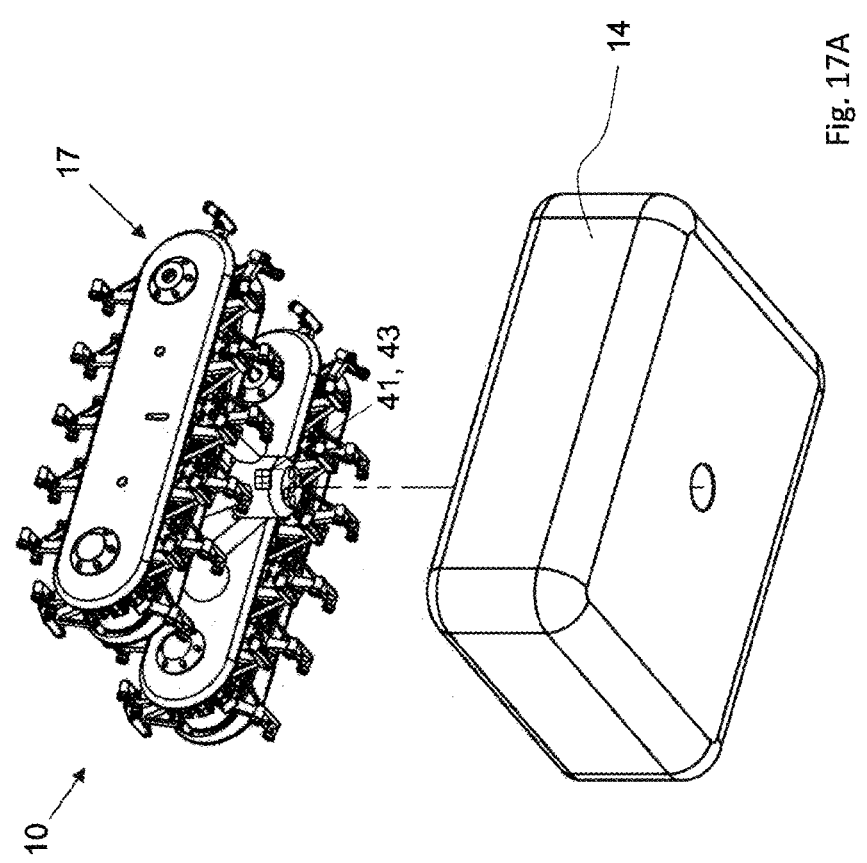

In FIG. 17A, 17B the ceiling unit 10 is encased by a casing 14 providing for protection of the ceiling unit's kinematics and of the suspension elements especially in front and at a rear end of the ceiling unit. Such casing can be useful also in case several ceiling units autonomously travel within the same arrangement 100 resp. at the same ceiling structure 1.

Figure 18A:
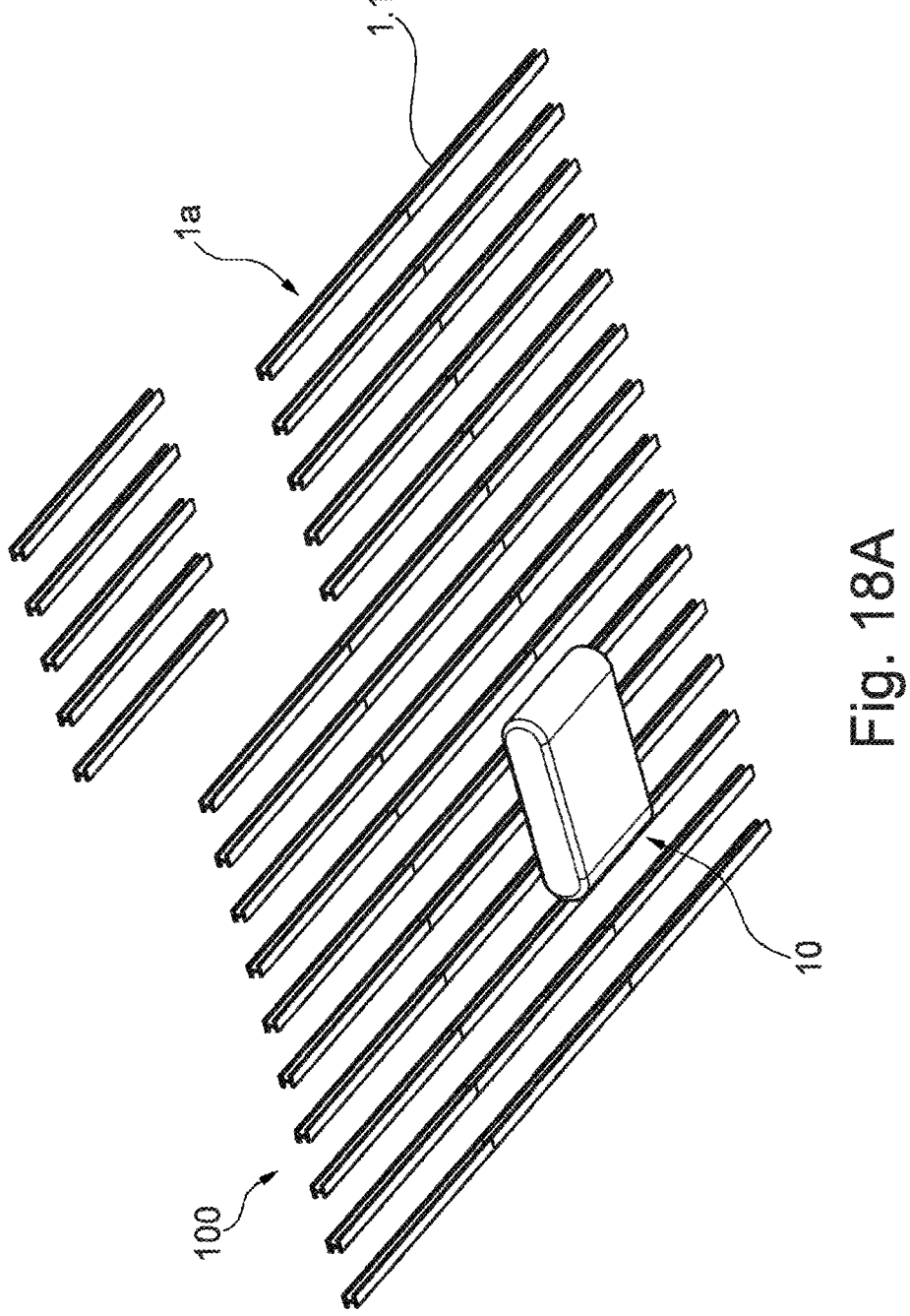
FIGS. 18A, 18B show in perspective views two different configurations of the ceiling structure of a ceiling suspension arrangement according to embodiments.
Figure 18B:
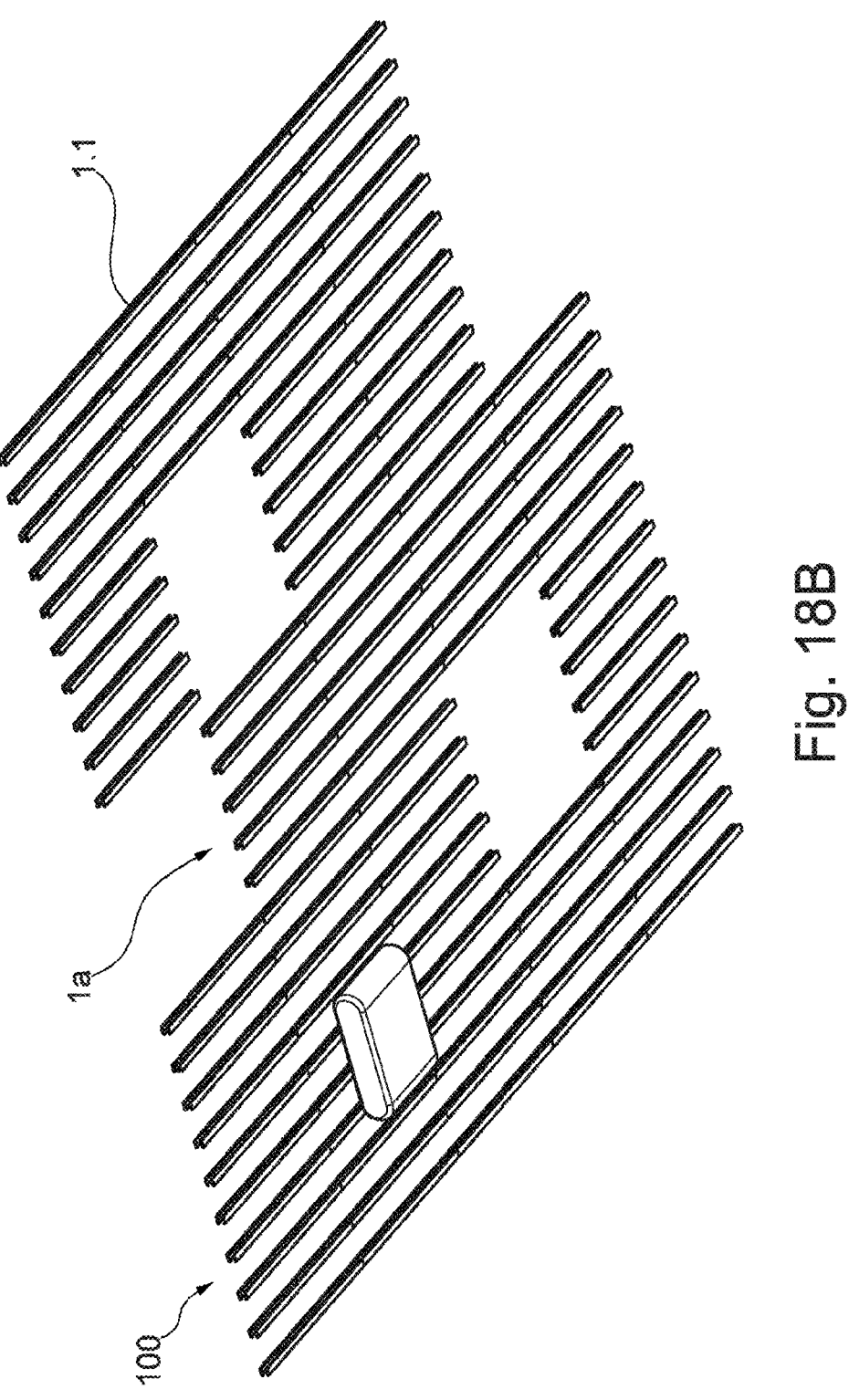

FIG. 18A, 18B show an arrangement 100 in which the profile units 1.1 are arranged only in predefined sections of the ceiling (there remain some areas which are not equipped with profile units, i.e., there is no need to reach these areas by any ceiling unit); alternatively or in addition, the profile units 1.1 can be arranged according to at least two different structural regularities.

Figure 19:
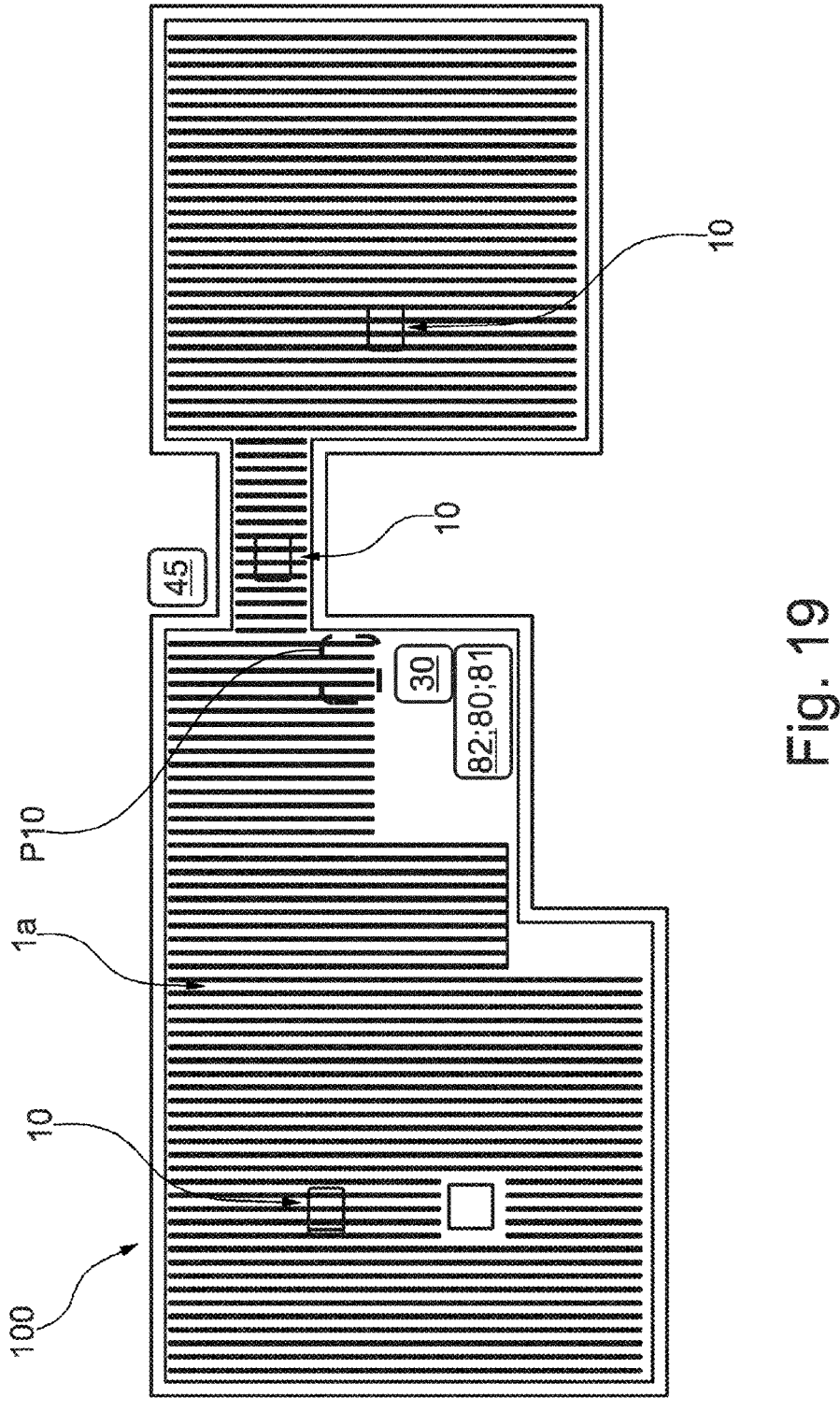
FIGS. 19, 20 show in a top view and in a perspective view different kinds of ceiling suspension arrangements according to embodiments.

An arrangement 100 according to FIG. 19 also comprises a central control unit 30 communicating with each ceiling unit 10 (which each may comprise a decentral control unit or at least one drive wirelessly communicating with the central control unit), and control commands can also be defined by a positioning system 45, communicating e.g. based on near filed, mobile network, LAN, LP-WAN, SigFox, NBIoT. Data of at least one digital twin 80, 81 referring to a respective ceiling unit and/or to a respective package can be stored in a database 82 and can be accessed and processed in order to define further control commands. Each ceiling unit 10 may (autonomously) reach an energy charging point/position P10 for loading an energy storage unit 19. Alternatively or in addition, energy can be transferred via at least some of the profile units and suspension elements, as described above.

Figure 20:
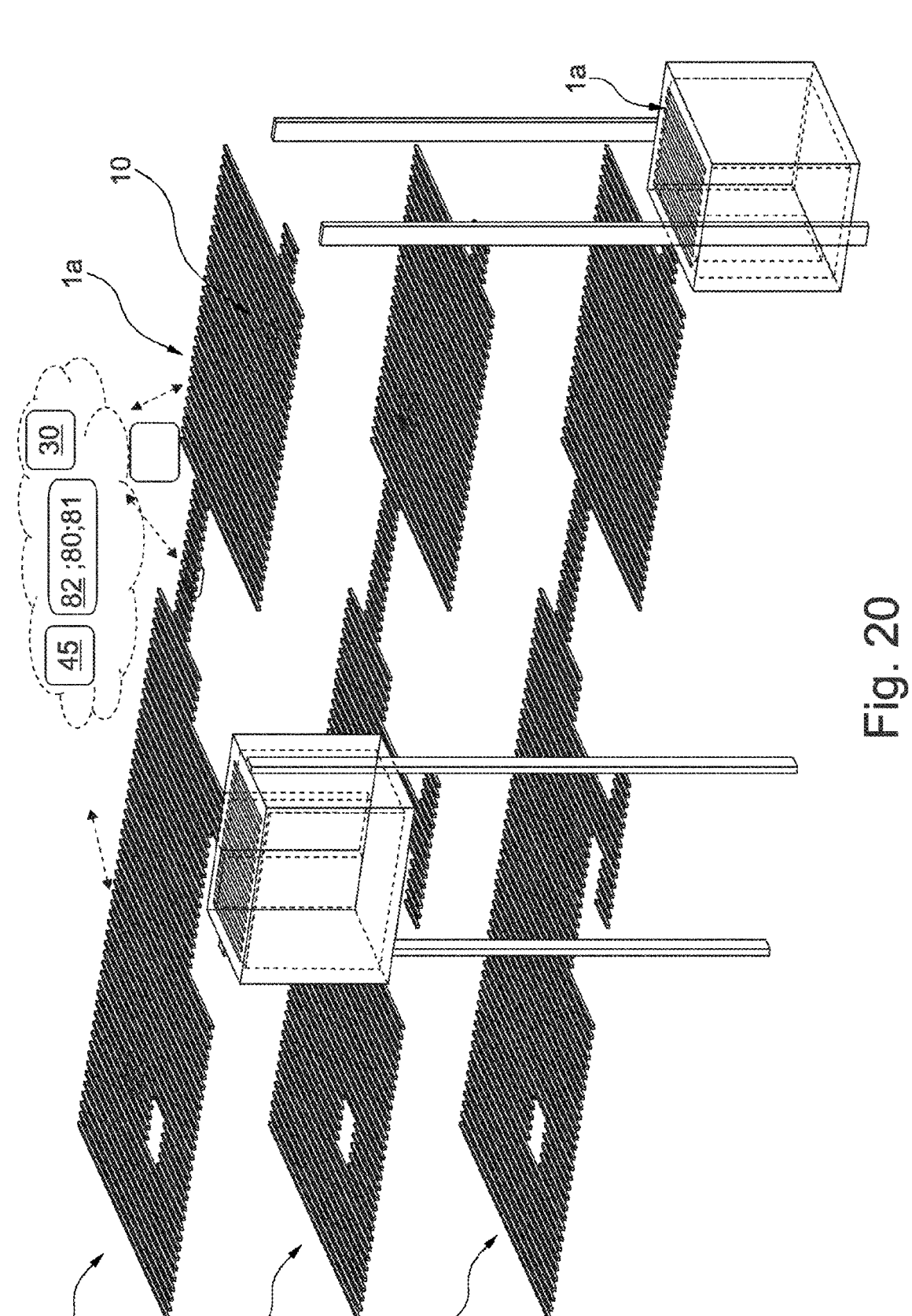

In the embodiment according to FIG. 20, the ceiling suspension arrangement extends on different levels of altitude which are connected by means of at least one elevator exhibiting an elevator ceiling structure geometrically corresponding to/with the ceiling structure 1 of the ceiling suspension arrangement 100, wherein the ceiling structure merges/transitions to the elevator ceiling structure, thereby providing for interconnection of different levels of altitude. Such a configuration can also be favourable in buildings, e.g. in case the respective ceiling unit should (autonomously) access several areas on different levels of altitude. Similarly, it is possible to connect multiple areas in different buildings via rails/guidings, to allow the crawler type ceiling units to be exchanged between multiple areas, e.g., following an assembly line. It is also possible to equip truck loading areas or trains with the ceiling suspension arrangement.

Figures 21A, 21B:
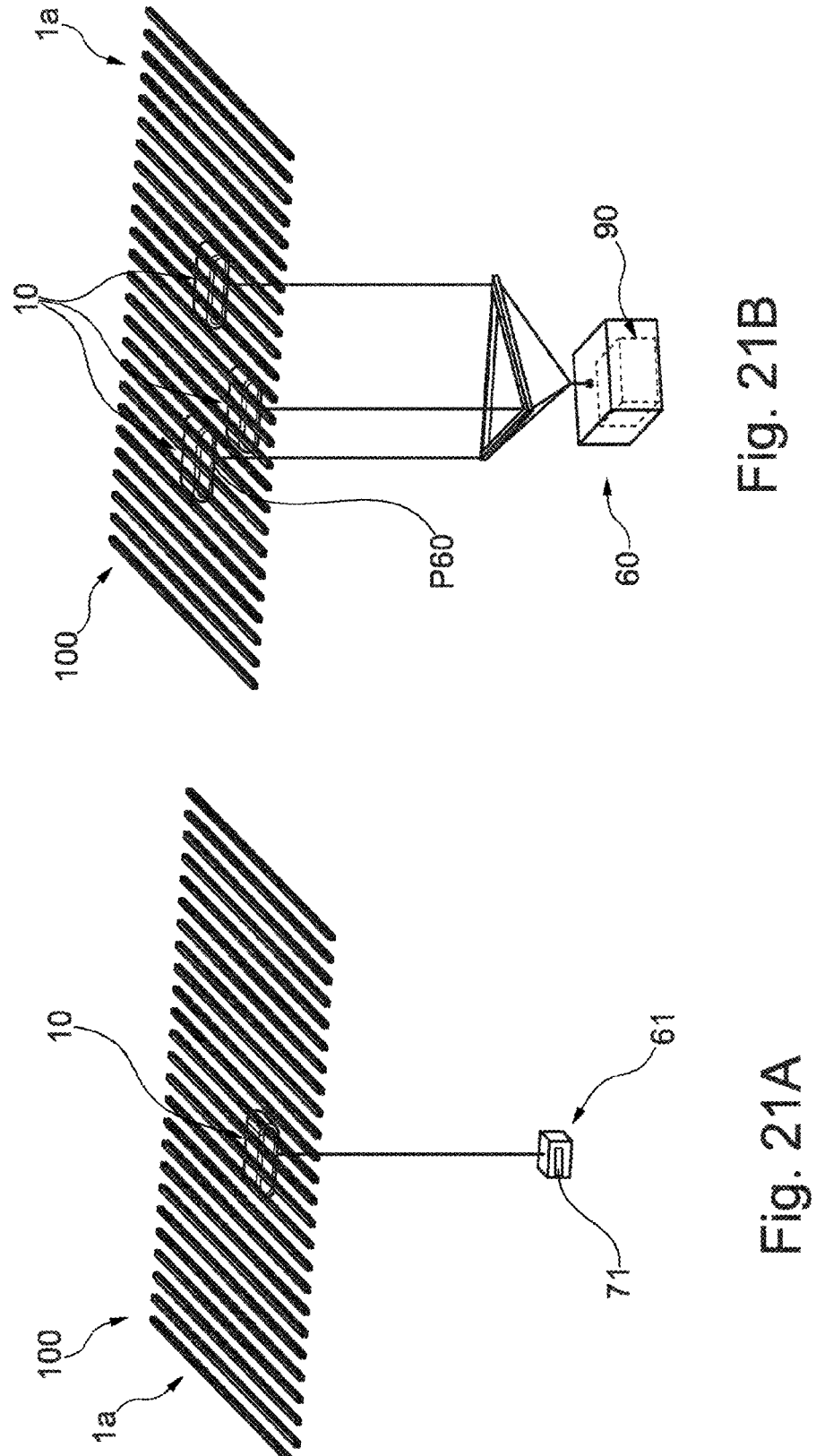
FIGS. 21A, 21B show in perspective views some of the details of a ceiling suspension arrangement according to embodiments with one or several crawler type ceiling units carrying a load resp. an object, especially for logistic tasks.

In FIG. 21A, 21B, one or several crawler type ceiling units 10 carry a load resp. an object 60 or package 61 which can be identified by means of at least one identification feature 71. The package 61 can be stored in an accommodating cavity 90 of the object 60 (or in an accommodating cavity of the ceiling unit 10). Thus, the positioning system 45 can ensure traveling and positioning of each ceiling unit 10 according to predefined paths of motion e.g. in order to deliver a package or postal items or the like.

Figures 22A, 22B, 22C:
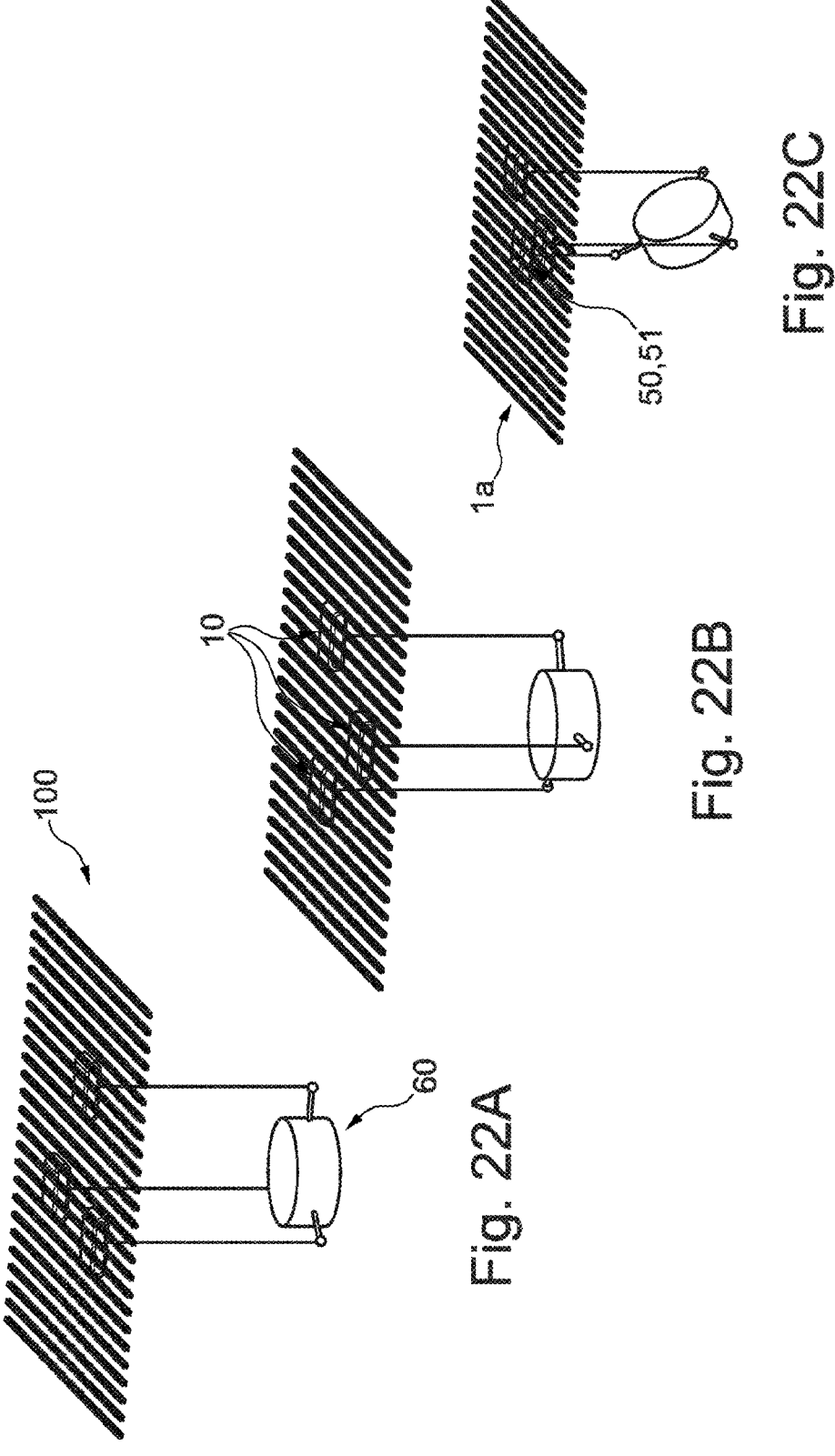
FIGS. 22A, 22B, 22C show in perspective views some of the details of a ceiling suspension arrangement according to embodiments with several crawler type ceiling units conjointly carrying and handling a load resp. an object, especially for logistic tasks.

In a configuration shown in FIG. 22A, 22B, 22C, several crawler type ceiling units 10 conjointly carry and handle a load resp. an object 60, wherein at least one of the ceiling units 10 (preferably each ceiling unit) also comprises a hoist unit 50 allowing for vertically positioning the object 60. Preferably, a traction mechanism 51 (especially rope winch) of the hoist unit is controlled via a/the decentral control unit of the respective ceiling unit and/or via a central control unit of the arrangement 100.

Figure 23:
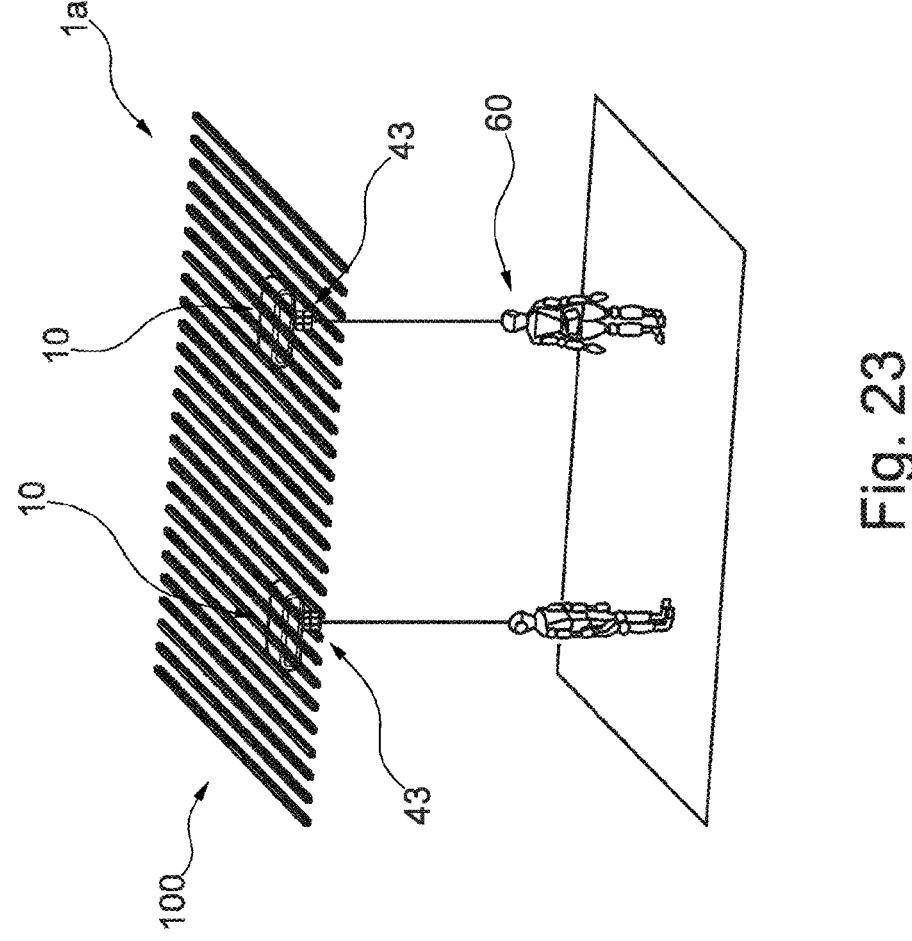
FIG. 23 shows in a perspective view a ceiling suspension arrangement according to an embodiment, wherein two crawler type ceiling units respectively handle an individual, e.g. in context with gravity offloading based on active force exertion.

FIG. 23 illustrates an application in which two crawler type ceiling units 10 respectively handle an individual 60, e.g. in context with gravity offloading based on active force exertion. Each ceiling unit 10 exhibits at least one force sensor 43.

LIST OF REFERENCE SIGNS

1 ceiling structure
1*a* structural regularity or raster defined by the ceiling structure
1.1 profile unit, especially T-profile resp. T-rail
1.2 wheel tread
1.3 power rail

10 crawler type ceiling unit
11 drive unit (motor, actuator), especially chain drive
11.1 drive mechanism
11*a* first drive
11*b* further (second) drive
11*c* further (third) drive
12 circumferential track
12*a* first circumferential track, especially comprising a chain
12*b* second circumferential track
12*p* parallel section/linear section of the track
12*r* redirection section/curved section of the track
13 suspension element resp. chain element
13*a* first suspension element resp. chain element (first type)
13*b* further suspension element (second type, especially mirror-inverted)
13.1, 13.2 first pulley, second pulley
13.3 wheel
13.4 current collector resp. power-slider (conductive slider for energy transfer)
13.5 lever arm
13.6 protruding section/suspension arm
13.7 protruding axial section (guiding bolt or shaft)
14 casing
15 longitudinal connecting element, especially chain element
15*a* closed loop of interrelated suspension elements, especially chain
16 counter bearing
16.1 wheel, pulley
17 housing or chassis
18 gear unit
18*a* further gear unit
19 energy storage unit
20 de-/coupling kinematics
30 central control unit
31 decentral (individual) control unit
35 communicating unit (e.g. near filed, mobile network, LAN, LP-WAN, SigFox, NBIOT)
36 transmitter (active or passive), especially for transmitting locating signals
40 sensor arrangement
41 sensing device
43 sensor
45 positioning system, e.g. based on near filed, mobile network, LAN, LP-WAN, SigFox, NBIOT
50 hoist unit
51 traction mechanism, especially rope winch
53 transmission means, especially rope
60 external load, especially object or individual
61 package, e.g. including consumables, food, postal items
70 identification feature referring to ceiling unit, especially code (e.g. including a number)
71 identification feature referring to package, especially code (e.g. including a number)
80 digital twin referring to a respective ceiling unit
81 digital twin referring to a respective package
82 database
90 accommodating cavity
100 ceiling suspension arrangement
G13.1 first guiding point or axis (coupling the first track and the suspension element)
G13.2 second guiding point or axis (coupling the second track and the suspension element)

P10 energy charging point/position
P13 contacting/bearing point/area of the suspension element with the ceiling structure
P60 attachment point
XZa shape/contour of the first circumferential track
XZb shape/contour of the second circumferential track
y12*a* predefined first longitudinal positions
y12*b* predefined second longitudinal positions
y13 longitudinal extension of lever arm
x first spatial direction: direction of longitudinal extension of profile units
y second spatial direction: longitudinal direction resp. alignment of the circumferential tracks
z third spatial direction, especially vertical direction

What is claimed is:

1. A ceiling suspension arrangement exhibiting at least one crawler type ceiling unit and a ceiling structure extending in at least two spatial directions (x, y), wherein the ceiling structure comprises a plurality of profile units extending in a first spatial direction (x), wherein the ceiling structure defines at least one structural regularity in a second spatial direction (y); and wherein the crawler type ceiling unit exhibits a plurality of suspension elements configured for suspending the ceiling unit and configured for coupling the crawler type ceiling unit to the ceiling structure by means of coupling and decoupling kinematics depending on a relative motion of the crawler type ceiling unit with respect to the ceiling structure in at least said second spatial direction, wherein the crawler type ceiling unit exhibits at least two circumferential tracks, wherein the suspension elements are attached to the circumferential tracks at predefined longitudinal positions corresponding to the structural regularity, wherein the circumferential tracks respectively define a specific path of circumferential motion of the respective suspension elements, thereby providing for coupling and decoupling kinematics during a motion of the crawler type ceiling unit in said second spatial direction.

2. The ceiling suspension arrangement according to claim 1, wherein the ceiling suspension arrangement is configured for at least passive motion of the crawler type ceiling unit in said at least two spatial directions, wherein the crawler type ceiling unit is configured for at least two-dimensional arbitrary motion in arbitrary directions defined by said at least two spatial directions.

3. The ceiling suspension arrangement according to claim 1, wherein the crawler type ceiling unit is configured for enabling at least one closed loop trajectory of respective suspension elements along corresponding circumferential tracks;

wherein a respective subset of said suspension elements are connected to each other by means of longitudinal connecting elements thereby forming a closed loop of interrelated suspension elements distanced to each other in the predefined structural regularity;

wherein the circumferential tracks are shaped in such a manner that the respective suspension elements are coupled to and decoupled from the ceiling structure when passing a curved section of the tracks;

wherein the suspension elements are fixedly coupled by means of a first pulley to the first circumferential track and are guided within the second circumferential track by means of a second pulley respectively, wherein the first and second pulley preferably are arranged at a lever arm of the respective suspension element; and wherein the crawler type ceiling unit is configured for lifting the respective suspension elements out of the structure in an unloaded state, wherein both coupling and decoupling kinematics for a subset of momentarily unloaded suspension elements and suspension of the crawler type ceiling unit by a subset of momentarily loaded suspension elements is ensured.

4. The ceiling suspension arrangement according to claim 1, wherein the crawler type ceiling unit exhibits at least two types of suspension elements, wherein the different types of suspension elements are coupled to and decoupled according to individual kinematics, wherein a first subset of the suspension elements are attached to a first pair of circumferential tracks and at least one further subset of the suspension elements are attached to a second pair of circumferential tracks respectively at predefined first and second longitudinal positions respectively corresponding to the structural regularity.

5. The ceiling suspension arrangement according to claim 1, wherein the crawler type ceiling unit exhibits at least one load attachment point configured for transferring loads of an external load attached to the crawler type ceiling unit;

wherein the crawler type ceiling unit exhibits at least one hoist unit, or the ceiling suspension arrangement exhibits at least two crawler type ceiling units each exhibiting at least one hoist unit, wherein the hoist unit is configured for transferring loads of an external load to the ceiling structure.

6. The ceiling suspension arrangement according to claim 1, wherein the crawler type ceiling unit exhibits at least one drive interacting with at least one of the circumferential tracks, wherein the ceiling suspension arrangement is configured for a predefinable driving motion of the crawler type ceiling unit at least in said second spatial direction;

wherein the crawler type ceiling unit exhibits an energy storage unit providing energy to the at least one drive of the crawler type ceiling unit.

7. The ceiling suspension arrangement according to claim 1, wherein the ceiling suspension arrangement exhibits a sensing device exhibiting at least one sensor from the following group: speed sensor, distance sensor, position measuring sensor, force sensor, acceleration sensor;

wherein the ceiling suspension arrangement is configured for controlling the at least one crawler type ceiling unit based on momentary measuring data of the at least one sensor;

wherein the crawler type ceiling unit exhibits a communicating unit configured for wireless communication at least within the ceiling suspension arrangement, wherein the crawler type ceiling unit exhibits an energy storage unit providing energy to the communicating unit; and wherein the ceiling suspension arrangement is configured for localizing individual crawler type ceiling units based on at least one locating signal transmitted by individual crawler type ceiling units.

8. The ceiling suspension arrangement according to claim 1, wherein each suspension element exhibits at least one element of motion arranged and configured for moving the crawler type ceiling unit in said first spatial direction, wherein the crawler type ceiling unit exhibits at least two drives interacting with both at least one of the circumferential tracks and with said elements of motion, wherein the ceiling suspension arrangement is configured for a predefinable two-dimensional driven motion of the crawler type ceiling unit in said spatial directions.

9. The ceiling suspension arrangement according to claim 1, wherein the profile units of the ceiling suspension arrangement are arranged according to at least two different structural regularities respectively with respect to said second spatial direction, namely a first structural regularity defining a relative distance of the profile units matching with the relative distance of the suspension elements attached at the tracks, and a second structural regularity being a whole-number multiple of said first structural regularity, wherein the number of momentarily engaging suspension elements preferably is at least two within a overlapping area of the second structural regularity, and wherein the area of the first structural regularity preferably has a first load-bearing capacity and the area of the second structural regularity has a second load-bearing capacity;

wherein the profile units of the ceiling suspension arrangement spatially define at least two different allowable loads in at least two spatial sections of the ceiling suspension arrangement along the ceiling; and wherein the ceiling suspension arrangement is coupled to a further ceiling suspension arrangement, wherein the profile units of the ceiling suspension arrangement are arranged according to a first structural regularity, wherein the profile units of the further ceiling suspension arrangement are arranged according to a second structural regularity, wherein the second structural regularity is a whole-number multiple of said first structural regularity.

10. The ceiling suspension arrangement according to claim 1, wherein the ceiling suspension arrangement exhibits a plurality of crawler type ceiling units each exhibiting at least one attachment point or hoist unit each being configured for transferring loads of an external load of at least 50 kg or 100 kg to the ceiling structure, wherein the ceiling suspension arrangement is configured for arranging a plurality of external loads in individual two-dimensional or three-dimensional positions with respect to each other;

wherein the crawler type ceiling unit exhibits at least one attachment point or hoist unit structurally connected with at least one of the circumferential tracks, wherein the crawler type ceiling unit is configured for transferring loads of an external load of at least 200 kg or 500 kg to the ceiling structure, wherein the ceiling suspension arrangement is configured for at least two-dimensional transportation of at least one individual suspended via the attachment point or hoist unit along the ceiling structure;

wherein the crawler type ceiling unit exhibits at least one attachment point or hoist unit structurally connected with at least one of the circumferential tracks, wherein the crawler type ceiling unit is configured for transferring loads of an external load of at least 1.000 kg or 10.000 kg to the ceiling structure, wherein the ceiling suspension arrangement is configured for at least two-dimensional transportation of the external load being suspended via the attachment point or hoist unit along the ceiling structure;

wherein the ceiling suspension arrangement exhibits a plurality of crawler type ceiling units each exhibiting at least one attachment point or hoist unit each being configured for transferring loads of an external load to the ceiling structure, wherein the ceiling suspension arrangement is configured for controlling the one-or two-dimensional movement or path of motion of a subset of at least two of the crawler type ceiling units in dependence on each other;

wherein the ceiling suspension arrangement exhibits a plurality of crawler type ceiling units each exhibiting at least one accommodating cavity configured for accommodating at least one package, wherein the ceiling suspension arrangement exhibits at least one control unit configured for wireless control, wherein the ceiling suspension arrangement is configured for controlling the one-or two-dimensional movement or path of motion of a respective crawler type ceiling unit and of a subset of at least two of the crawler type ceiling units in dependence on each other, wherein the plurality of crawler type ceiling unit simultaneously move according to a plurality of individual one-or two-dimensional paths of motion; and wherein the crawler type ceiling unit exhibits at least one attachment point or hoist unit each being configured for transferring loads of an external load to the ceiling structure, wherein the ceiling suspension arrangement exhibits a sensing device exhibiting at least one sensor from the following group: force sensor, acceleration sensor; wherein the ceiling suspension arrangement is configured for gravity offloading based on active force exertion in at least one spatial direction via the attachment point or hoist unit, wherein the amount of force is depending on effective gravity and effective load.

11. The ceiling suspension arrangement according to claim 1, wherein the at least one crawler type ceiling unit exhibits at least one drive, wherein the ceiling suspension arrangement unit exhibits a control unit controlling the drive, wherein the ceiling suspension arrangement exhibits a sensing device exhibiting at least one sensor from the following group: speed sensor, distance sensor, position measuring sensor, force sensor, acceleration sensor; wherein the ceiling suspension arrangement is configured for controlling the at least one crawler type ceiling unit based on momentary measuring data of the at least one sensor.

12. The ceiling suspension arrangement according to claim 1, wherein the ceiling suspension arrangement exhibits a plurality of crawler type ceiling units respectively exhibiting at least one sensor and a communicating unit communicating with a control unit of the ceiling suspension arrangement, wherein the ceiling suspension arrangement is configured for predefining a plurality of individual paths of two-dimensional motion of respective crawler type ceiling units;

or wherein the ceiling suspension arrangement exhibits a central control unit monitoring at least the momentary positions of the crawler type ceiling units of the ceiling suspension arrangement, wherein each crawler type ceiling unit exhibits a communicating unit for wireless transmission of control signals to at least one drive or actuator of the respective crawler type ceiling unit;

or wherein the ceiling suspension arrangement is configured for decentral control, wherein each crawler type ceiling unit exhibits a sensing device providing momentary sensor data to at least one drive or actuator of the crawler type ceiling unit.

13. The ceiling suspension arrangement according to claim 1, wherein the ceiling suspension arrangement comprises a database configured for storing and accessing at least one digital twin of individual crawler type ceiling units and individual packages carried by crawler type ceiling units of the ceiling suspension arrangement, wherein the digital twin at least comprises information of momentary status, wherein the ceiling suspension arrangement is configured to define at least one control parameter for individual crawler type ceiling units based on information of the at least one digital twin for remotely controlling individual crawler type ceiling units.

14. A method of suspending or positioning at least one crawler type ceiling unit at a ceiling structure extending in at least two spatial directions for providing at least two degrees of freedom for at least two-dimensional positioning or two-dimensional motions of the crawler type ceiling unit in suspended manner headlong the ceiling structure in conjunction with actively moving the crawler type ceiling unit along the ceiling structure by actively re-orientating the crawler type ceiling unit's traveling direction, wherein the ceiling structure comprises a plurality of profile units extending in a first spatial direction, wherein the ceiling structure defines at least one structural regularity in a second spatial direction; wherein the crawler type ceiling unit is suspended by means of a plurality of suspension elements coupling the crawler type ceiling unit to the ceiling structure by means of coupling and decoupling kinematics depending on a relative motion of the ceiling unit with respect to the ceiling structure in at least said second spatial direction, wherein the suspension elements are attached to and guided by at least two circumferential tracks of the crawler type ceiling unit, wherein the circumferential tracks respectively define a specific path of circumferential motion of the respective suspension elements, thereby providing for decoupling kinematics which suspend and relatively move the respective suspension element with respect to the ceiling structure during a relative motion of the crawler type ceiling unit in said second spatial direction.

15. The method according to claim 14, further comprising a computer and a computer program comprising instructions which, when executed by the computer, cause the computer to execute steps of the method in context with provision and control of the motion or positions of at least one crawler type ceiling unit.

* * * * *